US009718622B2

(12) United States Patent
Smith et al.

(10) Patent No.: US 9,718,622 B2
(45) Date of Patent: Aug. 1, 2017

(54) APPARATUS FOR HANDLING ARTICLES

(71) Applicant: 381572 ONTARIO LIMITED, Lindsay (CA)

(72) Inventors: Riley Edward Smith, Pontypool (CA); Kristopher Kenneth Clayton Smith, Lindsay (CA); Edward Clayton Smith, Reboro (CA); Dustin Travis Smith, Smith-Ennismore-Lakefield (CA)

(73) Assignee: 381572 ONTARIO LIMITED, Lindsay (CA)

( * ) Notice: Subject to any disclaimer, the term of this patent is extended or adjusted under 35 U.S.C. 154(b) by 0 days.

(21) Appl. No.: 14/719,612

(22) Filed: May 22, 2015

(65) Prior Publication Data
US 2016/0016734 A1    Jan. 21, 2016

Related U.S. Application Data

(63) Continuation of application No. PCT/CA2013/000975, filed on Nov. 25, 2013.

(60) Provisional application No. 61/775,781, filed on Mar. 11, 2013, provisional application No. 61/729,751, filed on Nov. 26, 2012.

(51) Int. Cl.
| | |
|---|---|
| B65G 47/26 | (2006.01) |
| B65G 37/00 | (2006.01) |
| B65G 57/18 | (2006.01) |
| B65G 47/24 | (2006.01) |
| B65G 47/256 | (2006.01) |
| B65G 47/31 | (2006.01) |
| B65G 47/34 | (2006.01) |

(52) U.S. Cl.
CPC .............. *B65G 37/00* (2013.01); *B65G 47/24* (2013.01); *B65G 47/256* (2013.01); *B65G 47/31* (2013.01); *B65G 47/34* (2013.01); *B65G 57/18* (2013.01)

(58) Field of Classification Search
CPC ..... B65G 37/005; B65G 47/26; B65G 47/268
USPC ... 198/461.1, 461.3, 502.2, 502.3, 575, 576, 198/604, 606, 620
See application file for complete search history.

(56) References Cited

U.S. PATENT DOCUMENTS

| | | | | |
|---|---|---|---|---|
| 4,004,678 | A | * | 1/1977 | Hardy .................. B65G 15/105 198/460.2 |
| 4,015,843 | A | * | 4/1977 | Tennant .................. B65H 29/52 198/411 |
| 4,090,618 | A | | 5/1978 | Lehmann |
| 4,960,198 | A | * | 10/1990 | Hogenkamp ......... A23G 3/0278 198/419.2 |
| 5,238,100 | A | * | 8/1993 | Rose, Jr. ............... B65G 49/067 198/468.6 |
| 5,492,315 | A | * | 2/1996 | Maruyama ................ B42C 1/00 270/58.32 |
| 6,347,697 | B1 | * | 2/2002 | Ouellette ............... B65G 43/08 198/358 |
| 6,439,829 | B1 | | 8/2002 | Johnson |
| 7,104,388 | B2 | * | 9/2006 | Walker ................... B65G 47/31 198/412 |
| 7,588,139 | B1 | * | 9/2009 | Campbell, III ...... B65G 15/105 198/407 |

(Continued)

OTHER PUBLICATIONS

The International Bureau of WIPO; International Preliminary Report on Patentability; Geneva Switzerland May 26, 2015.

*Primary Examiner* — Douglas Hess
(74) *Attorney, Agent, or Firm* — Middleton Reutlinger

(57) ABSTRACT

An apparatus for conveying stickers to lumber stack.

21 Claims, 26 Drawing Sheets

(56) References Cited

U.S. PATENT DOCUMENTS

| | | | |
|---|---|---|---|
| 7,611,141 B2* | 11/2009 | Williams | G07B 17/00467 |
| | | | 198/626.4 |
| 7,654,385 B2* | 2/2010 | Ledinek | B27M 3/002 |
| | | | 144/253.5 |
| 8,944,240 B2* | 2/2015 | Frederick | B65G 17/26 |
| | | | 198/611 |
| 9,174,753 B2* | 11/2015 | Cain | B65B 5/06 |

* cited by examiner

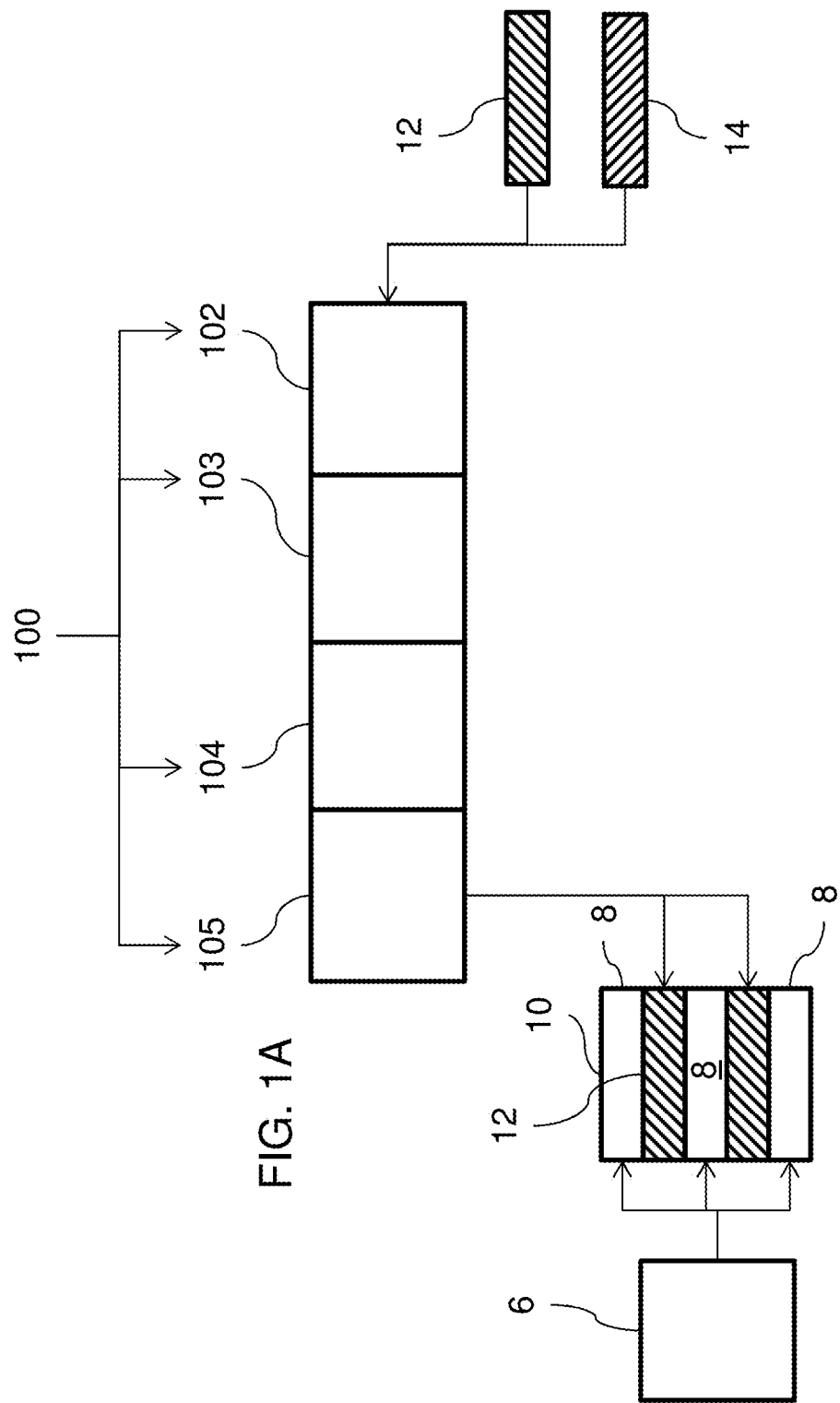

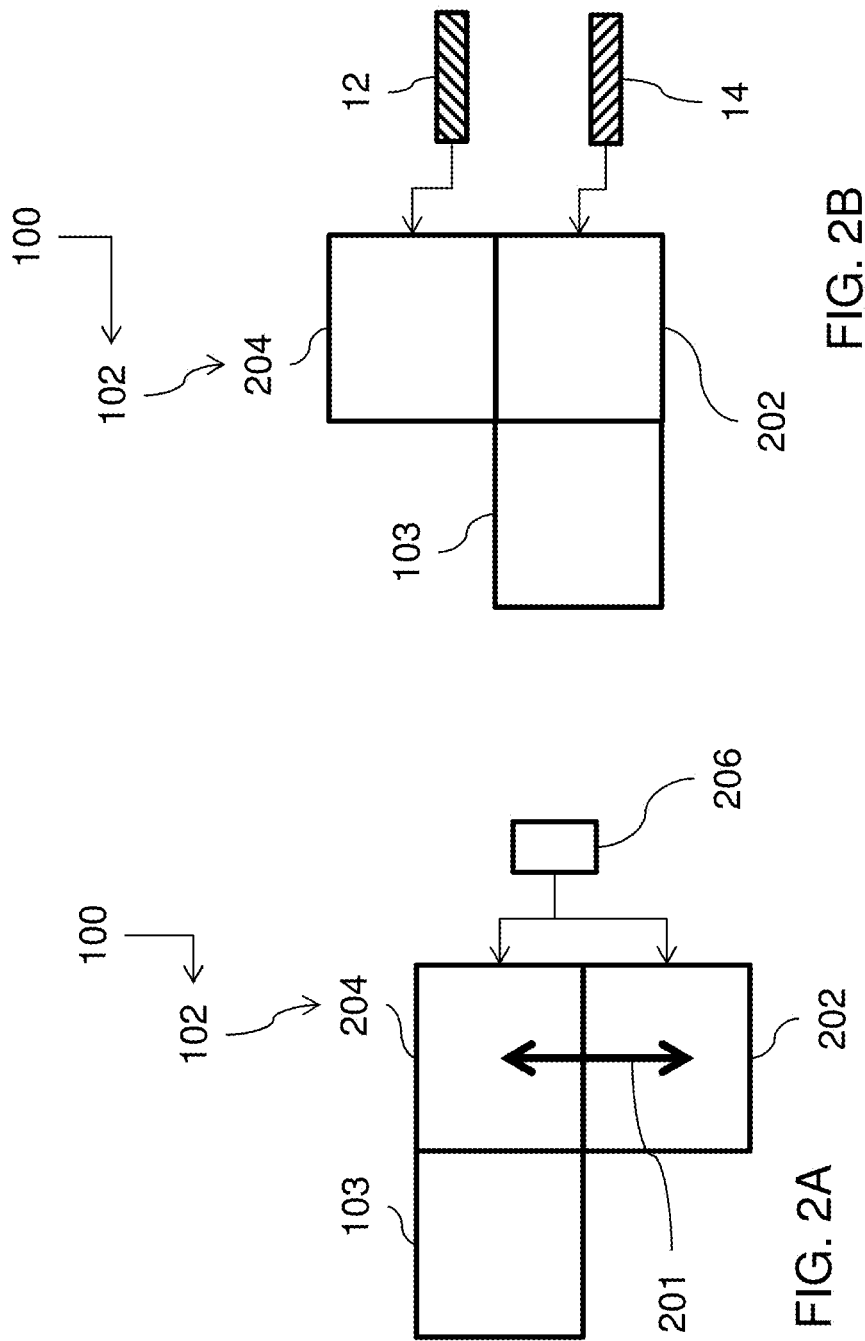

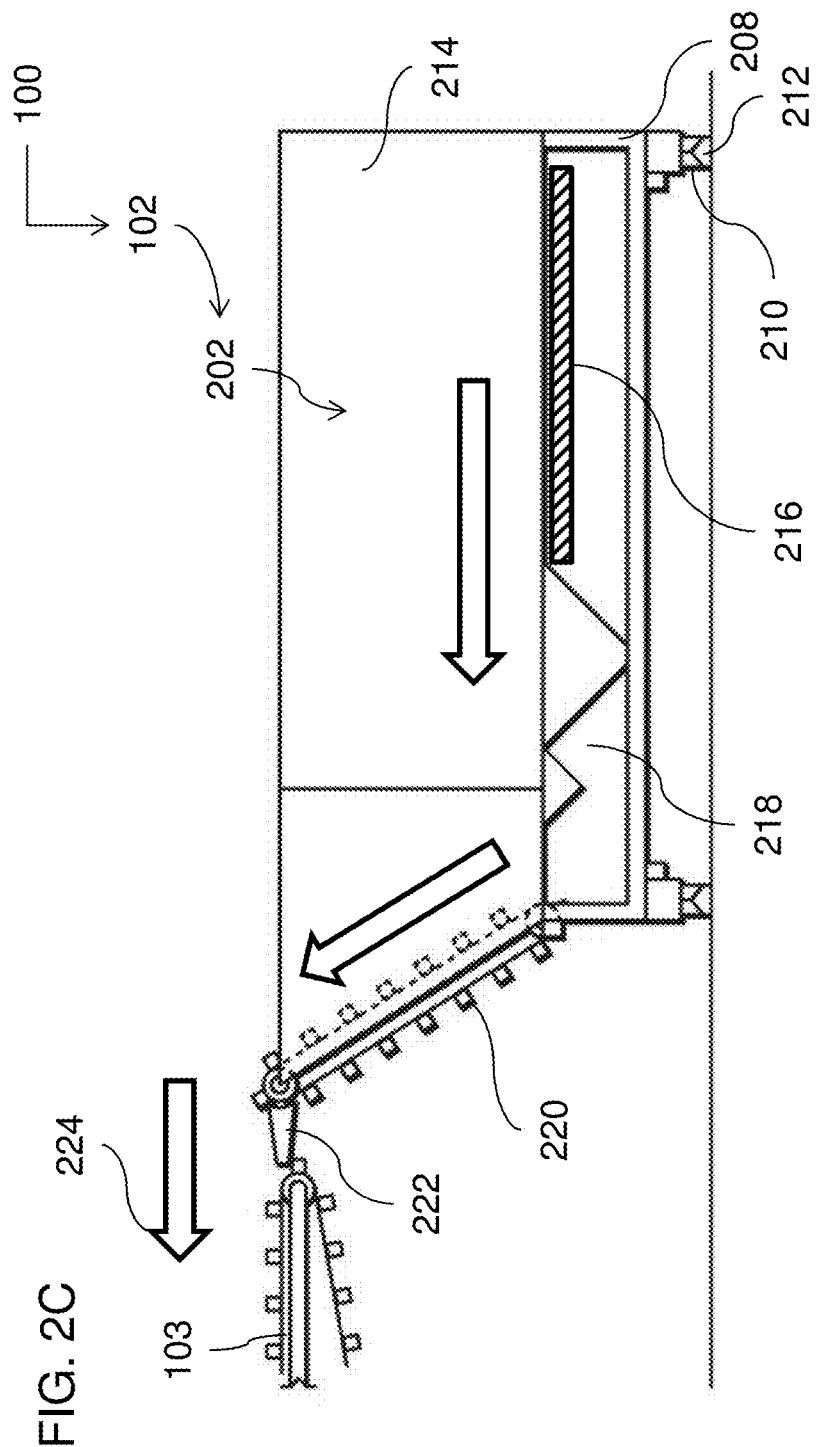

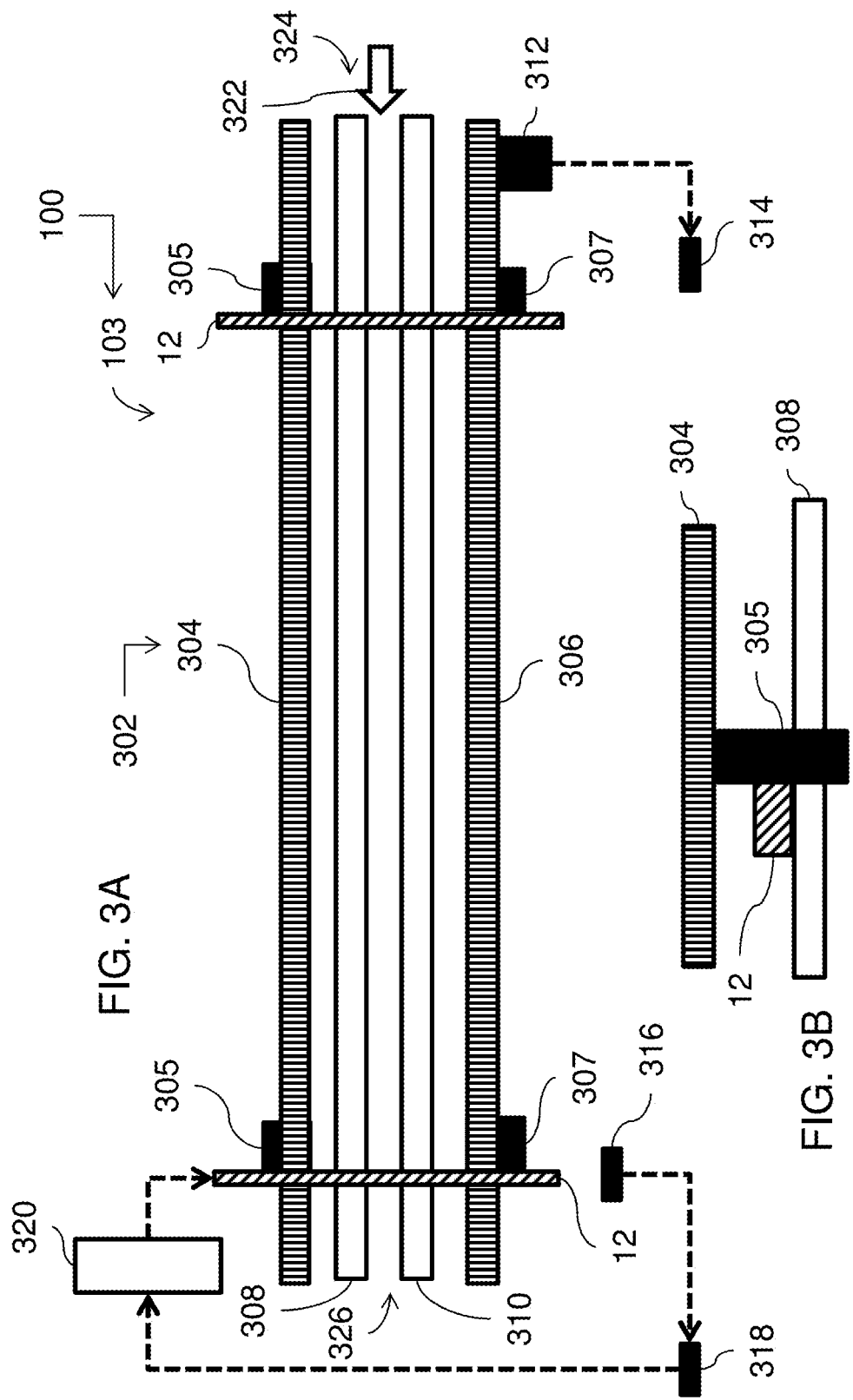

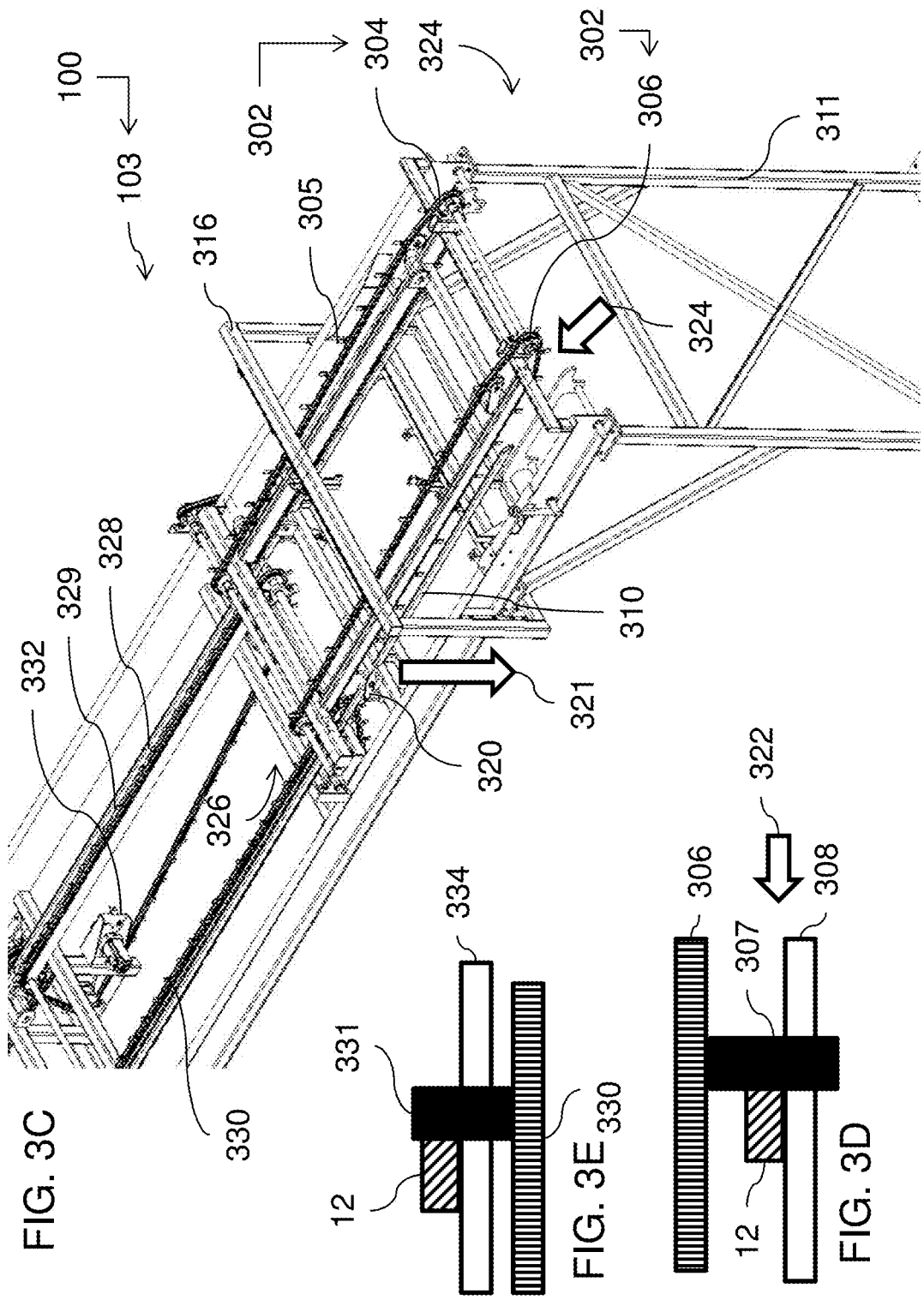

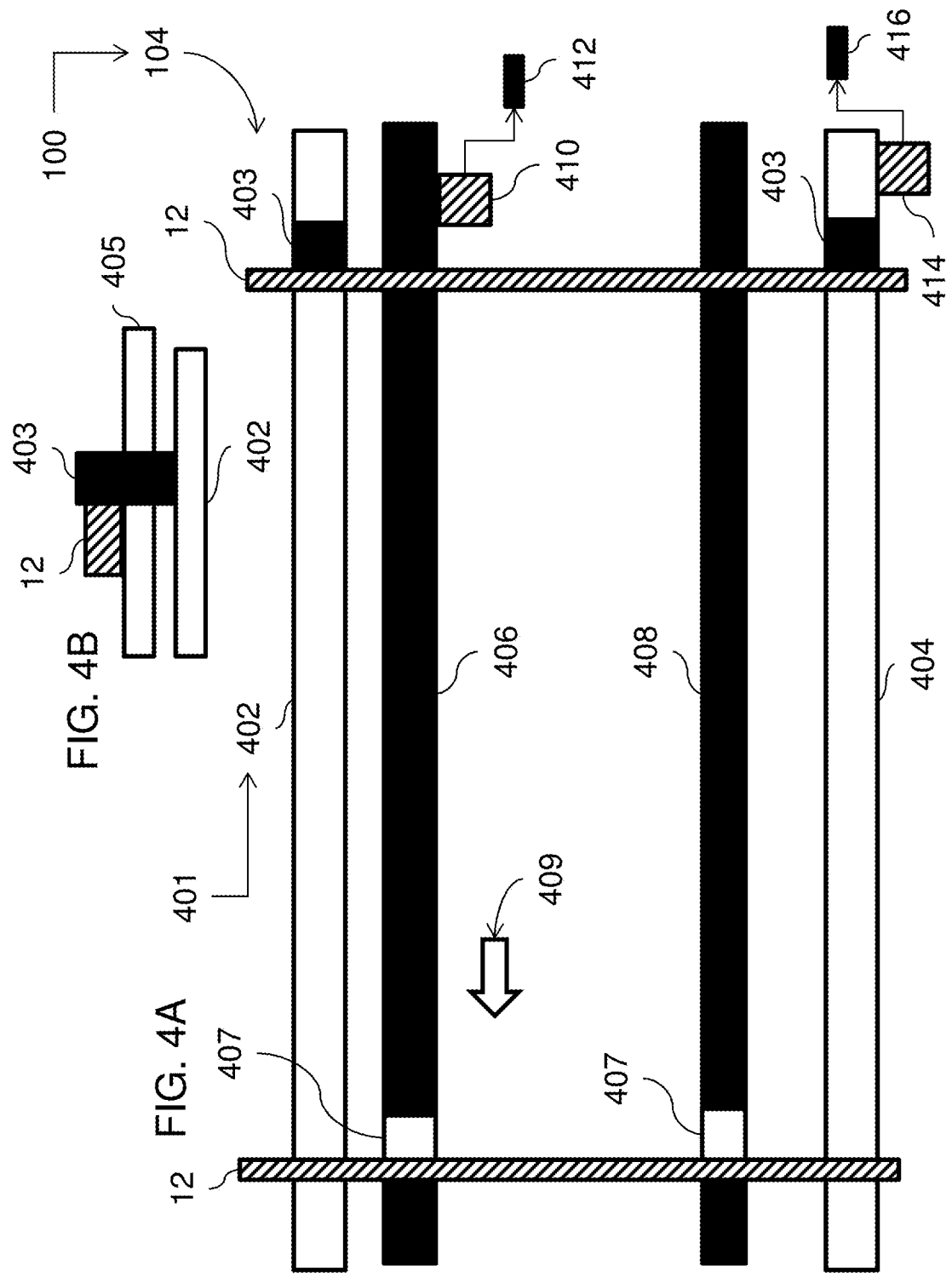

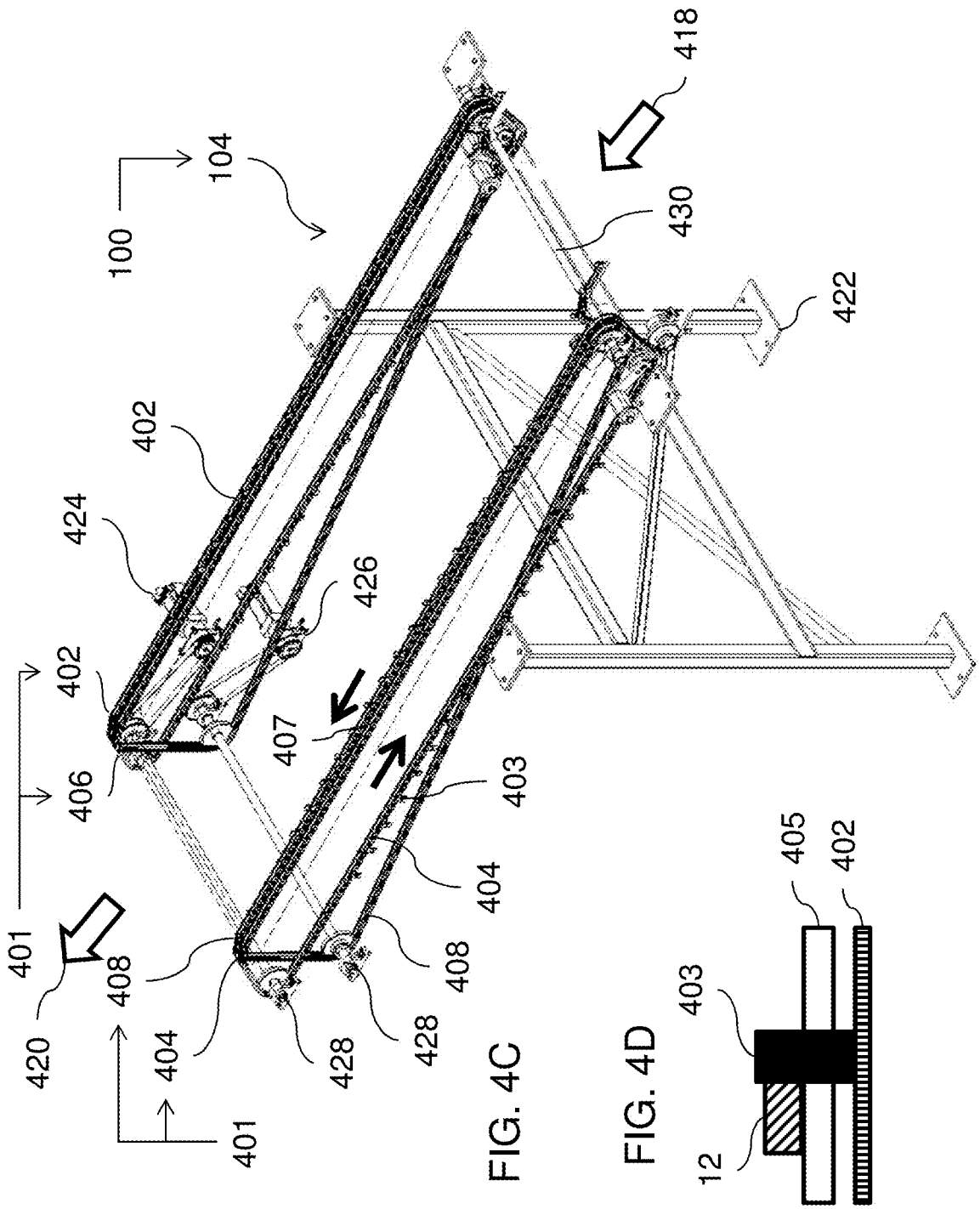

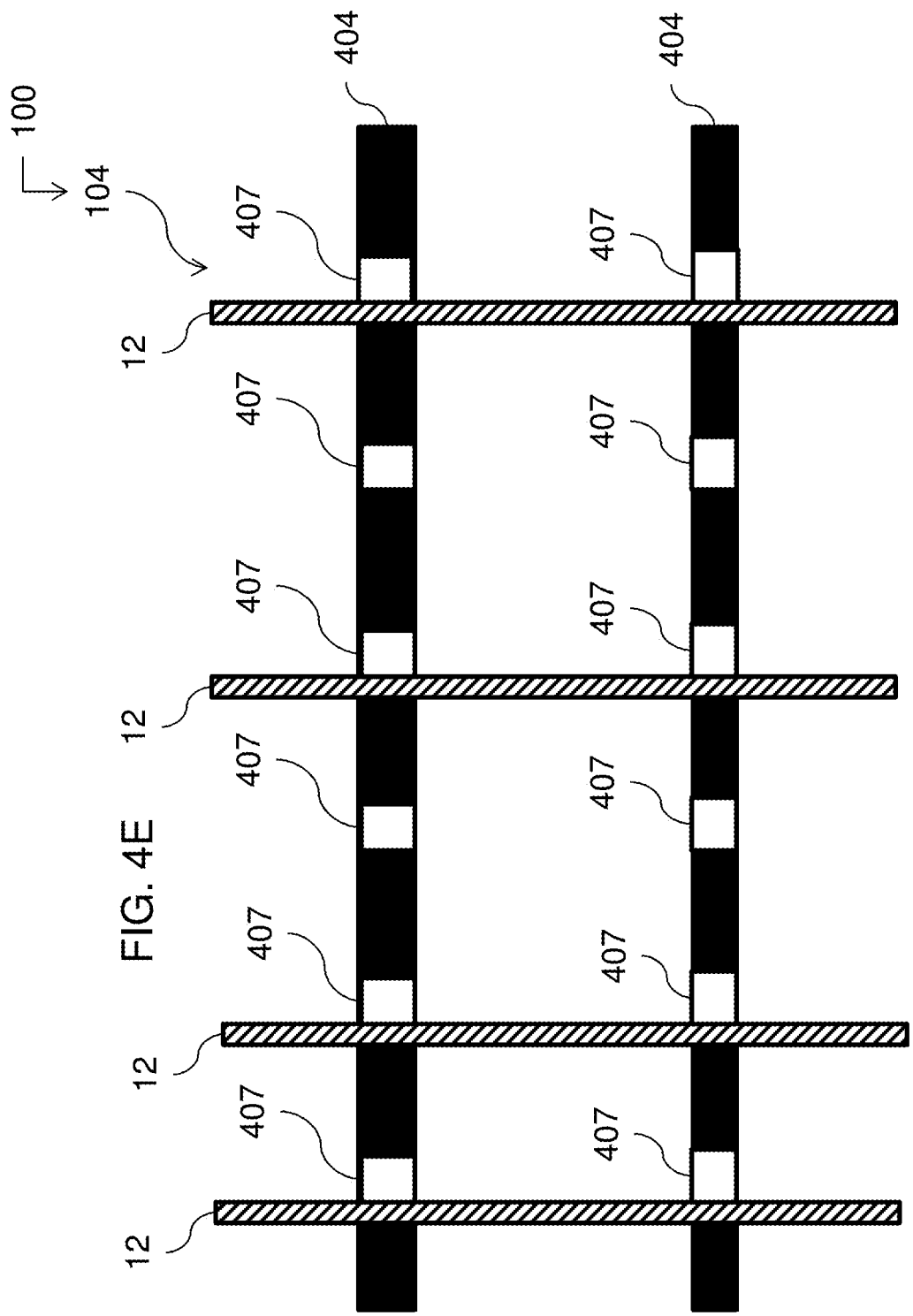

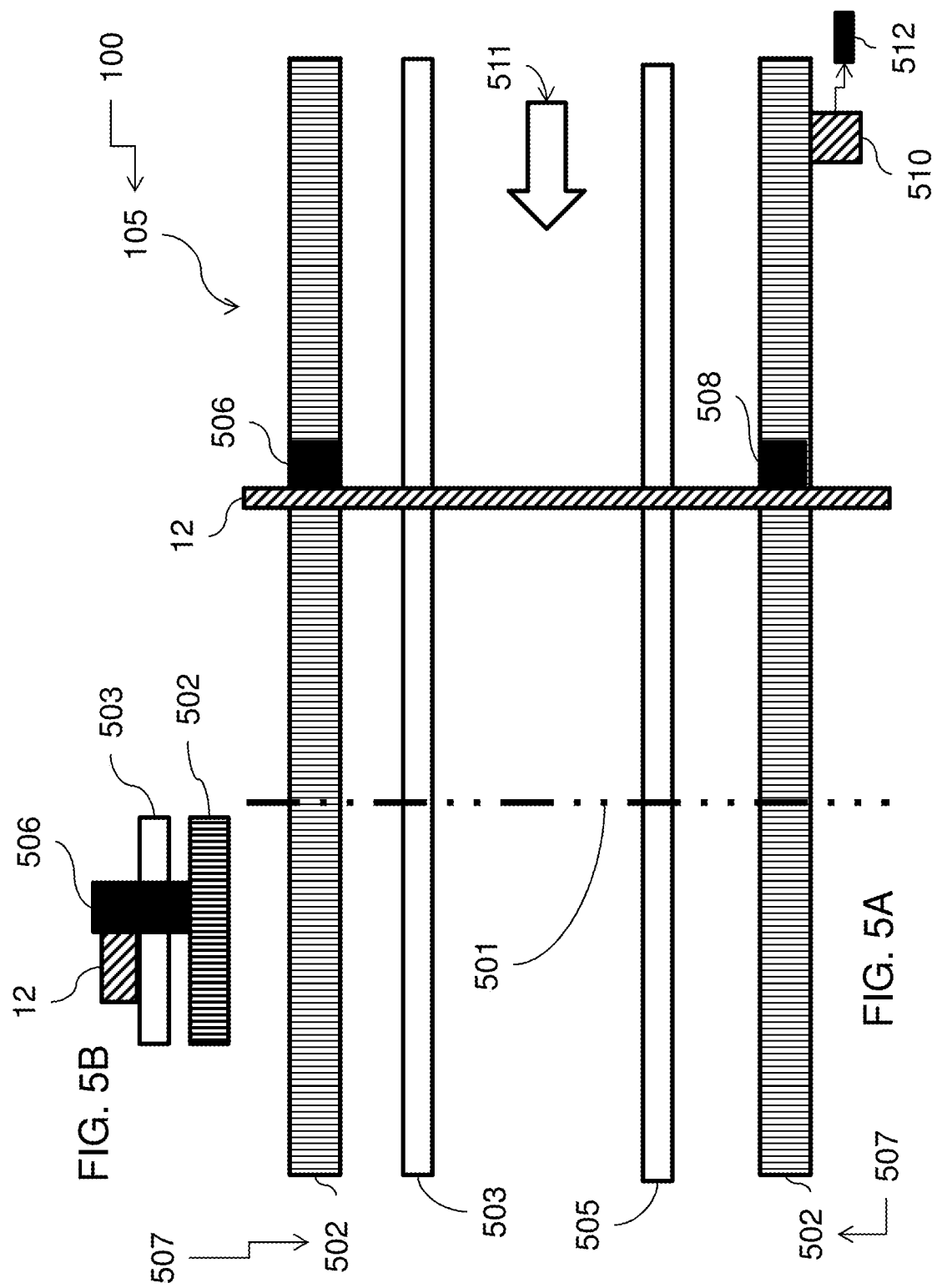

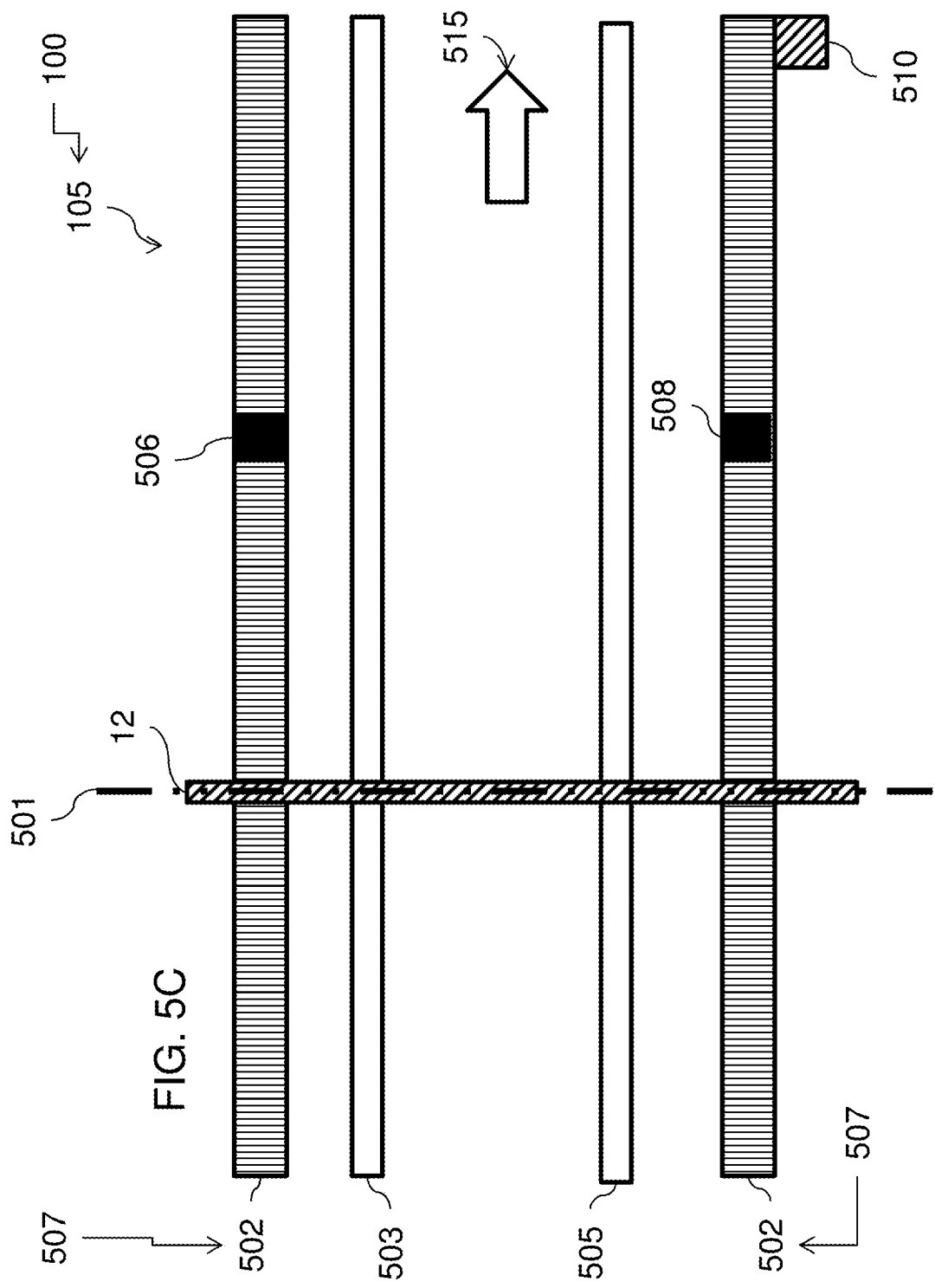

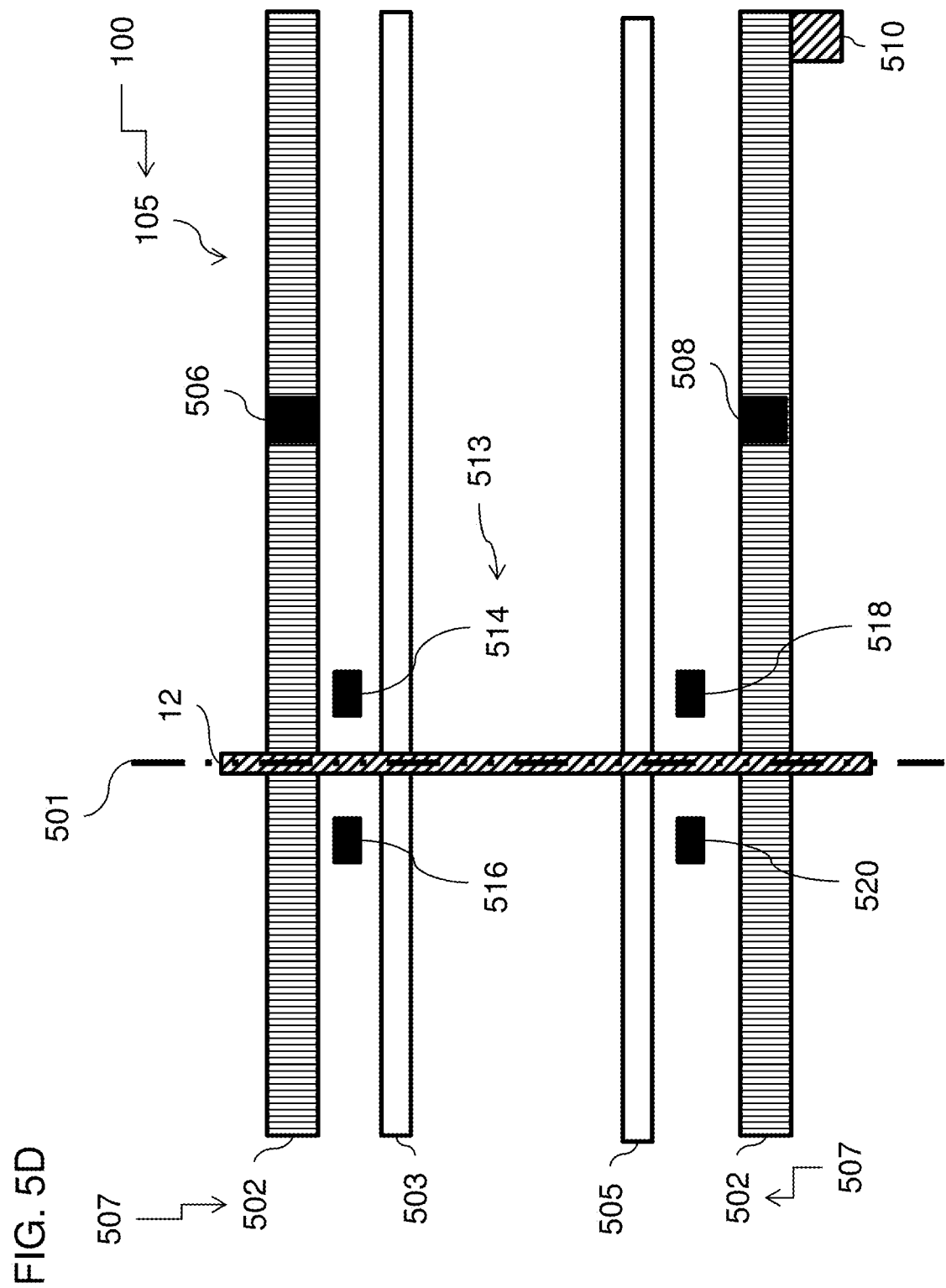

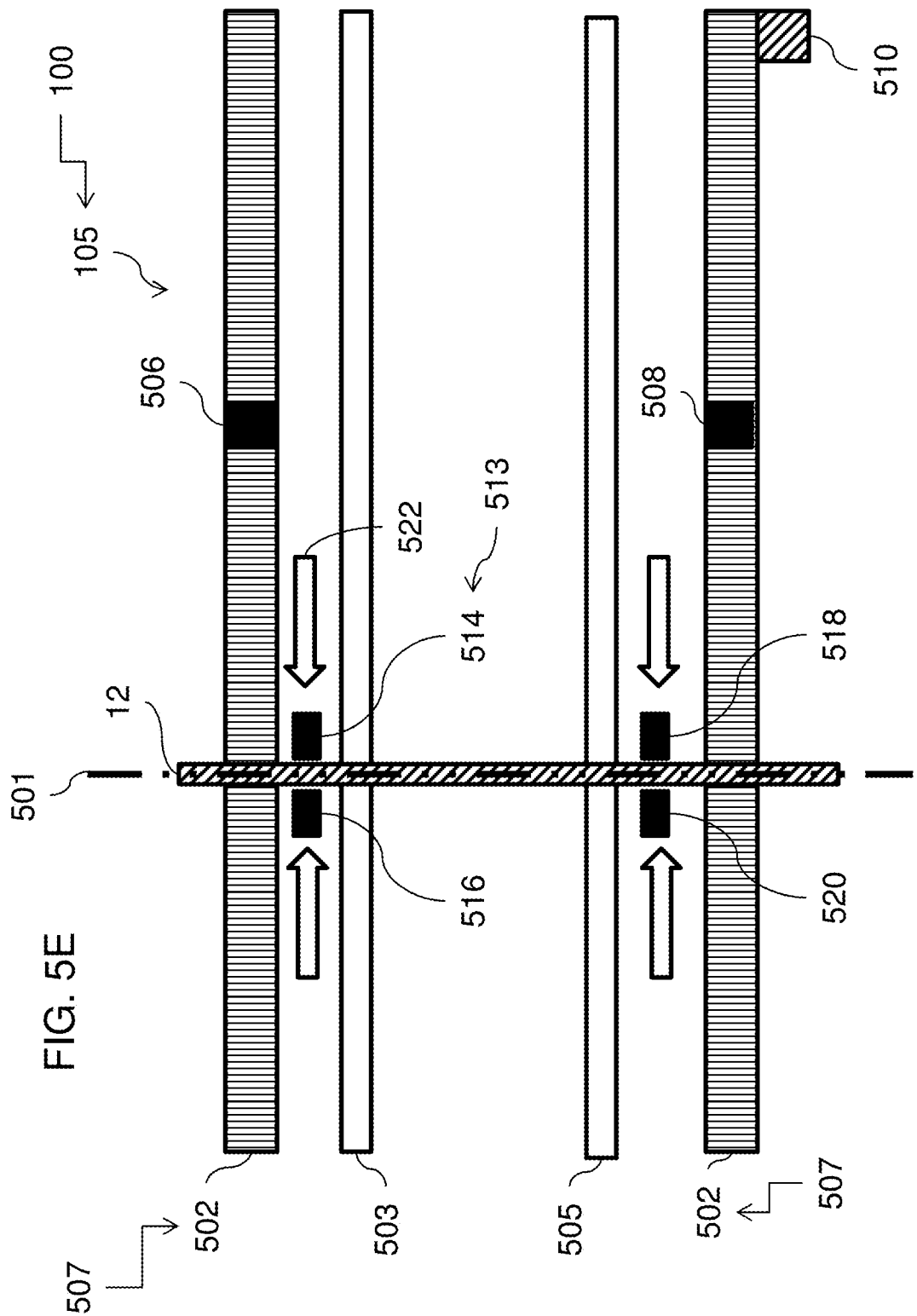

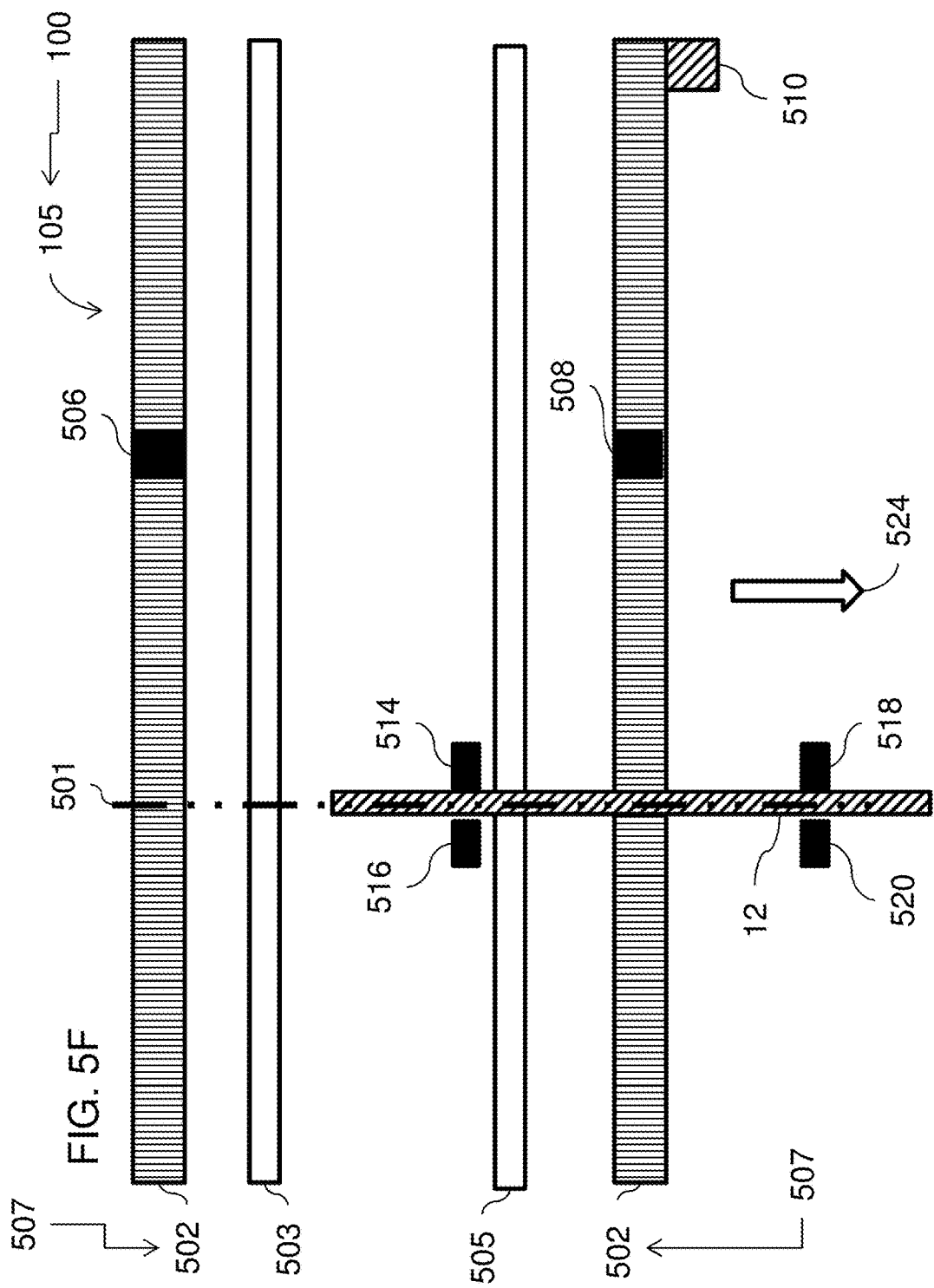

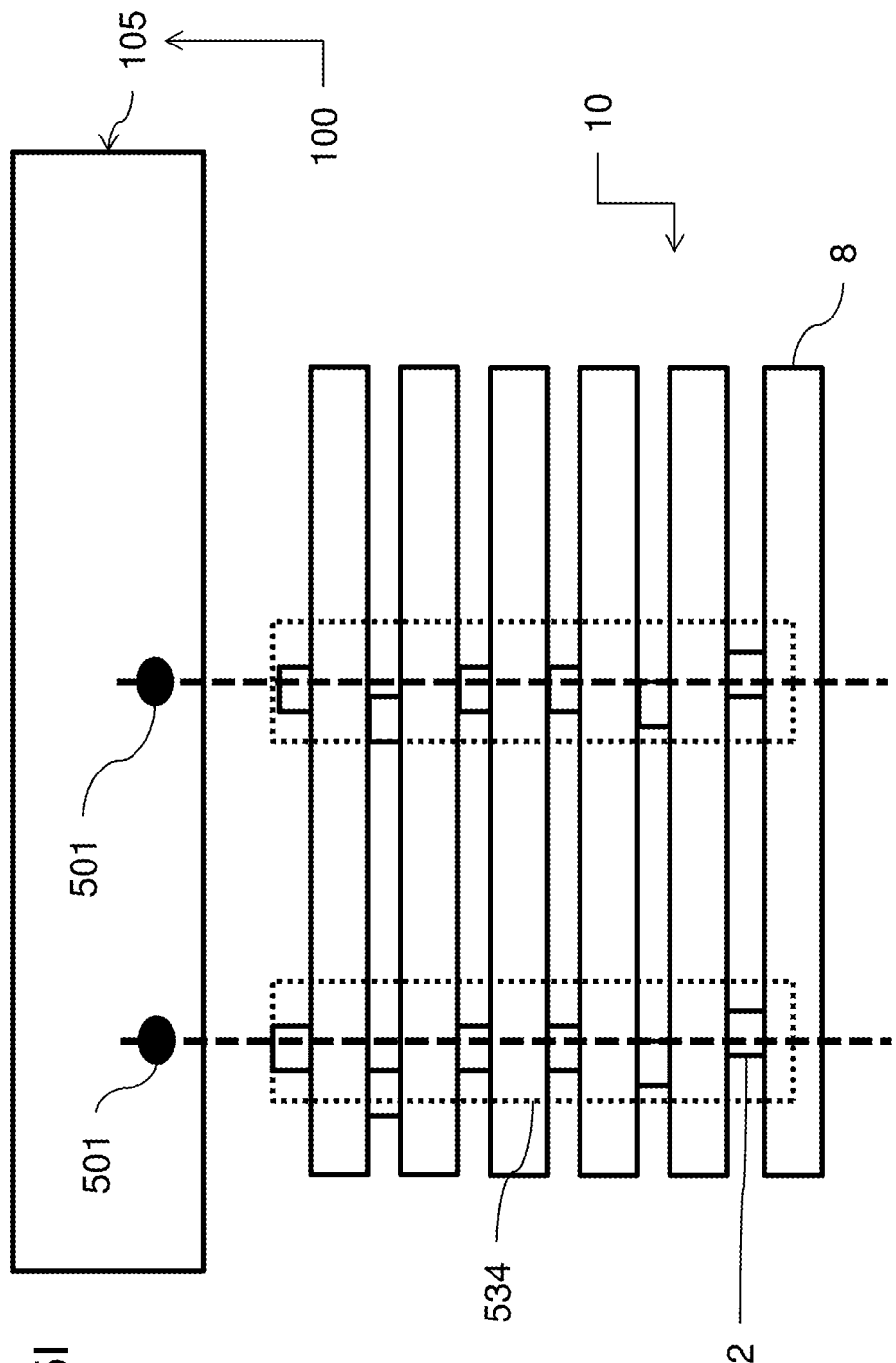

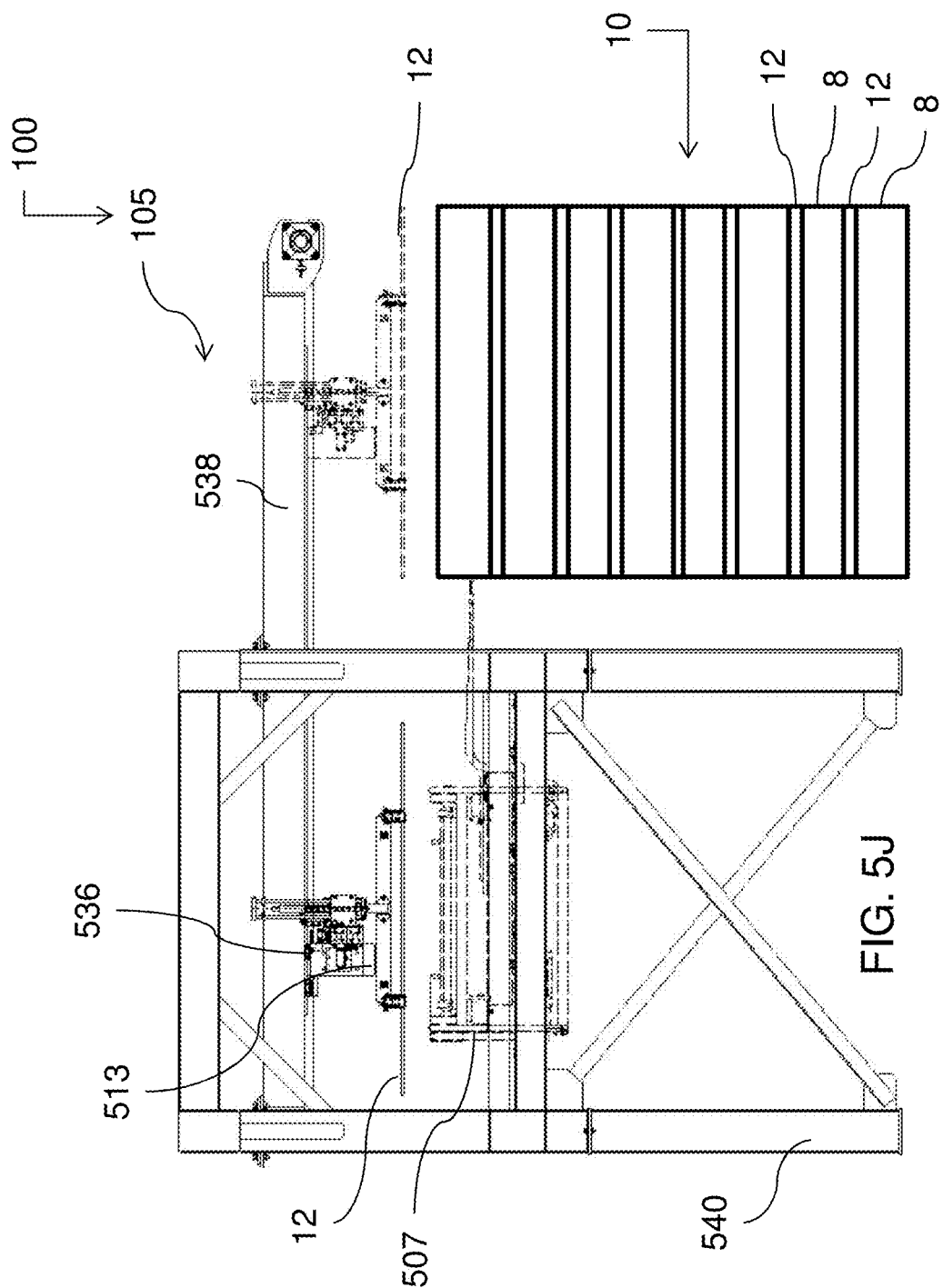

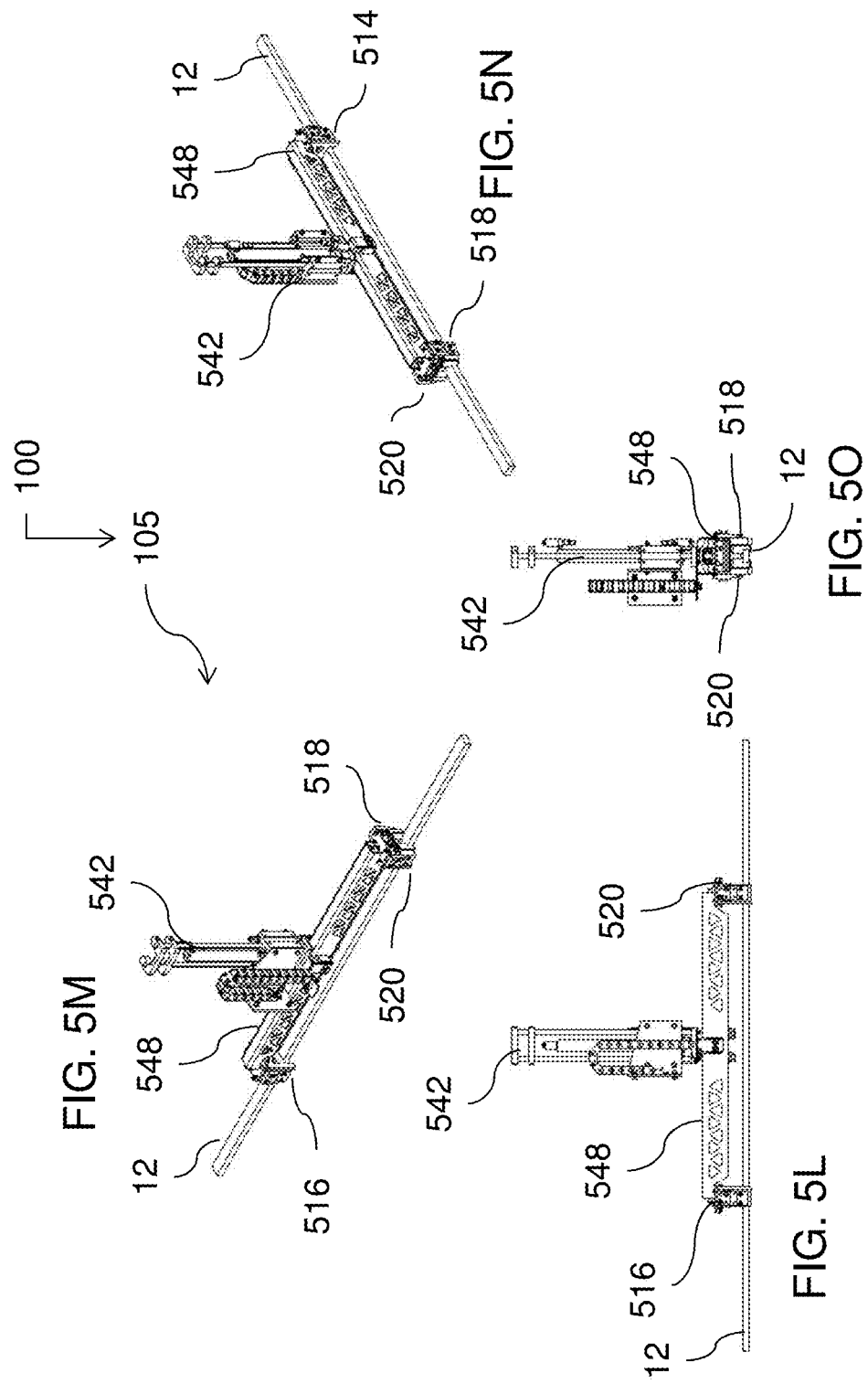

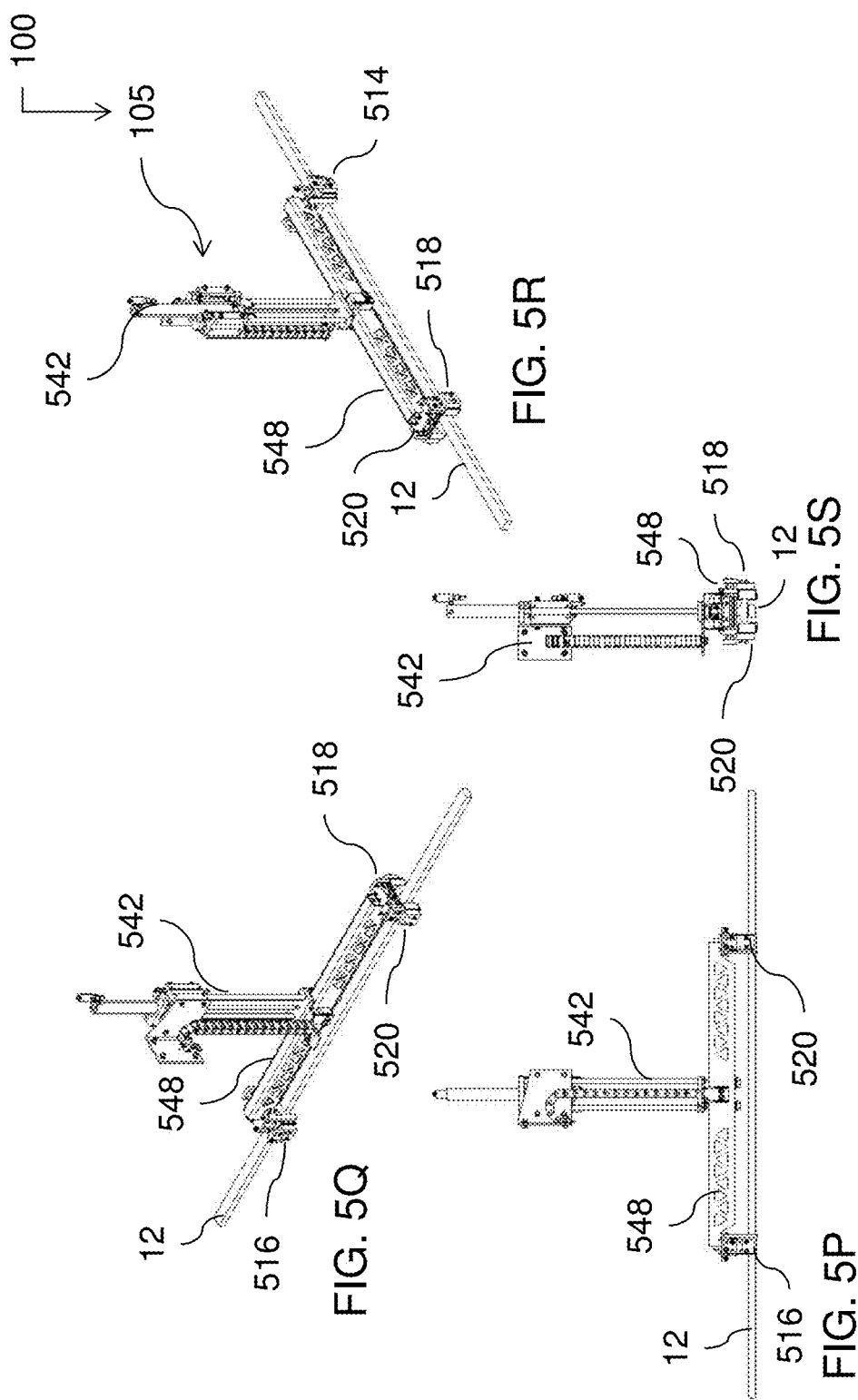

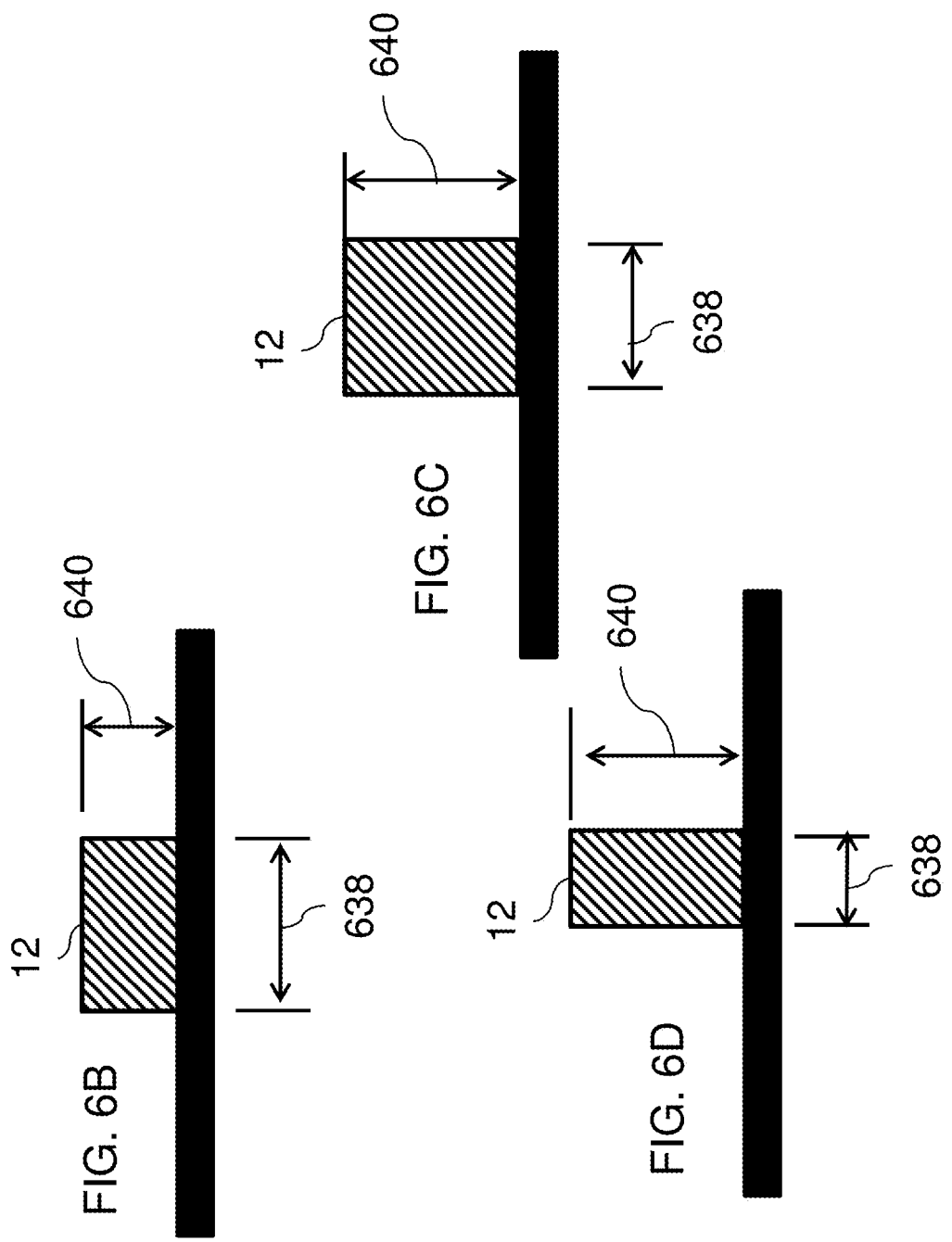

APPARATUS FOR HANDLING ARTICLES

REFERENCE TO CO-PENDING APPLICATIONS

The applicants claim priority benefit to U.S. Provisional application Ser. No. 61/729,751, filed Nov. 26, 2012 and entitled APPARATUS, the entire subject matter of which is incorporated by reference.

The applicants claim priority benefit to U.S. Provisional application Ser. No. 61/775,781, filed Mar. 11, 2013 and entitled APPARATUS FOR CONVEYING STICKERS TO LUMBER STACK, the entire subject matter of which is incorporated by reference.

The applicants claim priority benefit to PCT application serial number PCT/CA2013/000975 filed Nov. 25, 2013, designating the United States, the entire subject matter of which is incorporated by reference.

TECHNICAL FIELD

Aspects generally relate to (and are not limited to) an apparatus configured to handle (convey) items, such as stickers to be placed in a lumber stack (for example).

BACKGROUND

The process of lumber handling has requirements for facilitating the drying of lumber from a higher moisture content to a lower moisture content; the process includes spacing the layers of lumber (in a lumber stack) with items called stickers before the lumber stack is placed in an oven (dryer).

SUMMARY

We, the inventors, have researched a problem associated with wood-processing facilities, of the type (for example) used to process lumber or wood portions. After much study, we believe we have arrived at an understanding of the problem and its solution(s), which are stated below.

Technology has changed sawmill operations significantly in recent years, emphasizing increasing profits through waste minimization and increased energy efficiency as well as improving operator safety. The once-ubiquitous rusty, steel conical sawdust burners have for the most part vanished, as the sawdust and other mill waste are now processed into particleboard and related products, or used to heat wood-drying kilns. Co-generation facilities may produce power for the operation and may also feed superfluous energy onto the grid. While the bark may be ground down for landscaping bark dust, it may also be burned for heat. Sawdust (essentially a waste byproduct) may be used to make particle board or may be pressed into wood pellets for pellet stoves. The larger pieces of wood that are not appropriate for making lumber may be chipped into wood chips and provide a source of supply for paper mills. Wood by-products of the mills may also be used to make oriented strand board (OSB) paneling for building construction, which may be a cheaper alternative to plywood for paneling. It appears that reducing wastage of wood portions, at least in part, is important for reducing costs associated with operating a wood processing facility, such as a saw mill (for example), especially when the lumber includes hardwoods that are expensive to replace when wasted as a result of errors or inadvertent handling and/or manufacturing processes.

In order to mitigate the above, at least in part, in accordance with an aspect of our work, we (the inventors) have developed an apparatus for conveying stickers (or types of stickers) to a lumber stack. The apparatus includes (and not limited to) an interface section including (and not limited to) a conveyor system configured to: (A) interface with an input having an input conveyance stream. Another operation may include (B) interface with an output having an output conveyance stream. Another operation may include (C) receive items from the input at an intake rate in which the items are made available to the input. Another operation may include (D) provide the items to the output at an exit rate in which the items are required to exit from the output.

In order to mitigate the above, at least in part, in accordance with an aspect of our work, we (the inventors) have developed an apparatus including (and not limited to) at least two in-feed sections configured to receive respective stickers, each having corresponding outputs configured to be in selective conveyance communication with a downstream conveyance path leading to a sticker-handling system.

In order to mitigate the above, at least in part, in accordance with an aspect of our work, we (the inventors) have developed an apparatus, including (and not limited to) an alignment mechanism configured to align a sticker conveyed to the alignment mechanism in such a way as to align the sticker along a centerline of the sticker at the at least two centering points.

In order to mitigate the above, at least in part, in accordance with an aspect of our work, we (the inventors) have developed an apparatus, including (and is not limited to) a centering mechanism. The centering mechanism is configured to align a sticker conveyed to the centering mechanism in such a way as to center the sticker at the at least two centering points relative to a reference point.

In order to mitigate the above, at least in part, in accordance with an aspect of our work, we (the inventors) have developed an apparatus, including (and not limited to); an interface section including a conveyor system configured to: (A) interface with an input having an input conveyance stream, (B) interface with an output having an output conveyance stream, (C) receive items from the input at an intake rate in which the items are made available to the input, and (D) provide the items to the output at an exit rate in which the items are required to exit from the output, and (E) convey the items through same path via separate conveyors.

In order to mitigate the above, at least in part, in accordance with an aspect of our work, we (the inventors) have developed an apparatus, including (and not limited to): an interface section including at least two conveyors each being configured to: (A) operate at conveyance rates being independent of each other, (B) receive from an input conveyance stream, and (C) provide to an output conveyance stream.

In order to mitigate the above, at least in part, in accordance with an aspect of our work, we (the inventors) have developed an apparatus, including (and not limited to): an in-feed path being configured to receive at least any one of a first sticker type and a second sticker type; an out-feed path being configured to convey and to place a collection having any one of the first sticker type and the second sticker type to a lumber stack in accordance with a predetermined sticker pattern; and a travel path extending from the in-feed path to the out-feed path, and the travel path being configured to accommodate travel of any one of the first sticker type and the second sticker type from the in-feed path to the out-feed path.

In order to mitigate the above, at least in part, in accordance with an aspect of our work, we (the inventors) have developed an apparatus for conveying stickers to a lumber stack. The apparatus includes (and is not limited to) an in-feed path being configured to receive stickers; an out-feed path being configured to convey and to place a collection of the stickers to the lumber stack in accordance with a predetermined sticker pattern; a travel path extending from the in-feed path to the out-feed path, and the travel path being configured to accommodate travel of the stickers from the in-feed path to the out-feed path; a fatal ejection path extending from the travel path, and the fatal ejection path is configured to eject an instance of the stickers in response to a sensor detecting a fatal dimension error associated with an instance of the stickers, and the instance of the sticker having the fatal dimension error is not usable for feeding to the in-feed path; and a non-fatal ejection path extending from the travel path, and the non-fatal ejection path is configured to eject an instance of the stickers in response to a sensor detecting a non-fatal dimension error associated with the instance stickers, and the instance of the sticker having the non-fatal dimension error, but is mis-oriented, is usable for feeding to the in-feed path.

In order to mitigate the above, at least in part, in accordance with other aspects of our work, we (the inventors) have developed and provided other aspects as described in the claims and/or the description and/or depicted in the drawings.

Other aspects and features of the non-limiting embodiments may now become apparent to those skilled in the art upon review of the following detailed description of the non-limiting embodiments with the accompanying drawings.

BRIEF DESCRIPTION OF DRAWINGS

The non-limiting embodiments may be more fully appreciated by reference to the following detailed description of the non-limiting embodiments when taken in conjunction with the accompanying drawings, in which:

FIGS. 1A to 1D depict example views of an apparatus.
FIGS. 2A to 2D depict example views of an in-feed section of the apparatus of FIG. 1A;
FIGS. 3A to 3E depict example views of a quality-control section of the apparatus of FIG. 1A;
FIGS. 4A to 4E depict example views of an interface section of the apparatus of FIG. 1A;
FIGS. 6B, 6C, 6D depict example cross-sectional profiles of instances of a sticker used in the apparatus of FIG. 6A.

Figure 1B:
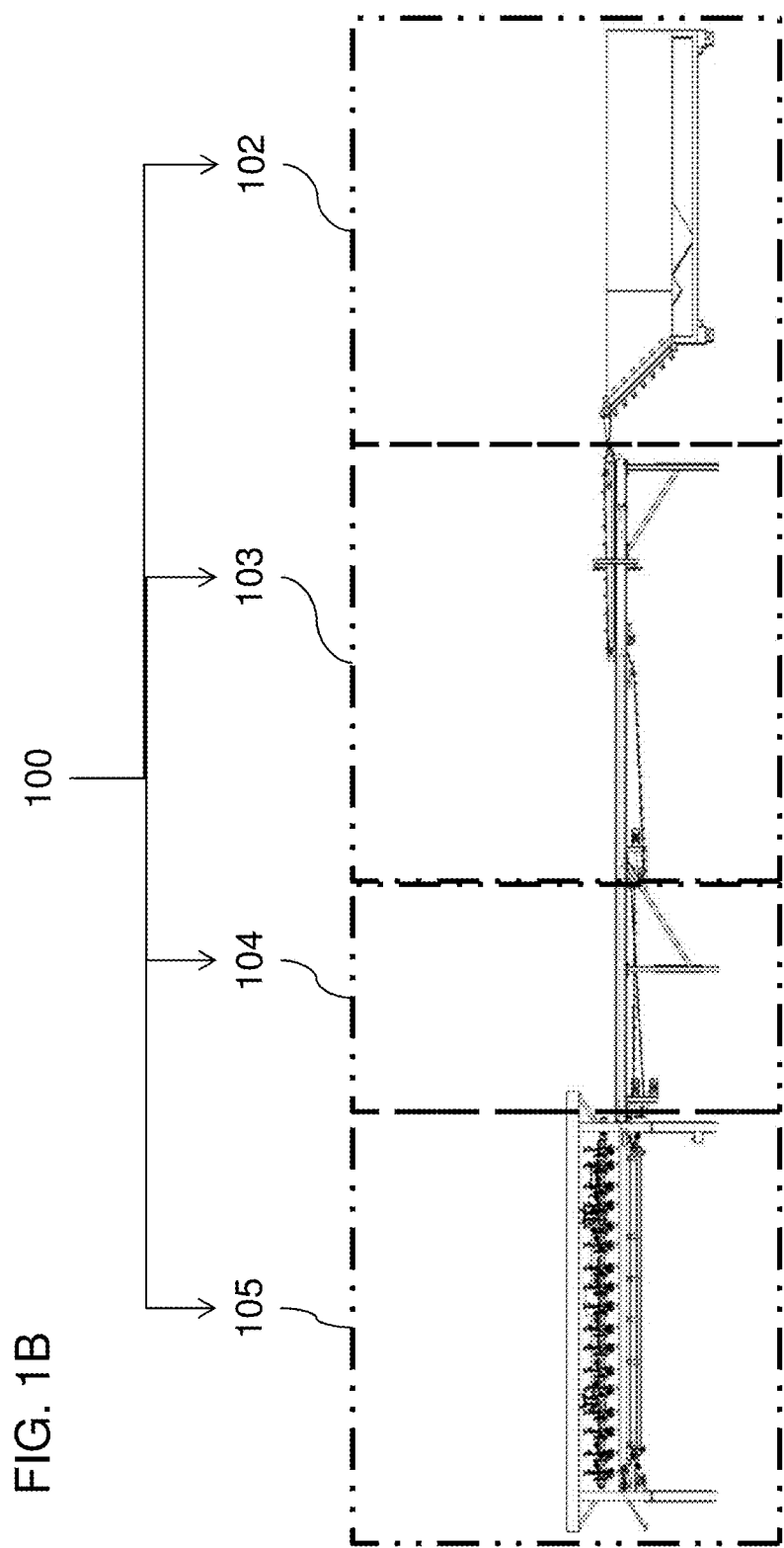

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF EXEMPLARY EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise.

FIGS. 1A to 1D depict the example views of the apparatus 100.

FIG. 1A depicts a schematic example of the apparatus 100. The apparatus is for conveying stickers (or types of stickers) to a lumber stack 10. A lumber stacker 6 is configured to place layers including lumber portions 8. The apparatus 100 is configured to place layers of stickers onto each layer of lumber portions 8. Stickers are elongated pieces of lumber or other suitable material. Operation of the lumber stacker 6 and of the apparatus 100 are configured in such a way that the layers of lumber portions 8 and the layers of instances of the sticker 12 are placed one on top of the other in an alternating fashion in such a way that the alternating layers pile so as to build a lumber stack 10. The apparatus 100 is generally configured to handle the stickers in such a way as to receive them and then to place the stickers in the lumber stack 10.

The lumber stack 10 is to be placed into an oven (known and not fully described herein). The lumber stacker 6 is a known device, and is not described in detail. The oven bakes the lumber stack 10 in such a way to remove an amount of moisture from the lumber stack 10. The layers of lumber portions 8 are green (that is, freshly cut portions of lumber), and the oven is used to remove moisture from the lumber so as to stabilize the lumber for subsequent use in manufacturing furniture or other lumber based products. The stickers are reused in this process. In the lumber stack 10, the stickers are placed in a spaced apart arrangement from each other so that air may flow through while the lumber stack 10 is placed and is dried in the oven. However, over time and reuse, the stickers become worn out and/or change shape (as to become deformed). It is preferred to use stickers that are aligned straight along their longitudinal axis when the stickers are placed in the lumber stack 10. However, eventually old and worn out instances of the sticker are (eventually) removed from further use by or in the apparatus 100. For the case where the stickers are misshaped or lumber portions 8 deformed badly enough, the lumber stack 10 may not properly dry in the oven; that is, the lumber portions 8 may become inadvertently warped and unfortunately not usable for the purposes of manufacturing other wood based products, such as furniture, etc. For the case where the lumber portions 8 include hardwood lumber, the expense is even more pronounced on account of the relatively higher cost of hardwood lumber in comparison to softwood lumber. But on the other hand, there is a cost nonetheless associated with scrapping softwood lumber for the case where softwood lumber becomes inadvertently warped in the oven. It would be advantageous to reuse those stickers classified as being acceptable to the degree that once they are placed in the lumber stack 10, the reused stickers reduce the occurrence or possibility of wastage as a result of warped boards that may otherwise result from using unacceptable stickers.

The apparatus 100 is configured in such a way that the apparatus 100 receives the sticker 12 representing a first type of sticker, and a sticker 14 representing a second type of sticker. The sticker 12 of the first type includes a shape that has substantially straight or flat faced surfaces on all sides of the sticker 12. The sticker 12 may be usable in lumber stack 10 having instances of the lumber portions 8 including softwood lumber. Sticker 14 may include a shape that has a fluted relief positioned on opposite sides of the body of the sticker 14, and this type of sticker 14 is used with instances of the lumber portions 8 that include hardwood pieces.

As depicted, the apparatus 100 includes (and is not limited to): an in-feed section 102, a quality-control section 103, an interface section 104, and an out-feed section 105. It will be appreciated that instances of the in-feed section 102, the quality-control section 103, the interface section 104, and the out-feed section 105 may be sold separately or as an entire collection of sections as may be required. For example, for the case where a manufacturer or a wood processor requires all of the sections of the apparatus 100, then all of the sections of the apparatus 100 may be supplied in this case. For the case where a manufacturer wants to purchase a selected section (or sections) of the apparatus 100, then the selected section or sections of the apparatus 100 may be manufactured and shipped (sold) to the manufacturer as separate sections for this case and may be used as required by the manufacturer to suit their needs. By way of example, there may be a case where the manufacturer may require only the interface section 104; in this case, the apparatus (100) includes the interface section 104 without the other sections. The manner in which the manufacturer may use the interface section 104 is left at the discretion of the manufacturer. It may be possible for the manufacturer to use the interface section 104 for processing other types of wood products, such as logs, boards, planks (that is, items not limited to stickers per se), and in this case, the interface section 104 may be adapted in such a way to accommodate other types of items (either wood based items or non-wood based items) as may be required or desired by the manufacturer. For example, for the case where the manufacturer already owns a feeding system and therefore has no interest in the in-feed section 102, the quality-control section 103, and the interface section 104, but is interested in using the out-feed section 105, then in this case the apparatus 100 includes the out-feed section 105, and the manufacturer then installs the out-feed section 105 to their existing systems and processes accordingly.

According to an example, the apparatus 100 includes (and is not limited to): an in-feed section 102, a quality-control section 103, an interface section 104, and an out-feed section 105. The in-feed section 102 is connected to the quality-control section 103. The quality-control section 103 is connected to the interface section 104. The interface section 104 is connected to the out-feed section 105.

The remaining FIGS. depict additional examples of the aspects (details) of the various sections of the apparatus 100.

The lumber stack 10 includes alternating layers or instances of lumber portions 8 and instances of sticker 12; either sticker 12 or sticker 14 depending on the operation of the in-feed section 102. A lumber stacker 6 is configured to place (stack) layers of lumber portions 8 to the lumber stack 10 while the out-feed section 105 of the apparatus 100 is configured to place layers of stickers to the layers of the lumber portions 8 of the lumber stack 10. The lumber stacker 6 is known and therefore not described here. In this manner, the lumber stack 10 is constructed. Once the lumber stack 10 has been constructed, the lumber stack 10 is placed in an oven and baked for a predetermined amount of time. The layers of lumber portions 8 are green and the oven is used to remove moisture from the lumber portions 8 before the lumber is further processed, for example, into finished floor boards. After the lumber stack 10 is cooked, the stickers are removed from the lumber stack 10 and placed back into the in-feed section 102 of the apparatus 100, and are subsequently reused in the process of assembling another stack of lumber.

FIG. 1B depicts a side view of the example of the apparatus 100. The dimensions of the sections of the apparatus (100) may be configured to fit a particular foot print as required by the manufacturer (end user).

Figure 1C:
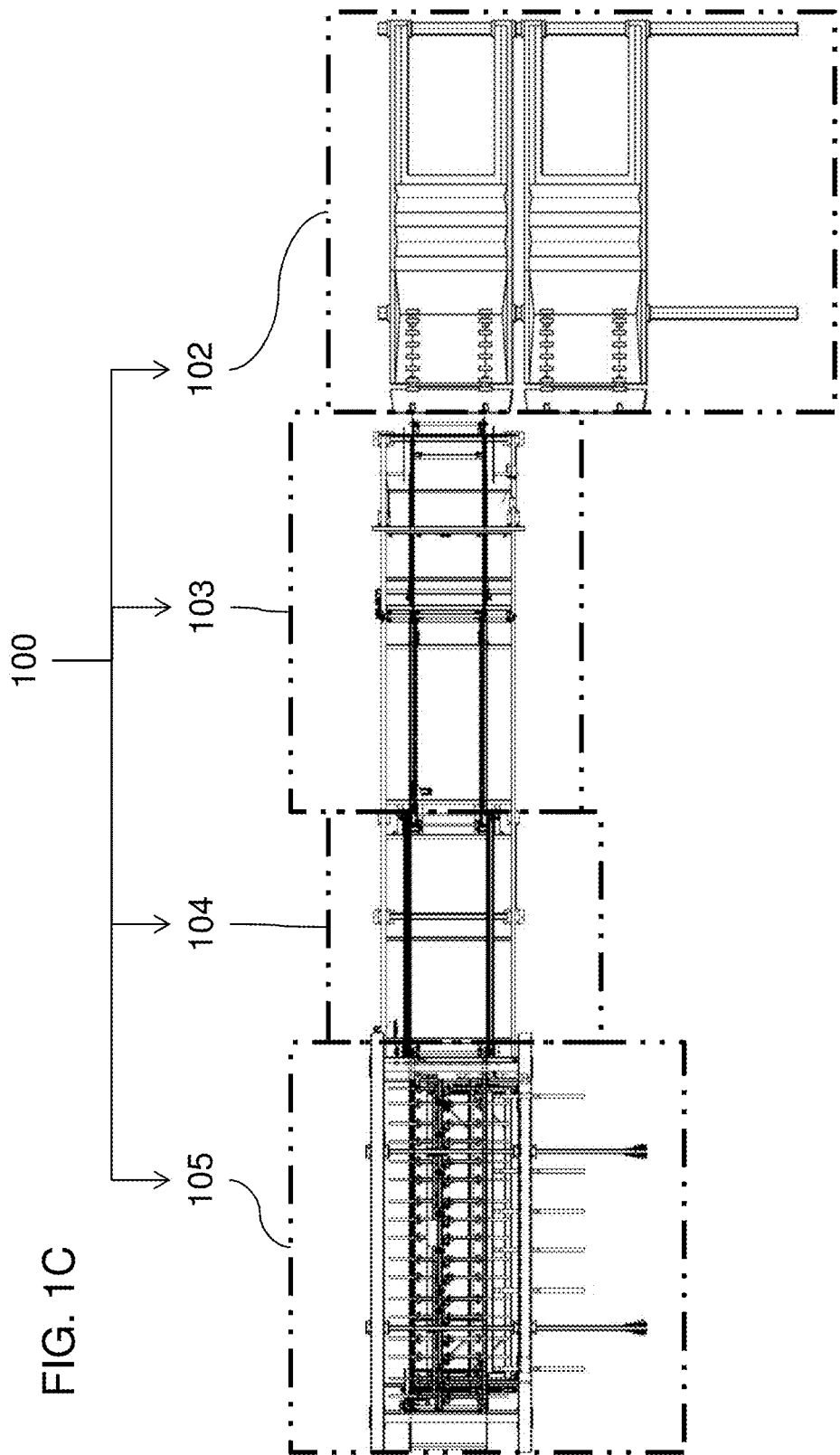

FIG. 1C depicts a top view of the example of the apparatus 100.

Figure 1D:
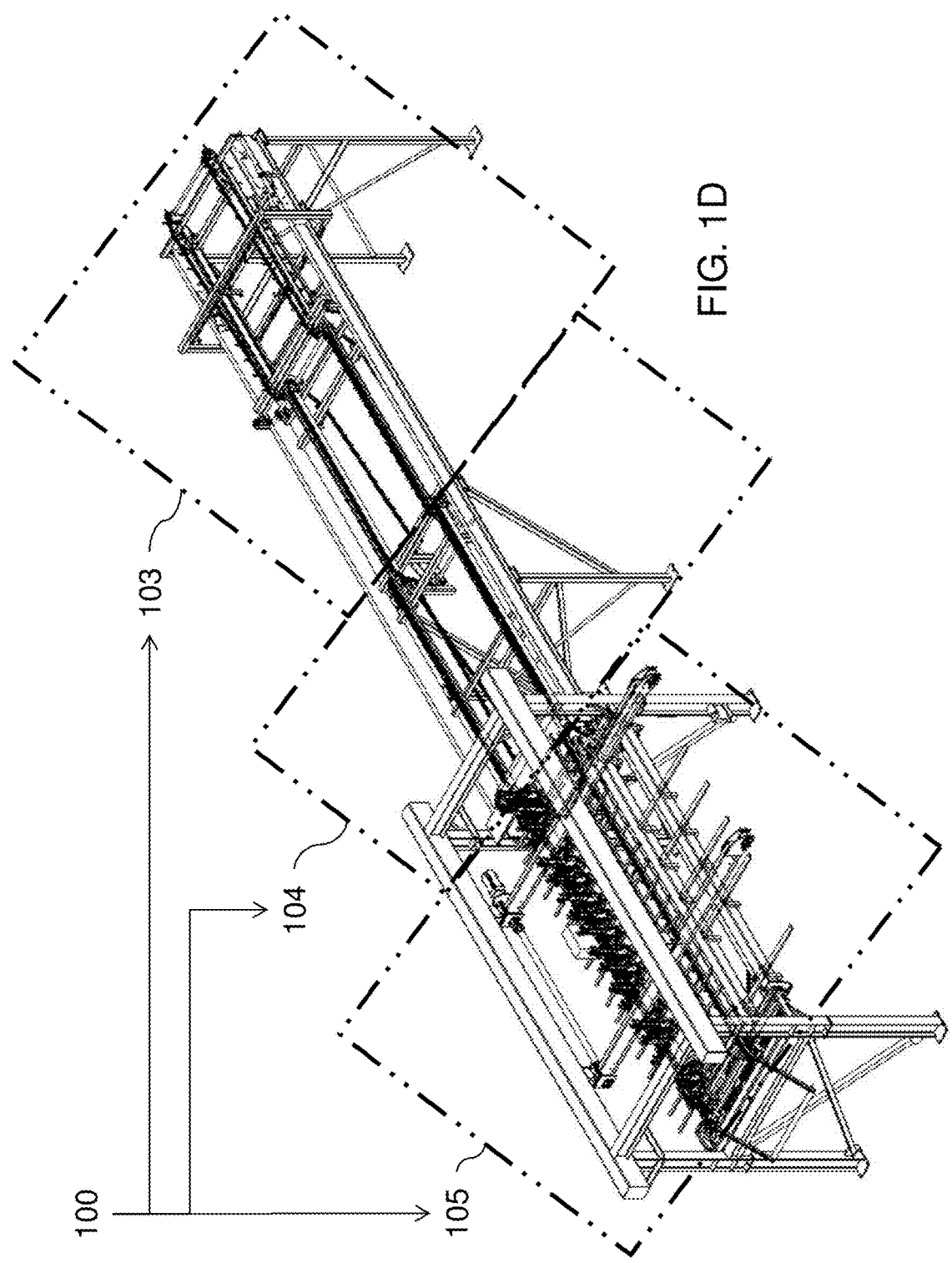

FIG. 1D depicts a perspective view of the example of the apparatus 100.

FIGS. 2A to 2D depict the views of the in-feed section 102 of the examples of the apparatus 100 of FIG. 1A.

FIG. 2A depicts a schematic view the example of the in-feed section 102. By way of example, the in-feed section 102 includes (and is not limited to): a combination of a first feed section 202, and a second feed section 204. It will be appreciated that the in-feed section 102 may include any number of the feed sections that may (or may not) be similar to the first feed section 202. For the sake of providing a simple example, two feed sections are depicted. The first feed section 202 is configured to receive the sticker 12, and the second feed section 204 is configured to receive the sticker 14. Each feed section may be configured to dispense a particular type of sticker to the apparatus 100. For the case where the sticker 12 is required, the in-feed section 102 is adjusted in such a way that the first feed section 202 is engaged, while the second feed section 204 is disengaged, so as to deliver (convey or feed) the sticker 12 to the downstream section of the apparatus 100. For the case where the sticker 14 is required, the in-feed section 102 is adjusted or manipulated in such a way that the second feed section 204 is engaged, while the first feed section 202 is disengaged, so as to deliver or feed the sticker 14 to the downstream section of the apparatus 100. It will be appreciated that the in-feed section 102 may be sold separately from the remaining sections of the apparatus 100. The second feed section 204 is depicted in the in-line position while first feed section 202 is depicted in the off-line position. In the in-line position, the second feed section 204 is enabled so as to feed the instances of the sticker 14 to the downstream section, which as depicted is the quality-control section 103. In the off-line position, the first feed section 202 is on standby ready to be engaged or enabled so as to deliver the sticker 12 as may be required. A direction 201 indicates the direction of travel of the in-feed section 102. According to an option, the quality-control section 103 is configured to remain stationary regardless of whether the in-feed section 102 is movable or not movable relative to the quality-control section 103.

A control system 206 is configured to control which of the first feed section 202 and the second feed section 204 is enabled and selected in such a way to feed items to the downstream sections.

FIG. 2B depicts another schematic view of the example of the example of the in-feed section 102. In accordance with FIG. 2B, the control system 206 is configured to move the second feed section 204 to the off-line position, and to move the second feed section 204 into the in-line position.

Figure 2D:
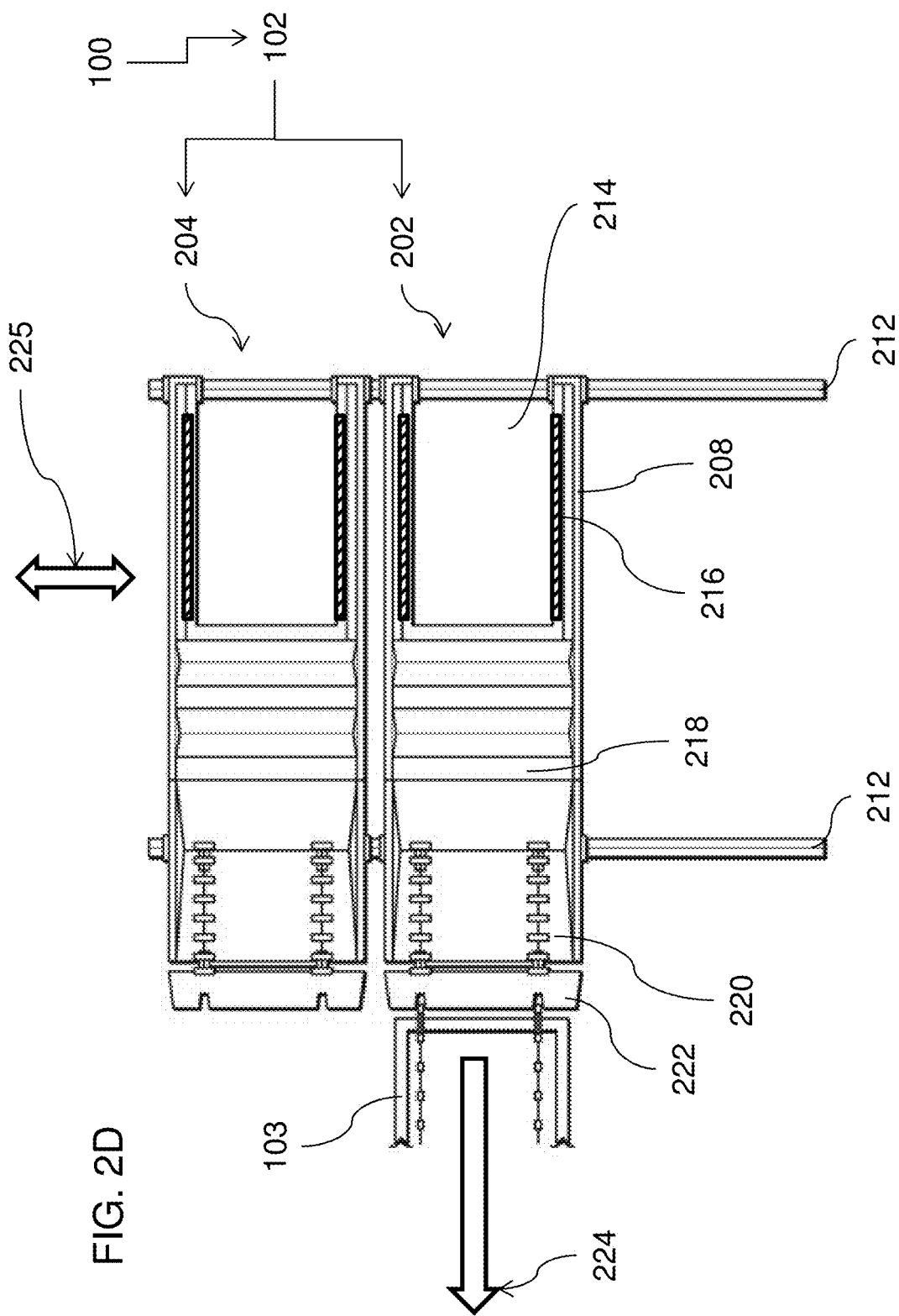

FIG. 2C depicts a side view of a partial cutaway of the in-feed section 102. In accordance with FIG. 2D (by way of example), the first feed section 202 of the in-feed section 102 includes (and is not limited to): a frame assembly 208, a wheel assembly 210, a track assembly 212, a hopper assembly 214, a deep-pile chain assembly 216, a primary unscrambler 218, a secondary unscrambler 220 (may include singulation function), and a bridge assembly 222.

The wheel assembly 210 is operatively connected to the frame assembly 208, and extends downwardly therefrom. The track assembly 212 is positioned on the ground, and is configured to interact with the wheel assembly 210. The hopper assembly 214 is supported by the frame assembly 208. The hopper assembly 214 is configured to receive instances of the sticker 12, in any manner (unorganized or in a scrambled state). The deep-pile chain assembly 216 is positioned in the hopper assembly 214 in such a way so as to convey the instances of the sticker 12 toward the primary unscrambler 218. The primary unscrambler 218 is configured to move and to unscramble the instances of the sticker 12 as the instances of the sticker 12 are moved toward the secondary unscrambler 220. The secondary unscrambler 220 is configured to further unscramble and to singulate the instances of the sticker 12 as the stickers are moved further toward the bridge assembly 222. The secondary unscrambler 220 may be configured to singulate the instances of the sticker 12 if required. The bridge assembly 222 is configured to convey the stickers from the secondary unscrambler 220 to the downstream section, which as depicted is the quality-control section 103. Alternatively, the bridge assembly 222 may be configured to couple to another section of the apparatus 100 for the case where the quality-control section 103 is not used. A direction 224 indicates the movement or flow of the instances of the sticker 12 through the first feed section 202. The second feed section 204 may be substantially identical to that of the first feed section 202 if so required. It will be appreciated that the above provides a description of examples of the first feed section 202.

FIG. 2D depicts a top view of an example of the in-feed section 102. In accordance with FIG. 2D, a direction 225 indicates the direction of movement of the in-feed section 102 relative to the quality-control section 103. The quality-control section 103 is configured to be stationary mounted while the first feed section 202 and the second feed section 204 are configured to be movable relative to the quality-control section 103. It will be appreciated that the first feed section 202 and the second feed section 204 may be stationary positioned if so desired, and a bridge device (not depicted) may be configured to convey stickers from a selected one of the first feed section 202 and the second feed section 204 to the downstream section of the apparatus 100 if so desired.

The following provides additional description for the in-feed section 102.

Generally speaking, the apparatus 100 includes (and is not limited to): at least two feed sections 202, 204 configured to receive respective stickers, each having corresponding outputs being configured to be in selective conveyance communication with a downstream conveyance path leading to an automatic sticker placer mechanism.

According to a variation, the apparatus 100 is further adapted such that the at least two feed sections 202, 204 are each configured to move between an in-line position and an off-line position in such a way that the corresponding outputs of the at least two feed sections 202, 204 alternate with each other between the in-line position and the off-line position.

According to a variation, the apparatus 100 is further adapted such that the corresponding outputs are operable in any one of an in-line position and an off-line position in such a way that: (i) in the in-line position, at least one of the corresponding outputs is in conveyance communication with the downstream conveyance path, and (ii) in the off-line position, the remaining corresponding outputs are not in conveyance communication with the downstream conveyance path.

According to a variation, the apparatus 100 is further adapted such that a track assembly 212 is configured to interface with the at least two feed sections 202, 204 in such a way as to guide movement of the at least two feed sections 202, 204 along a predetermined path.

According to a variation, the apparatus 100 is further adapted such that the at least two feed sections 202, 204 are configured to receive corresponding items classified in accordance with a type of item.

The following provides additional description for the in-feed section 102.

The in-feed section 102 is configured to (and is not limited to) alternate at least two (two or more) differing input types into a sticker-handling system, such as the apparatus 100.

The apparatus 100 is an example of the sticker-handling system configured to automatically convey stickers from a jumbled group or pile (that is, a non-singulated pile), and to present the stickers in a patterned arrangement to a top layer of the lumber stack 10. The sticker-handling system is configured to receive stickers from a conveyance mechanism, and to mechanically present the stickers to the lumber stack 10.

The in-feed section 102 includes (and is not limited to) at least two feed systems, such as (and not limited to) a first feed system configured to receive a sticker of a first sticker type, and a second feed system configured to receive a sticker of a second sticker type.

The at least two feed systems are configured to be alternated either by pattern or at the discretion of an operator into feeding stickers to the sticker-handling system, such as the apparatus 100. It will be appreciated that there may be subsequent additional feed systems (a third feed system, and a fourth feed system, etc.).

Types of stickers may be classified by geometric parameters, species, ownership or other properties that are to be selected for subsequent feeding to a downstream section of the apparatus 100 and/or the sticker-handling system According to a specific example, the in-feed section 102 includes (and is not limited to): feed sections each having a pile conveyance mechanism and an unscrambling system. The unscrambling system is defined as a system that is configured to provide a single layer of material out of a potentially multiple layer pile or grouping. The feed sections are mounted to a carriage system. An option includes that the feed sections are separately mounted to separate carriages either lineally switched or rotary switched.

In accordance with an example, the carriage system is configured to be shifted (moved) by a positioning system in such a way as to align with the downstream section of the apparatus 100. The positioning system alternatively extends or retracts so as to position a selected one of the feed systems into a functional position (in-line) with the downstream section of the apparatus 100.

For example, the in-feed section 102 includes (and is not limited to) separate feed systems each driven independently into place by powered drives, pulled in via cable system (for example), or hydraulically or electrically sequenced into position (for example).

According to a variation, the in-feed section 102 is configured in such a way that the at least two feed systems are stationary, and the stickers are transferred from the feeding systems to the downstream section of the apparatus 100 via alternating feed tipples or other mechanism configured to present the stickers in a reasonably consistent arrangement to the downstream section of the apparatus 100.

The at least two feed systems of the in-feed section 102 may include a pile conveyance system joining to an unscrambling mechanism. Alternatively, the feed systems may include a pile conveyance, unscrambling mechanism, and a sticker singulation mechanism configured to feed stickers to the downstream section of the apparatus 100. For example, the stickers may be fed from the in-feed section 102 to a conveyor of the downstream section of the apparatus 100.

The first feed section is configured to receive a type of sticker (fluted for example). The second feed section is configured to receive another type of sticker (plain for example). An example of the first type of sticker includes a fluted sticker having a relief or profile extending from opposite sides of the fluted sticker. A selected one of the first feed section and the second feed section may be moved into a feeding position (in line position) while the other feed section is moved to a standby position (off line), and vice versa in an alternating manner in such a way that when required to handle one of the types of stickers, the appropriate feed section is positioned in the feeding position and engaged so as to begin feeding stickers to the apparatus 100. One of the feed sections that is placed in standby position (idle mode) waits in an idle mode, and may receive additional stickers of a particular type (can be loaded with more stickers as they are made available). A selected feed system or section may be placed in the feeding position and then may be feeding (conveying) their stickers (held in a magazine or storage bin) to the quality-control section 103 or other downstream section of the apparatus 100.

For example, each feeder system of the in-feed section 102 includes a storage section that receives stickers, and the feeder system is sloped in such a way that the stickers are gravity fed to an unscrambler; then the unscrambler places each sticker on a conveyor of the downstream section of the apparatus 100.

The conveyor of the downstream section of the apparatus 100 includes (for example) a conveyor having (for example) a pair of ganged endless looped structures (such as chains) each having spaced apart lugs; each pair of lugs is positioned on opposite endless looped structures, and is configured to receive and to move a sticker so as to move the sticker along a flow path. According to an example, the sticker may be oriented in such a way that the sticker is substantially orthogonally aligned or intersects opposite endless looped structures.

In accordance with an example, the entrance of the downstream section of the apparatus does not include a lug-loader device (known and not described herein); instead of using the traditional (known) lug-loader device, the entrance directly feeds stickers to the conveyor, without any intervening ancillary device (such as the lug-loader device). This arrangement simplifies the apparatus 100. On the other hand, if so desired, the lug-loader device is used.

Generally speaking, the in-feed section 102 is configured to alternately feed at least two or more types of stickers to the next section of the apparatus 100. The in-feed section 102 is configured to receive and to hold stickers in a jumbled group or pile of unorganized stickers; that is, non-singulated the in-feed section 102 is generally configured to convey the stickers, one after the other, to the next section of the apparatus 100, in an orderly conveyance of singulated stickers.

Generally speaking, the in-feed section 102 includes and is not limited to: a combination of a first feed section 202, a second feed section 204, and a control system 206. The in-feed section 102 may include any number of required feed systems as may be required to suit a specific application; it is intended that each feed system contains a corresponding type of sticker.

Generally speaking, a control system is configured to: (A) operatively couple to the first feed system and the second feed system, and (B) alternatively position any one of the first feed system and the second feed system between an in-line position and an off-line position, depending on a type of lumber stack 10 that needs to be assembled. For example, for the case where the lumber stack 10 includes hardwood portions, then the fluted sticker type is to be placed in the stack. For the case where the lumber stack 10 includes softwood portions, then the plain-type stickers are to be placed in the lumber stack 10. For the case where there is a requirement for a particular type of sticker to be used with a particular type of lumber stack 10, the controller then positions the preferred feed system in the in-line position. When the first feed system is positioned in-line, then the second feed system is positioned off-line. For the case where the second feed section 204 is positioned in-line, then the first feed section 202 is positioned off-line. In the in-line position, any one of the first feed system and the second feed system is positioned in such a way that the stickers exit the first feed system or the second feed system and enter the next section of the apparatus 100. According to an example, the next section is the quality-control section 103. According to another example, the next section of the apparatus 100 includes the interface section 104 because the quality-control section 103 is not included in the apparatus 100 as may be required for some applications. In the off-line position, any one of the first feed system and the second feed system is positioned in such a way that the stickers cannot exit the first feed system or the second feed system, and the stickers remain on standby until required by the apparatus 100.

For example, each feeder system of the in-feed section 102 includes (and is not limited to) a storage section configured to receive stickers of a type of sticker, and the feed system is sloped in such a way that the stickers are gravity fed to an un-scrambler apparatus.

Generally speaking, the apparatus 100 includes (and is not limited to) the at least two feed sections 202, 204 for stickers, each having corresponding outputs that are configured to be in selective conveyance communication with a downstream conveyance path leading to an automatic sticker placer mechanism.

According to a variation, the apparatus 100 is adapted such that at least two feed sections 202, 204 are each configured to move between an in-line position and an off-line position in such a way that the corresponding outputs of the at least two feed sections 202, 204 alternate with each other between the in-line position and the off-line position.

According to a variation, the apparatus 100 is adapted such that the corresponding outputs are operable in any one of an in-line position and an off-line position in such a way that: (A) in the in-line position, at least one of the corresponding outputs is in conveyance communication with the downstream conveyance path, and (B) in the off-line position, the remaining corresponding outputs are not in conveyance communication with the downstream conveyance path (leading to another section or another piece of equipment).

According to a variation, the apparatus 100 is adapted such that a track assembly 212 is configured to interface with the at least two feed sections 202, 204 in such a way as to guide movement of the at least two feed sections 202, 204 along a predetermined path. An actuation assembly is configured to move the at least two feed sections 202, 204 along the track assembly 212.

According to a variation, the apparatus 100 is adapted such that the at least two feed sections 202, 204 are configured to receive corresponding items classified in accordance with a type of item.

In accordance with another example, the apparatus 100 includes (and is not limited to) a controller configured to control at least two feed sections 202, 204 being configured to receive respective stickers. The controller is also configured to control each of the at least two feed sections 202, 204 having corresponding outputs in such a way so as to cause the corresponding output to be in selective conveyance communication with a downstream conveyance path leading to a sticker-handling system. For example, the controller may include programmed instructions (or equivalent) configured to instruct the controller.

FIGS. 3A to 3E depict the example views of the quality-control section 103 of the apparatus 100 of FIG. 1A.

FIG. 3A depicts a schematic view (top view) of an example of the quality-control section 103. The quality-control section 103 includes (and is not limited to) a conveyor 302 having a first main chain 304, and a second main chain 306 spaced apart from the first main chain 304. The first main chain 304 and the second main chain 306 may include (for example) endless loop chains or endless loop belts. Each of the first main chain 304 and the second main chain 306 includes a lug 305 extending from the first main chain 304, and a lug 307 extending from the second main chain 306. The first main chain 304 and the second main chain 306 are longitudinally aligned along the quality-control section 103 generally from an inlet 324 to an outlet 326. A flow direction 322 indicates the flow of the instances of the sticker 12 from the inlet 324 to the outlet 326. Positioned between the first main chain 304 and the second main chain 306 is a first sticker support 308 and a second sticker support 310. The first sticker support 308 and the second sticker support 310 generally extend from the inlet 324 to the outlet 326. The first sticker support 308 and the second sticker support 310 are spaced apart from each other. The first sticker support 308 and the second sticker support 310 are each configured to support instances of the sticker 12. The instances of the lug 305 and the lug 307 are configured to abut one side of the instances of the sticker 12. For the case where the first main chain 304 and the second main chain 306 are made to move, the first main chain 304 and the second main chain 306 move the lug 305 and the lug 307 (respectively) in such a way so as to move the instance of the sticker 12 that abuts the lug 305 and the lug 307.

Instances of the lug 305 are positioned along the first main chain 304 in such a way that the instances of the lug 305 are spaced apart from each other evenly; the distance between the instances of the lug 305 is called the lug pitch. Instances of the lug 307 are positioned along the second main chain 306 in such a way that the instances of the lug 307 are spaced apart from each other evenly; the distance between the instances of the lug 307 is called the lug pitch. Instances of the lug 305 and of the lug 307 are positioned across from each other on the first main chain 304 and the second main chain 306 in such a way that (for the case as depicted) the sticker 12 is moved along so that the longitudinal axis that extends through the sticker 12 remains substantially orthogonally aligned relative to the first main chain 304 and to the second main chain 306. Of course, other variations for the positioning of the lug 305 and the lug 307 may be permitted so as to convey the sticker 12 from the inlet 324 to the outlet 326 in any desired fashion that is convenient for the purposes of inspecting the sticker 12 for quality related issues. It will be appreciated that in accordance with an option, the quality-control section 103 may be replaced by operators (humans) that inspect each sticker before the stickers are fed into the apparatus 100.

The quality-control section 103 further includes (and is not limited to): a motor 312 configured to connect with and to move the second main chain 306 and the first main chain 304 for the case where the first main chain 304 is ganged to the second main chain 306. A motor controller 314 is connected to the motor 312, and the motor controller 314 is configured to control operation of the motor 312 depending on a control program stored in the memory of the motor controller 314; the control program is configured to control operation of the motor controller 314 so as to coordinate operation of the components of the quality-control section 103 with the operation of the other sections of the apparatus 100.

The quality-control section 103 further includes (and is not limited to): a detector 316 configured to be positioned relative to an instance of the sticker 12 as the conveyor 302 moves the sticker 12, at least in part, from the inlet 324 to the outlet 326. The detector 316 may include a laser device or other scanning device, etc. The detector 316 is configured to detect aspects of instances of the sticker 12 that pass by the detector 316. By way of example, such aspects may include the width of each instance of the sticker 12 and/or the height of each instance of the sticker 12, etc. A detector controller 318 is operatively connected to the detector 316. The detector controller 318 includes a non-transitory machine-readable storage medium (also called memory) tangibly embodying executable instructions (code) that direct the operation of the detector controller 318. The detector 316 communicates information pertaining to instances of the sticker 12 that are made to pass by the detector 316. The detector controller 318 is operatively connected to a sticker-ejection assembly 320. The sticker-ejection assembly 320 is configured to eject undesirable instances of the sticker 12 that pass by the detector 316, in response to receiving a command signal from the detector controller 318 for the case where the detector controller 318 determined that the instance of the sticker 12 is not acceptable because the geometric attributes of the instances of the sticker 12 was not acceptable; that is, the instances of the sticker 12 was either too wide and/or too tall, etc.

FIG. 3B depicts a schematic view (side view) of an example of the quality-control section 103. The first main chain 304 is aligned and positioned above the first sticker support 308. The lug 305 extends downwardly, and abuts the instances of the sticker 12. As the first main chain 304 moves the lug 305 forwardly from the inlet 324 to the outlet 326, the lug moves the instances of the sticker 12 forwardly. As the instances of the sticker 12 moves forwardly, the instances of the sticker 12 slides along a top surface of the first sticker support 308. The first sticker support 308 is positioned below the first main chain 304. The example of FIG. 3B is used for the case where the sticker-ejection assembly 320 is positioned below the first main chain 304; a specific implementation is depicted for this case in FIG. 3C. For the implementation depicted in FIG. 3C, the sticker-ejection assembly 320 is configured to eject unacceptable instances of the sticker 12 in a direction that extends below the quality-control section 103 toward the ground or reject pile, in which case gravity is used to pull the ejected instances of the sticker 12 to the ground.

FIG. 3C depicts a perspective view of an example view of the quality-control section 103. The instances of the sticker 12 enter the quality-control section 103 via the inlet 324. The outlet 326 communicates with an auxiliary section of the quality-control section 103. The second sticker support 310 is positioned below the second main chain 306. The sticker-ejection assembly 320 is positioned in such a way that the top surface of the sticker-ejection assembly 320 forms an extension to the top surface of the second sticker support 310 for the case where the instances of the sticker 12 are determined to be acceptable. On the other hand, for the case where the instances of the sticker 12 were determined or detected to be not acceptable, the sticker-ejection assembly 320 is configured to rotate (move) so as to cause an opening in such a way that the unacceptable instances of the sticker 12 may fall vertically to the ground with the assistance of gravity. Once the instances of the sticker are ejected in this manner, the sticker-ejection assembly 320 returns back to the normal position so that acceptable instances of the sticker 12 may proceed to the outlet 326. A rejection flow path 321 indicates the direction in which rejected stickers take. Another name for the sticker-ejection assembly 320 is a tippler mechanism.

For the case where the quality-control section 103 is required to have a longer reach or extent, the quality-control section 103 includes (and is not limited to): an auxiliary section 360. By way of example, the auxiliary section 360 includes (and is not limited to) a first auxiliary chain 330 having an auxiliary lug 331 extending from the first auxiliary chain 330. A second auxiliary chain 328 is set apart from the first auxiliary chain 330. An auxiliary lug 329 extends from the second auxiliary chain 328. A drive 332 is configured to drive the second auxiliary chain 328 and the first auxiliary chain 330. The drive 332 may be configured to drive the chains of the auxiliary section 360 and the first main chain 304 and the second main chain 306 if so desired. The quality-control section (103) further includes (and is not limited to) a frame assembly 311 configured to support the components of the quality-control section 103.

FIG. 3D depicts yet another schematic view (side view) of an example of the quality-control section 103. For the portion of the quality-control section 103 that has the detector, the first sticker support 308 is positioned below the second main chain 306, and the instance of the sticker 12 is positioned below the second main chain 306, and the instance of the sticker 12 slides along the top surface of the first sticker support 308 along the flow direction 322. The lug 307 pushes the instance of the sticker along the flow direction 322.

FIG. 3E depicts yet another schematic view (side view) of an example of the quality-control section 103. For the portion of the quality-control section 103 associated with the auxiliary section 360, the top surface of the support 334 is used to support the instances of the sticker 12. The first auxiliary chain 330 is positioned below the support 334. The auxiliary lug 331 extends upwardly from the first auxiliary chain 330, and abuts the instances of the sticker 12.

The following is an additional description of the quality-control section 103.

The quality-control section 103 interfaces with the in-feed section 102. The quality control section is configured to: (A) inspect and detect each sticker as each sticker is moved through the quality-control section for potential quality issues (example, using a detector and controller, etc.), and (B) reject/remove flawed stickers that fail inspection;

For the case where a flaw is detected, remove sticker from conveyor (by using a tippler for example or other suitable device).

For the case where no flaw is detected, permit sticker to proceed moving along a conveyor to the next section (downstream).

For example, the quality-control section 103 includes (and is not limited to) a conveyor (such as a pair of spaced apart chains having spaced apart lugs) configured to receive stickers from an in-feed section, and move the stickers to the interface section 104 (or other downstream section). Each chain moves in sync. Each pair of lugs on respective chains abuts and moves a sticker.

According to an example, the quality-control section 103 is configured to: (A) inspect and detect each sticker as each sticker is moved through the quality-control section for potential quality issues example, using a detector and controller, and (B) reject or remove flawed stickers that fail inspection. For the case where a sticker flaw is detected in a sticker under inspection, the quality-control section 103 is configured to remove the sticker from the conveyor by using a tippler for example or other suitable device. For the case where no sticker flaw is detected in the sticker under inspection, the quality-control section 103 is configured to permit the sticker to proceed moving along the conveyor to the next section.

For example, the quality-control section 103 includes (and is not limited to): a controller and a detector interfaced with the controller. The detector is configured to inspect each passing sticker, and provide an indication to the controller as to whether the sticker is acceptable. An ejection mechanism is configured to eject an unacceptable sticker in response to receiving an ejection control signal from the controller for the case where the controller received an indication from the detector that the sticker is unacceptable. For the case where a flaw is detected, the quality-control section 103 is configured to remove sticker from conveyor by using a tippler device. For the case where no flaw is detected, the quality-control section 103 is configured to permit the sticker to proceed moving along conveyor to the next section of the apparatus 100.

The quality-control section 103 includes for example (and is not limited to): a conveyor 302 having a pair of spaced apart chains each having spaced apart lugs. Each pair of lugs on respective chains abuts and moves a sticker. The conveyor 302 is configured to: (A) receive stickers from the in-feed section 102, and (B) move the stickers to the interface section 104. Each instance of the first main chain 304 and the second main chain 306 moves in sync with each other. Each pair of lugs 312 on respective chains abuts and moves a single sticker.

FIGS. 4A to 4E depict the example views of the interface section 104 of the apparatus 100 of FIG. 1A. The interface section 104 includes an input portion configured to interface with the quality-control section 103, with the in-feed section 102, or with any other equipment as may be required. The interface section 104 includes an output portion configured to interface with the out-feed section 105, or with any other equipment as may be required.

FIG. 4A depicts a schematic view (top view) of an example of the interface section 104. The interface section 104 includes (and is not limited to) a first pair of endless loop structures having a first chain 402 and a second chain 404, and a second pair of endless loop structures having a third chain 406 and a fourth chain 408. The chains move along the direction 409. Instances of the lug 407 extend from the third chain 406 and the fourth chain 408 in a similar way to the lugs of quality-control section 103. That is, they are positioned opposite from each other. Instances of the lug 403 extend from the first chain 402 and the second chain 404 in a similar way to the lugs of quality-control section 103. That is, they are positioned opposite from each other. A first motor 414 is configured to connect to and to actuate movement of the first chain 402 and the second chain 404. A controller 416 is connected to the first motor 414, and is configured to control operation of the first motor 414. The motor 410 is connected to the third chain 406 and the fourth chain 408. A controller 412 is connected to the motor 410, and is configured to control operation of the motor 410.

The interface section 104 also includes support structure similar (functionally equivalent to) to the first sticker support 308 and the second sticker support 310 of FIG. 3A, but these supports are not depicted in FIG. 4A for the sake of simplifying the content depicted in FIG. 4A.

FIG. 4B depicts another schematic view (side view) of an example of the interface section 104, in which the first chain 402 is positioned below the support 405. The lug 403 extends upwardly from the first chain 402. The instance of the sticker 12 slides on the top surface of the support 405. The lug 403 abuts the instance of the sticker 12 and moves the sticker 12 forwardly. The support 405 is positioned between the instances of the sticker 12 and the first chain 402.

FIG. 4C depicts a perspective view of an example of the interface section 104. The interface section 104 further includes (and is not limited to) a first drive unit 424 configured to drive the first chain 402 and the second chain 404. A second drive unit 426 is configured to drive the third chain 406 and the fourth chain 408. An instance of a pulley 428 is configured to align the fourth chain 408 so that the fourth chain 408 may form an endless loop. Another instance of the pulley 428 is configured to align the second chain 404 so that the second chain 404 may form an endless loop. A frame assembly 422 is configured to support the components of the interface section 104. A rotation member 430 extends laterally across the interface section 104 and is configured to provide pulleys in such a way as to permit the chains to form endless loops. The interface section 104 includes an input 418 and an output 420 located on opposite sides of the interface section 104. The input 418 is configured to connect the interface section 104 to the quality-control section 103 or to the in-feed section 102 or to any other equipment located on the plant floor as may be required. The output 420 is configured to interface the interface section 104 to the out-feed section 105 or to any other equipment as may be required.

FIG. 4D depicts yet another schematic view (side view) of an example of the interface section 104. The first chain 402 is positioned lower than the position of the support 405. The instances of the sticker 12 are made to slide or move along the top surface of the support 405. The lug 403 extends upwardly from the first chain 402. The lug abuts the instances of the sticker 12 as the first chain 402 moves the lug 403 forwardly from the input 418 to the output 420.

FIG. 4E depicts yet another perspective view (top view) of an example of the interface section 104. The interface section 104 is configured in such a way that the conveyor device (having first chain 402, second chain 404, third chain 406, and a fourth chain 408 by way of example) is configured to convey instances of the sticker 12 through the output 420 in such a way that the instances of the sticker 12 form a predetermined pattern. The predetermined pattern may be such that each pair of oppositely placed lugs 407 presents the instances of the sticker 12 one after the other via the output 420. The predetermined pattern may be that some pairs of lugs have instances of the sticker 12 while other pairs of lugs are empty (do not present any instances of a sticker). The reason for this arrangement is that the out-feed section 105 may require instances of the sticker 12 presented in accordance with a predetermined pattern as may be required for ultimate placement of the instances of the sticker 12 to the lumber stack 10.

It will be appreciated that the interface section 104 may be used in other types of handling systems. That is to say, in accordance with another example, the interface section 104 is configured to handle other types of items other than stickers, such as for example boards, logs, flooring blanks, dimensioned wood products, pieces of inconsistently shaped objects, etc.

The following provides additional description of the interface section 104.

The interface section 104 is not limited to handling stickers. The interface section 104 may be further adapted so as to handle other items, such as boards, logs, flooring blanks, dimensioned wood products, pieces of inconsistently shaped objects, non-wooden items, items having any sort of material or composition, etc.

The interface section 104 may include (and is not limited to) a conveyor having a single chain, or one belt, or other equivalent device that may be configured to be continuously joined so as to form a looped mechanism not a disconnected mechanism, and/or a disconnected mechanism if so desired and/or required.

The interface section 104 may include (and is not limited to) a conveyor having one or more lugs or lug sections, driven by a looped conveyor having a chain, belt, rope, cable, etc.

The interface section 104 includes (and is not limited to) a conveyor configured to convey the stickers (or other items) from an input section to an output section.

According to an option, the input section of the interface section 104 is connectable to the in-feed (or in-feed system with lug-fill observance. Lug-fill observance includes a mechanism configured to automatically sense: (i) the presence of items, product, stickers, (ii) absence of items, and/or (iii) the incompatibility of the items. The output section of the interface section 104 is connectable to an out-feed section.

Generally speaking, the interface section 104 includes (and is not limited to) a conveyor. The conveyor includes (and is not limited to) an input section, and an output section set apart from the input section. The conveyor is configured to operate in such a way that the conveyor: (A) receives stickers from the input section at the rate in which the stickers are made available to the interface section, and (B) provides stickers to the output section at the rate in which the stickers are required by the output section.

More specifically, the conveyor may be configured to operate in such a way that the conveyor: (A) receives stickers from the quality-control section at the rate in which the stickers are made available by the quality-control section, (B) provides stickers to the out-feed section at the rate in which the stickers are required by the out-feed section, and (C) places the stickers in a predetermined pattern to be conveyed to the output section.

According to an example, the conveyor includes two pair of spaced-apart (ganged) chains each having one or more spaced-apart lugs positioned on the opposite chains. Motors may be connected to a respective chain or pairs or groups of chains. Each motor may have a controller configured to control its respective motor. The controller is configured to execute the functional requirements of the interface section 104. The observation sensing system (known and not described here) may be used. For example, the controller may include programmed instructions (or equivalent) configured to instruct the controller.

A first chain (or group of) chains receives stickers from the input section at the rate required by the input section, while the second pair of chains provides stickers to the output section at the rate required by the output section.

A second pair of chains receives stickers from the input section at the rate required by the input section, while the first pair of chains provides stickers to the output section at the rate required by the output section.

The first pair of chains and the second pair of chains alternate operations at the input section and the output section.

A variation of the interface section 104 is such that the conveyor may include a collection of individual (or groups) of chains that is configured to: (A) receive stickers from the input section at the rate required by the input section, and (B) provide stickers to the output section at the rate required by the output section.

Generally speaking, the interface section 104 is configured to (A) interface with an input conveyance stream. The interface section 104 is also configured to (B) interface with an output conveyance stream. The interface section 104 is also configured to (C) receive items from the input conveyance stream at an intake rate at which the items are made available via the interface with the input conveyance stream (once so interfaced with the input conveyance stream). The interface section 104 is also configured to (D) provide the items to the output conveyance stream an exit rate in which the items are required to exit via the interface with the output conveyance stream (once so interfaced with the output conveyance stream), and (E) receive the items and provide the items in such a way that the operation of receiving the items and the operation of providing the items overlap each other at least in part.

The interface section 104 may further include a frame assembly that is positioned relative to the input conveyance stream and the output conveyance stream. The frame assembly is configured to support the item-transfer assembly.

The interface section 104 may also include (and is not limited to) at least two or more endless loop sets, where each set is separately driven by an electric motor. Each endless loop set includes at least one or more ganged continuous loop conveyors (having for example chains or belts or cables). Each of the ganged loops includes protrusions configured to abut and to move the items along a conveyance path.

The interface section 104 may include (and is not limited to) a set of ganged looped chains configured in such a way that: (A) at least one pair of ganged looped chains receive items from the input conveyance stream at an intake rate, and (B) at least another pair of ganged looped chains provide the items to the output conveyance stream at the exit rate.

The interface section 104 may include (by way of example); a first pair of ganged looped chains, and a second pair of ganged looped chains co-axially aligned with the first pair of ganged looped chains. The first pair of ganged looped chains and the second pair of ganged looped chains are configured such that as the first pair of ganged looped chains receives items from the input conveyance stream at the intake rate, the second pair of ganged looped chains provides the items to the output conveyance stream at the exit rate.

The interface section 104 may be further configured to provide items to the output assembly in accordance with a predetermined spacing between the items (physical spacing and/or time spacing).

According to one option, the interface section 104 is configured to: (A) receive stickers from the quality-control section 103 at the rate in which the stickers are made available from the quality-control section 103; and (B) provide stickers to the out-feed section 105 at the rate in which the stickers are required by the out-feed section 105.

According to another option, the interface section 104 includes (and is not limited to) a conveyor system 401 (FIG. 4A) having (and not limited to): a first pair of spaced-apart ganged instances of the first chain 402 and the second chain 404 each having spaced apart lugs 406 positioned thereon, and a second pair of spaced-apart ganged instances of the third chain 406 and the fourth chain 408, each having spaced apart lugs 410 positioned thereon. The conveyor system 401 is configured to: (A) receive stickers from an upstream section (such as from quality-control section 103) at the rate in which the stickers are made available to the interface section 104 from the upstream section (such as from the quality-control section 103), and (B) provide stickers to a downstream section (such as the out-feed section 105) at the rate in which the stickers are required by the downstream section (such as the out-feed section 105). According to an option, the quality-control section 103 is not used; instead, the interface section 104 connects to an upstream section such as the in-feed section 102. According to another option, the interface section 104 instead connects to another section that is not the out-feed section 105, and this other section transfers stickers to the out-feed section 105.

For example, the first pair of chains receives stickers from the input at the correct rate associated with the input while the second pair of chains provides stickers to the output at the correct rate associated with the output.

For example, the interface section 104 includes (and is not limited to) a conveyor configured to convey the stickers or other items from an input section to an output section. The input section is connectable to the in-feed system (optionally with a lug-fill observance mechanism, known, for automatically sensing product presence or absence or incompatibility). The output section is connectable to the out-feed section.

For example, the interface section 104 includes (and is not limited to) a conveyor including (and not limited to): an input section and an output section set apart from the input section. The conveyor is configured to operate in such a way that the conveyor: (A) receives stickers from the input section at the rate in which the stickers are made available to the interface section, and (B) provides stickers to the output section at the rate in which the stickers are required by the output section.

For example, the interface section 104 includes (and is not limited to) a conveyor configured to operate in such a way that the conveyor: (A) receives stickers from the quality-control section at the rate in which the stickers are made available by the quality-control section, (B) provides stickers to the out-feed section at the rate in which the stickers are required by the out-feed section, and (C) places the stickers in a predetermined pattern to be conveyed to the output section.

A controller is configured to execute the functional requirements of the interface section 104; in addition, the interface section 104 may include a mechanism to detect whether an incoming lug is occupied; the mechanism may be provided by a lug-observation sensing system (known and not described here).

For example, a first chain or group of chains receives stickers from the input section at the rate required by the input section, while the second pair of chains provides stickers to the output section at the rate required by the output section. A second pair of chains receives stickers from the input section at the rate required by the input section, while the first pair of chains provides stickers to the output section at the rate required by the output section. The first pair of chains and the second pair of chains may alternate operations at the input section and the output section.

A variation of the interface section 104 is such that the conveyor may include a collection of individual or groups of chains that is configured to: (A) receive stickers from the input section at the rate required by the input section, and (B) provide the stickers to the output section at the rate required by the output section.

According to an example, the apparatus 100 includes (and not limited to): the interface section 104 including (and is not limited to) a conveyor system 401 configured to: (i) interface with an input 418 having an input conveyance stream, (ii) interface with an output 420 having an output conveyance stream, (iii) receive items from the input 418 at an intake rate in which the items are made available to the input 418, and (iv) provide the items to the output 420 at an exit rate in which the items are required to exit from the output 420.

According to a variation, the apparatus 100 is arranged such that the conveyor system 401 is further configured to receive the items and to provide the items in such a way that the items are received and are provided in an overlapping fashion, at least in part.

The items may include (for example and are not limited to): elongated items, wooden-based items, wood products, logs, boards, items having variable dimensions, etc.

According to another variation, the apparatus 100 is further adapted in such a way that the conveyor system 401 includes (and is not limited to): an endless loop mechanism having protrusions configured to convey instances of the item one after the other. The endless loop mechanism may include chains, belts, cables, etc., or the functional and/or structural equivalent thereof.

According to yet another variation, the apparatus 100 is further adapted such that the conveyor system 401 includes (and is not limited to): at least two sets of at least one ganged continuous looped conveyor device having protrusions configured to convey the items.

According to yet another variation, the apparatus 100 is further adapted such that the conveyor system 401 includes (and is not limited to): (i) a first chain 402 and a second chain 404 ganged to each other, and (ii) a third chain 406 and a fourth chain 408 ganged to each other. The first chain 402 and the second chain 404 are coaxially aligned with the third chain 406 and the fourth chain 408. The first chain 402, the second chain 404, the third chain 406, and the fourth chain 408 are each configured such that as the first chain 402 and the second chain 404 receive items from the input 418 at the intake rate in which the items are made available to the input 418, the third chain 406 and the fourth chain 408 provide the items to the output 420 at the exit rate in which the items are required to exit from the output 420.

According to yet another variation, the apparatus 100 is further adapted such that the conveyor system 401 is further configured to provide items to the output 420 in accordance with a predetermined spacing between the items (spacing in either physical spacing and/or time spacing).

According to a general example, the apparatus 100 includes (and is not limited to): an interface section 104 including a conveyor system 401 configured to: (A) interface with an input 418 having an input conveyance stream, (B) interface with an output 420 having an output conveyance stream, (C) receive items from the input 418 at an intake rate in which the items are made available to the input 418; and (D) provide the items to the output 420 at an exit rate in which the items are required to exit from the output 420; and (E) convey the items through same path via separate conveyors.

According to another general example, the apparatus 100 includes (and is not limited to): an interface section 104, including: at least two conveyors 402, 404, 406, 408 each being configured to: (A) operate at conveyance rates being independent of each other, (B) receive from an input conveyance stream, and (C) provide to an output conveyance stream.

According to a third general example, the apparatus 100 includes (and is not limited to): an interface section 104 including endless-loop conveyors 402, 404, 406, 408 each configured to interface with an input conveyance stream and with an output conveyance stream. Each of the endless-loop conveyors 402, 404, 406, 408 are configured to: (A) receive items from the input conveyance stream at an intake rate in which the items are made available from the input conveyance stream; and (B) provide the items to the output conveyance stream at an exit rate in which the items are required to exit to the output conveyance stream.

According to a fourth example, the apparatus 100 includes (and is not limited to) an interface section 104, including endless-loop conveyors 402, 404, 406, 408 each configured to interface with an input conveyance stream and with an output conveyance stream. The endless-loop conveyors 402, 404, 406, 408 are configured to operate in such a way that: (A) as an endless-loop conveyor 402, 404 receives from the input conveyance stream, remaining endless-loop conveyors 406, 408 do not receive from the input conveyance stream, and (B) as the endless-loop conveyor 402, 404 provides to the output conveyance stream, the remaining endless-loop conveyors 406, 408 do not provide to the output conveyance stream.

According to a fifth general example, the apparatus 100 includes (and is not limited to) an interface section 104 including endless-loop conveyors 402, 404, 406, 408 each configured to interface with an input conveyance stream and with an output conveyance stream. Each of the endless-loop conveyors 402, 404, 406, 408 are configured to: (B) receive items from the input conveyance stream at an intake rate in which the items are made available from the input conveyance stream, (B) provide the items to the output conveyance stream at an exit rate in which the items are required to exit to the output conveyance stream. The endless-loop conveyors 402, 404, 406, 408 are configured to operate in such a way that: (A) as an endless-loop conveyor 402, 404 receives from the input conveyance stream, remaining endless-loop conveyors 406, 408 do not receive from the input conveyance stream; and (B) as the endless-loop conveyor 402, 404 provides to the output conveyance stream, the remaining endless-loop conveyors 406, 408 do not provide to the output conveyance stream.

According to a sixth general example, the apparatus 100 includes (and is not limited to) an interface section 104 including: endless-loop conveyors 402, 404, 406, 408 each configured to interface with an input conveyance stream and with an output conveyance stream. The endless-loop conveyors 402, 404, 406, 408 are configured to operate in such a way that: (A) as an endless-loop conveyor 402, 404 receives, at least in part, from the input conveyance stream, remaining endless-loop conveyors 406, 408 provide, at least in part, to the output conveyance stream, and (B) as the endless-loop conveyor 402, 404 provides, at least in part, to the output conveyance stream, the remaining endless-loop conveyors 406, 408 receive, at least in part, from the input conveyance stream.

According to a seventh general example, the apparatus 100 includes (and is not limited to): an interface section 104 including endless-loop conveyors 402, 404, 406, 408 each configured to interface with an input conveyance stream and with an output conveyance stream. Each of the endless-loop conveyors 402, 404, 406, 408 are configured to: (A) receive items from the input conveyance stream at an intake rate in which the items are made available from the input conveyance stream, and (B) provide the items to the output conveyance stream at an exit rate in which the items are required to exit to the output conveyance stream. The endless-loop conveyors 402, 404, 406, 408 are configured to operate in such a way that: (A) as an endless-loop conveyor 402, 404 receives, at least in part, from the input conveyance stream, remaining endless-loop conveyors 406, 408 provide, at least in part, to the output conveyance stream; and (B) as the endless-loop conveyor 402, 404 provides, at least in part, to the output conveyance stream, the remaining endless-loop conveyors 406, 408 receive, at least in part, from the input conveyance stream.

According to an eighth general example, the apparatus 100 includes (and is not limited to): an interface section 104 including: endless-loop conveyors 402, 404, 406, 408 each configured to interface with an input conveyance stream and with an output conveyance stream. The endless-loop conveyors 402, 404, 406, 408 are configured to operate in such a way that: (A) as an endless-loop conveyor 402, 404 receives from the input conveyance stream, remaining endless-loop conveyors 406, 408 do not receive from the input conveyance stream, (B) as the endless-loop conveyor 402, 404 provides to the output conveyance stream, the remaining endless-loop conveyors 406, 408 do not provide to the output conveyance stream, (C) as the endless-loop conveyor 402, 404 receives, at least in part, from the input conveyance stream, remaining endless-loop conveyors 406, 408 provide, at least in part, to the output conveyance stream, and (D) as the endless-loop conveyor 402, 404 provides, at least in part, to the output conveyance stream, the remaining endless-loop conveyors 406, 408 receive, at least in part, from the input conveyance stream.

According to a ninth general example, the apparatus 100 includes (and is not limited to) an interface section 104 including endless-loop conveyors 402, 404, 406, 408 each configured to interface with an input conveyance stream and with an output conveyance stream. Each of the endless-loop conveyors 402, 404, 406, 408 configured to: (A) receive items from the input conveyance stream at an intake rate in which the items are made available from the input conveyance stream, and (B) provide the items to the output conveyance stream at an exit rate in which the items are required to exit to the output conveyance stream. The endless-loop conveyors 402, 404, 406, 408 are configured to operate in such a way that: (A) as an endless-loop conveyor 402, 404 receives from the input conveyance stream, remaining endless-loop conveyors 406, 408 do not receive from the input conveyance stream, (B) as the endless-loop conveyor 402, 404 provides to the output conveyance stream, the remaining endless-loop conveyors 406, 408 do not provide to the output conveyance stream, (C) as the endless-loop conveyor 402, 404 receives, at least in part, from the input conveyance stream, remaining endless-loop conveyors 406, 408 provide, at least in part, to the output conveyance stream, and (D) as the endless-loop conveyor 402, 404 provides, at least in part, to the output conveyance stream, the remaining endless-loop conveyors 406, 408 receive, at least in part, from the input conveyance stream.

In accordance with another general example, the apparatus 100 includes (and is not limited to) a controller configured to control an interface section 104 including endless-loop conveyors 402, 404, 406, 408 each configured to interface with an input conveyance stream and with an output conveyance stream. The controller is also configured to control an interface section 104 in such a way that each of the endless-loop conveyors 402, 404, 406, 408: (A) receive items from the input conveyance stream at an intake rate in which the items are made available from the input conveyance stream, and (B) provide the items to the output conveyance stream at an exit rate in which the items are required to exit to the output conveyance stream. For example, the controller may include programmed instructions (or equivalent) configured to instruct the controller.

In accordance with another general example, the apparatus 100 includes (and is not limited to) a controller configured to control an interface section 104 including endless-loop conveyors 402, 404, 406, 408 each configured to interface with an input conveyance stream and with an output conveyance stream. The controller also configured to control an interface section 104 in such a way that each of the endless-loop conveyors 402, 404, 406, 408) as an endless-loop conveyor 402, 404 receives from the input conveyance stream, remaining endless-loop conveyors 406, 408 do not receive from the input conveyance stream, and (B) as the endless-loop conveyor 402, 404 provides to the output conveyance stream, the remaining endless-loop conveyors 406, 408 do not provide to the output conveyance stream. For example, the controller may include programmed instructions (or equivalent) configured to instruct the controller.

In accordance with another general example, the apparatus 100 includes (and is not limited to) a controller configured to control an interface section 104 including endless-loop conveyors 402, 404, 406, 408 each configured to interface with an input conveyance stream and with an output conveyance stream. The controller also configured to control an interface section 104 in such a way that each of the endless-loop conveyors 402, 404, 406, 408: (A) receive items from the input conveyance stream at an intake rate in which the items are made available from the input conveyance stream, (B) provide the items to the output conveyance stream at an exit rate in which the items are required to exit to the output conveyance stream. The controller also configured to control an interface section 104 in such a way that each of the endless-loop conveyors 402, 404, 406, 408: (A) as an endless-loop conveyor 402, 404 receives from the input conveyance stream, remaining endless-loop conveyors 406, 408 do not receive from the input conveyance stream, and (B) as the endless-loop conveyor 402, 404 provides to the output conveyance stream, the remaining endless-loop conveyors 406, 408 do not provide to the output conveyance stream. For example, the controller may include programmed instructions (or equivalent) configured to instruct the controller.

In accordance with another general example, the apparatus 100 includes (and is not limited to) a controller configured to control an interface section 104 including endless-loop conveyors 402, 404, 406, 408 each configured to interface with an input conveyance stream and with an output conveyance stream. The controller also configured to control an interface section 104 in such a way that each of the endless-loop conveyors 402, 404, 406, 408: (A) as an endless-loop conveyor 402, 404 receives, at least in part, from the input conveyance stream, remaining endless-loop conveyors 406, 408 provide, at least in part, to the output conveyance stream, and (B) as the endless-loop conveyor 402, 404 provides, at least in part, to the output conveyance stream, the remaining endless-loop conveyors 406, 408 receive, at least in part, from the input conveyance stream. For example, the controller may include programmed instructions (or equivalent) configured to instruct the controller.

In accordance with another general example, the apparatus 100 includes (and is not limited to) a controller configured to control an interface section 104 including endless-loop conveyors 402, 404, 406, 408 each configured to interface with an input conveyance stream and with an output conveyance stream. The controller also configured to control an interface section 104 in such a way that each of the endless-loop conveyors 402, 404, 406, 408: (A) receive items from the input conveyance stream at an intake rate in which the items are made available from the input conveyance stream, and (B) provide the items to the output conveyance stream at an exit rate in which the items are required to exit to the output conveyance stream. The controller also configured to control an interface section 104 in such a way that each of the endless-loop conveyors 402, 404, 406, 408: (A) as an endless-loop conveyor 402, 404 receives, at least in part, from the input conveyance stream, remaining endless-loop conveyors 406, 408 provide, at least in part, to the output conveyance stream, and (B) as the endless-loop conveyor 402, 404 provides, at least in part, to the output conveyance stream, the remaining endless-loop conveyors 406, 408 receive, at least in part, from the input conveyance stream. For example, the controller may include programmed instructions (or equivalent) configured to instruct the controller.

In accordance with another general example, the apparatus 100 includes (and is not limited to) a controller configured to control an interface section 104 including endless-loop conveyors 402, 404, 406, 408 each configured to interface with an input conveyance stream and with an output conveyance stream. The controller also configured to control an interface section 104 in such a way that each of the endless-loop conveyors 402, 404, 406, 408: (A) as an endless-loop conveyor 402, 404 receives from the input conveyance stream, remaining endless-loop conveyors 406, 408 do not receive from the input conveyance stream, (B) as the endless-loop conveyor 402, 404 provides to the output conveyance stream, the remaining endless-loop conveyors 406, 408 do not provide to the output conveyance stream, (C) as the endless-loop conveyor 402, 404 receives, at least in part, from the input conveyance stream, remaining endless-loop conveyors 406, 408 provide, at least in part, to the output conveyance stream, and (D) as the endless-loop conveyor 402, 404 provides, at least in part, to the output conveyance stream, the remaining endless-loop conveyors 406, 408 receive, at least in part, from the input conveyance stream. For example, the controller may include programmed instructions (or equivalent) configured to instruct the controller.

In accordance with another general example, the apparatus 100 includes (and is not limited to) a controller configured to control an interface section 104 including endless-loop conveyors 402, 404, 406, 408 each configured to interface with an input conveyance stream and with an output conveyance stream. The controller also configured to control an interface section 104 in such a way that each of the endless-loop conveyors 402, 404, 406, 408: (A) receive items from the input conveyance stream at an intake rate in which the items are made available from the input conveyance stream, and (B) provide the items to the output conveyance stream at an exit rate in which the items are required to exit to the output conveyance stream. The controller also configured to control an interface section 104 in such a way that each of the endless-loop conveyors 402, 404, 406, 408: (A) as an endless-loop conveyor 402, 404 receives from the input conveyance stream, remaining endless-loop conveyors 406, 408 do not receive from the input conveyance stream, (B) as the endless-loop conveyor 402, 404 provides to the output conveyance stream, the remaining endless-loop conveyors 406, 408 do not provide to the output conveyance stream, (C) as the endless-loop conveyor 402, 404 receives, at least in part, from the input conveyance stream, remaining endless-loop conveyors 406, 408 provide, at least in part, to the output conveyance stream, and (D) as the endless-loop conveyor 402, 404 provides, at least in part, to the output conveyance stream, the remaining endless-loop conveyors 406, 408 receive, at least in part, from the input conveyance stream. For example, the controller may include programmed instructions (or equivalent) configured to instruct the controller.

FIGS. 5A to 5S depict the example views of the out-feed section 105 of the apparatus 100 of FIG. 1A.

FIG. 5A depicts a schematic view (top view) of an example of the out-feed section 105. The out-feed section 105 includes (and is not limited to) a conveyor system 507. Generally speaking, the conveyor system 507 is configured to move and to place instances of the sticker at an alignment position 501. A single instance of the alignment position 501 is depicted. It will be appreciated that the out-feed section 105 may include any number of instances of the alignment position 501 as may be required. For example, for the case where the lumber stack 10 requires nine instances of the sticker 12 to be positioned on any given layer of the lumber stack 10, then the out-feed section 105 may include nine instances of the alignment position 501 that are used in such a way that the conveyor system 507 is configured to move and position nine instances of the sticker 12 on respective instances of the alignment position 501. The interface section 104 may deliver or provide a sequence of stickers suitable for the out-feed section 105. Examples of the sequence of stickers are described in connection with FIG. 4E.

For the sake of simplifying the description of the out-feed section 105, the out-feed section 105 includes (and is not limited to): the conveyor system 507. The conveyor system 507 includes (and is not limited to): a first chain 502, and a second chain 504. The first chain 502 and the second chain 504 are aligned in such a way so as to extend from an inlet positioned on the right side of FIG. 5A. The outlet is positioned at the bottom side of FIG. 5A. The first chain 502 and the second chain 504 extend orthogonally relative to the outlet of the out-feed section 105. The second chain 504 is set apart from the first chain 502, and the first chain 502 and the second chain 504 extend parallel to each other. The first chain 502 and the second chain 504 include endless loops of structure such as chains or belts, etc. A first support 503 and a second support 505 are positioned and aligned along a length of the first chain 502 and the second chain 504. The first support 503 and the second support 505 are configured to support (sliding) movement of instances of the sticker 12. Instances of a lug 506 extend from the first chain 502 (one instance of the lug 506 is depicted for the sake of simplifying FIG. 5A) at regular intervals along a length of the first chain 502. Instances of a lug 508 extend from the first chain 502 (one instance of the lug 508 is depicted for the sake of simplifying FIG. 5A) at regular intervals along a length of the second chain 504. The first chain 502 and the second chain 504 are ganged so that they are rotatably synchronized. A motor 510 is connected to the second chain 504, and is configured to actuate movement of the second chain 504 and the first chain 502. A controller 512 is connected to the motor 510, and is configured to control operation of the motor 510. The direction 511 indicates the direction of flow for incoming instances of the sticker 12. According to FIG. 5A, the lug 506 and the lug 508 abut and move the instance of the sticker 12 to the alignment position 501.

FIG. 5B depicts another schematic view (side view) of an example of the out-feed section 105. The first chain 502 is positioned below the first support 503. The lug 506 extends upwardly from the first chain 502. The lug 506 abuts and pushes the instance of the sticker 12 in such a way that the sticker 12 slides along the first support 503. It will be appreciated that in accordance with one option, the first support 503 and the second support 505 are not used, and the instances of the sticker 12 are positioned on and across from the first chain 502 and the second chain 504 (if so desired).

FIG. 5C depicts yet another schematic view (top view) of an example of the out-feed section 105, in which the instance of the sticker 12 was moved in such a way that the instance of the sticker 12 is now placed at the alignment position 501 as a result of the conveyor system 507 stopping forward movement. Once positioned on the alignment position 501, the lug 506 and the lug 508 are moved away from the instance of the sticker 12 while the sticker 12 remains in a stationary position at alignment position 501.

FIG. 5D depicts yet another schematic view (top view) of an example of the out-feed section 105, in which a centering mechanism 513 is deployed or presented to the instances of the sticker 12. The centering mechanism 513 may be called an alignment mechanism. The conveyor system 507 remains deactivated so that the instances of the sticker 12 remain in a stationary position at the alignment position 501. The centering mechanism 513 includes (by way of example and is not limited to) a first centering member 514, a second centering member 516, a third centering member 518, and a fourth centering member 520. Generally speaking, the centering mechanism 513 is configured to abut the instance of the sticker 12 in such a way that the instance of the sticker 12 remains centered at the alignment position 501. More specifically, the centering mechanism 513 is configured to abut (contact) the opposite sides of the instance of the sticker 12 in a way that the instance of the sticker 12 remains stationary.

As depicted in FIG. 5D, the first centering member 514, the second centering member 516, the third centering member 518, and the fourth centering member 520 are set apart from the instance of the sticker 12.

FIG. 5E depicts yet another schematic view (top view) of an example of the out-feed section 105, in which the conveyor system 507 remains deactivated. The centering mechanism 513 makes contact with the instance of the sticker 12 at two (or more) contact locations. For example, the two contact locations are offset from the ends of the instance of the sticker 12. When the centering mechanism 513 makes contact with the instance of the sticker 12, the instance of the sticker 12 may be allowed to move within a level of tolerance.

FIG. 5F depicts yet another schematic view (top view) of an example of the out-feed section 105, in which the conveyor system 507 remains deactivated (inactive). The centering mechanism 513 is further configured to grip the instance of the sticker 12, and to move the instance of the sticker 12 away from the conveyor system 507 to the outlet of the out-feed section 105; the outlet is located at the bottom of FIG. 5F. The direction 524 indicates the direction of the movement of the instance of the sticker 12. According to an alternative, the centering mechanism 513 is not configured to move the instance of the sticker 12 away from the conveyor system 507; another device is used to grip and move the instance of the sticker 12. The centering mechanism 513 is configured to center the instance of the sticker 12.

Figure 5G:
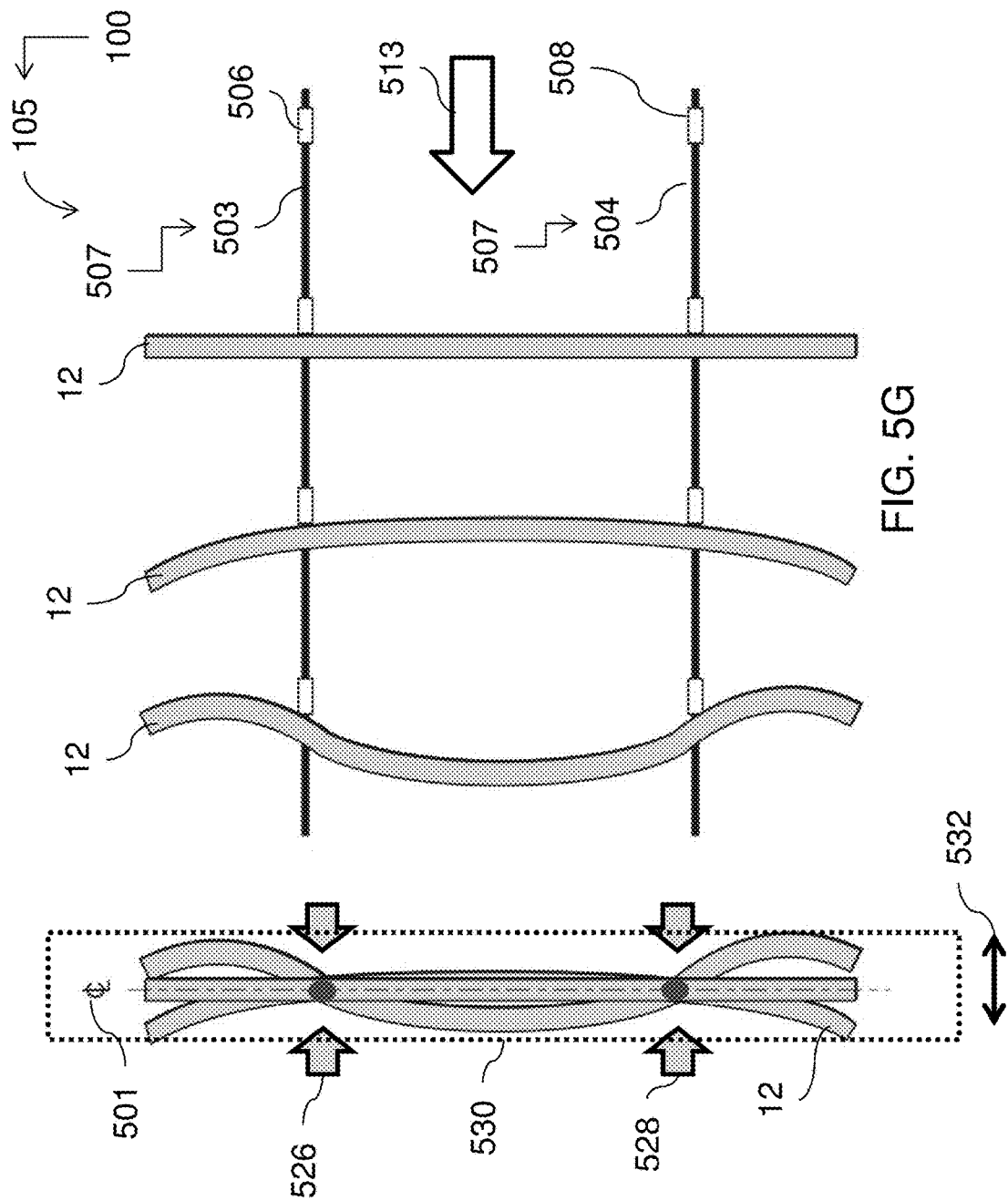
FIGS. 5A to 5S depict example views of an out-feed section of the apparatus of FIG. 1A.

FIG. 5G depicts yet another schematic view (top view) of an example of the out-feed section 105, in which three different instances of the sticker 12 are depicted. The instances of the sticker 12 located on the right side of FIG. 5G are depictions of the ideal sticker (straight and not warped). It will be appreciated that not all of the stickers are ideal stickers. The last two instances of the sticker 12 are deformed (mis shaped or warped) as a result of having been reused. However, the quality-control section 103 has determined that these deformed instances of the sticker 12 are acceptable enough for continued usage and thus find themselves in the out-feed section 105, for placement in an available alignment position 501. The three instances of the sticker 12 are depicted as all placed at the alignment position 501 for the sake of depicting the concepts of a sticker-horizontal pocket 530. The conveyor system 507 transports the instances of the sticker 12 to the alignment position 501, and at the alignment position 501, each instance of the sticker 12 remains within the sticker-horizontal pocket 530. Each instance of the sticker 12 is positioned such that the instances intersect each other at the point where each of the lug 506 and the lug 508 had contacted the instances of the sticker 12 at the centering position 526 and the centering position 528. The sticker-horizontal pocket 530 has a pocket width 532. The centering mechanism 513 of FIGS. 5D to 5F is configured to center the position of the sticker 12 relative to the alignment position 501.

Figure 5H:
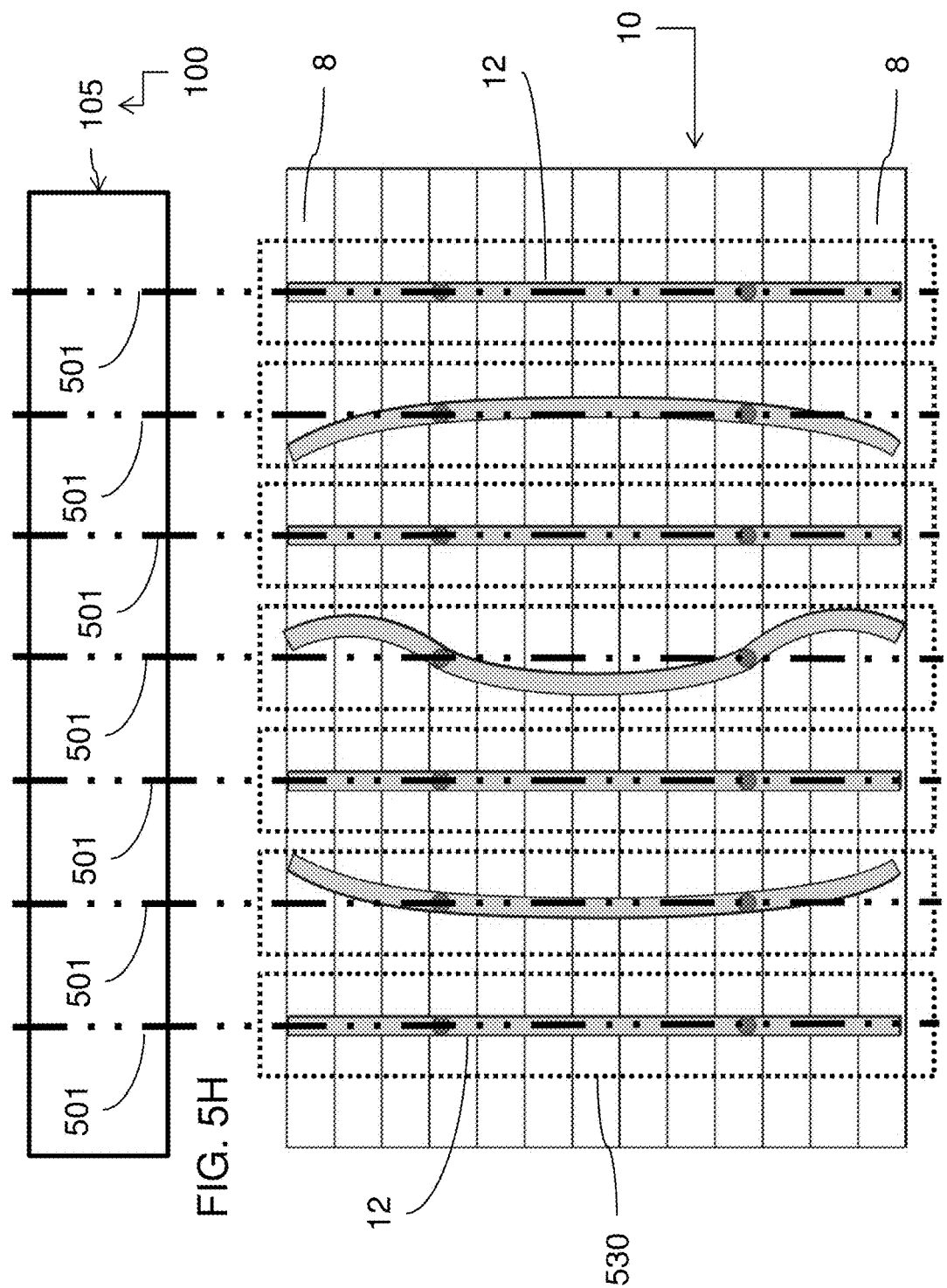

FIG. 5H depicts yet another schematic view (top view) of an example of the out-feed section 105, in which instances of the sticker 12 were moved from the output of the out-feed section 105 and then placed on a layer of the lumber stack 10. Each layer includes instances of the lumber portions 8 placed end to end and/or side to side. Each instance of the alignment position 501 corresponds to positions on the lumber stack 10 that are to receive instances of the sticker 12 for each layer of the lumber stack 10. The sticker-horizontal pocket 530 is depicted for each instance of the alignment position 501 on the layer of the lumber stack 10. The out-feed section 105 is configured to position the instances of the sticker 12 into the respective instances of the sticker-horizontal pocket 530. The stickers are positioned or aligned on the layer of the lumber stack 10 in such a way that the stickers are oriented generally or substantially perpendicular to the orientation of the lumber portions 8 of the lumber stack 10.

FIG. 5I depicts yet another schematic view (side view) of an example of the out-feed section 105. The alignment position 501 is projected through the lumber stack 10. A sticker vertical pocket 534 is centered about the vertical projection extending through respective instances of the alignment position 501. The ends of the instances of the sticker 12 remain within the sticker vertical pocket 534.

FIG. 5J depicts an end view of an example of the out-feed section 105. The out-feed section 105 includes (and is not limited to) the centering mechanism 513, a carriage assembly 536, a frame assembly 540, and a carriage drive system 538. The lumber stack 10 is positioned at an outboard position. The carriage drive system 538 extends from the inboard position located above the conveyor system 507 to the outboard position located above the lumber stack 10. The carriage assembly 536 is configured to carry and support the controller 512. The carriage drive system 538 is configured to drive the centering mechanism 513 between the inboard position and the outboard position.

Figure 5K:
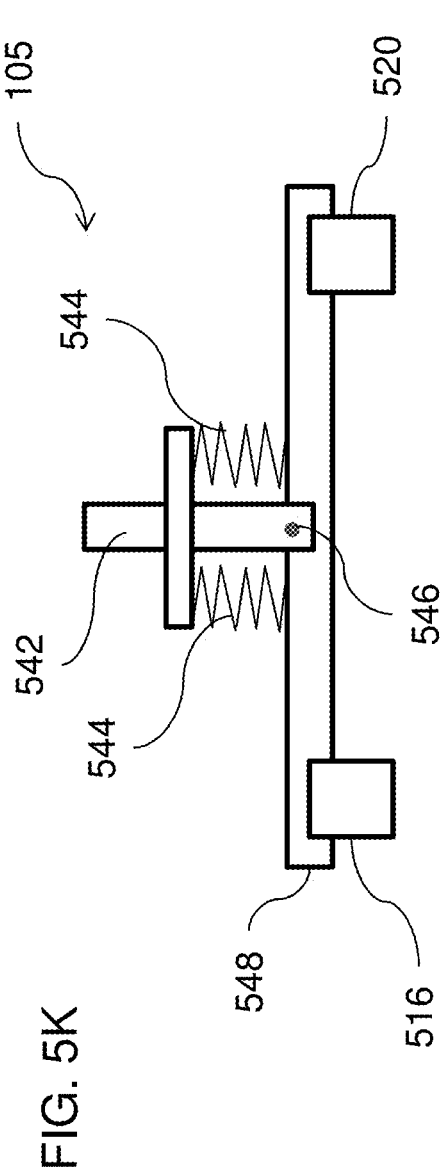

FIG. 5K depicts yet another schematic view (side view) of an example of the out-feed section 105. The centering mechanism 513 includes (and is not limited to): the centering member 516, the fourth centering member 520, an arm assembly 548, a biasing assembly 544 (which may include a spring), a lift assembly 542, and a pivot assembly 546. The centering member 516 and the fourth centering member 520 are positioned and mounted to opposite ends of the arm assembly 548. The lift assembly 542 is connected to a midsection of the arm assembly 548 at the pivot assembly 546. The pivot assembly 546 is configured to permit the arm assembly 548 to pivot vertically relative to the arm assembly 548. The biasing assembly 544 is coupled to the arm assembly 548 and to the lift assembly 542. The biasing assembly 544 is configured to permit the arm assembly 548 to pivot in response to the fourth centering member 520 accidentally (inadvertently) striking against an instance of a sticker (or other object). The biasing assembly 544 is also configured to permit the arm assembly 548 to return back to a substantially horizontal alignment once the lift assembly 542 is lifted because the inadvertent interference with a sticker or other object is resolved.

FIG. 5L depicts a side view of an example of the out-feed section 105, in which the centering mechanism 513 is depicted gripping the sticker 12 at a position that is extended away from the conveyor system 507 (not depicted in FIG. 5L); that is, the sticker 12 is positioned away from the conveyor system 507 of FIG. 5J.

FIGS. 5M and 5N depict perspective views of an example of the out-feed section 105, in which the centering mechanism 513 is depicted gripping the sticker 12 at a position that is extended away from the conveyor system 507 (not depicted in FIG. 5M or FIG. 5N); that is, the sticker 12 is positioned away from the conveyor system 507 of FIG. 5J.

FIG. 5O depicts an end view of an example of the out-feed section 105, in which the centering mechanism 513 is depicted gripping the sticker 12 at a position that is extended away from the conveyor system 507 (not depicted in FIG. 5O); that is, the sticker 12 is positioned away from the conveyor system 507 of FIG. 5J.

FIG. 5P depicts a side view of an example of the out-feed section 105, in which the centering mechanism 513 is depicted either gripping or centering the sticker 12 at a position that is extended to the conveyor system 507 (not depicted in FIG. 5P); that is, the sticker 12 is positioned on the conveyor system 507 of FIG. 5J.

FIGS. 5Q and 5R depict perspective views of an example of the out-feed section 105, in which the centering mechanism 513 is depicted either gripping or centering the sticker 12 at a position that is extended to the conveyor system 507 (not depicted in FIG. 5Q or FIG. 5R); that is, the sticker 12 is positioned on the conveyor system 507 of FIG. 5J.

FIG. 5S depicts an end view of an example of the out-feed section 105, in which the centering mechanism 513 is depicted either gripping or centering the sticker 12 at a position that is extended to the conveyor system 507 (not depicted in FIG. 5S); that is, the sticker 12 is positioned on the conveyor system 507 of FIG. 5J.

The following provides additional description for the out-feed section 105.

The out-feed section 105 includes (and is not limited to) one or more instances of the centering mechanism 513 (at least one mechanism). At least one instance of the centering mechanism 513 is configured to align a set of spaced-apart stickers along the centerlines of each sticker of the set of spaced-apart stickers at the places where the at least two centering points are located on each of the stickers.

The out-feed section 105 is configured to center (align) the sticker at the at least two centering points positioned on the sticker, and to adjusting variance in the width of the sticker.

The set of spaced-apart stickers include elongated sticks. The out-feed section 105 is configured to place the set of spaced-apart stickers in space-apart arrangement on successively constructed horizontally-aligned layers of a lumber stack 10. The spaced-apart arrangement is configured to permit free flowing communication of air between the horizontally-aligned layers of the lumber stack 10. The spaced-apart arrangement (of the spaced-apart stickers) is configured to define a set of outer limits or a set of horizontally-aligned footprints (also called the instances of the sticker-horizontal pocket 530). Each horizontally-aligned footprint of the set of horizontally-aligned footprint corresponds to a respective sticker to be placed on each horizontal layer of the lumber stack 10. The out-feed section 105 is configured to place each sticker (of the set of spaced-apart stickers) in a respective horizontal footprint of the set of horizontally-aligned footprints. Each horizontally-aligned footprint of a selected layer of the lumber stack 10 is vertically aligned with a corresponding horizontally-aligned footprint of other layers of the lumber stack 10. The vertical alignment of each horizontally-aligned footprint of each layer of the lumber stack 10 defines the sticker vertical pocket 534.

The out-feed section 105 is configured to align the stickers by mechanically centering each sticker at least two points (exactly two points may be sufficient enough for a majority of circumstances). The out-feed section 105 is configured to allow for variance in width at the at least two points. In that case, the out-feed section 105 is further configured to present the spaced-apart stickers either directly to the lumber stack 10, or to another mechanism (not depicted), and the other mechanism then places the set of spaced-apart stickers to the lumber stack 10. The centering mechanism 513 is configured to mechanically center the sticker at the at least two centering points, and to allow for variance in the width of at each of the at least two centering points, and/or a variance in the width of the sticker.

Specifically, the out-feed section 105 includes (and is not limited to) two centering mechanisms (which may be called grippers) that are spaced apart so that each centering mechanism is positioned or located at the two spaced apart centering points located on each of the stickers. The instances of the centering mechanism 513 (which may be called an alignment mechanism) are configured to move in a parallel fashion, and provide center based alignment; that is, the centerline of the centering mechanism 513 and the centerline of the sticker at both of the spaced apart centering points are positioned or oriented in-line with each other. The two centering mechanisms are located on a single apparatus (such as the arm assembly 548 for example) that is connected to a lift assembly 542. The lift assembly 542 is configured to lift the arm assembly 548 and the stickers that are gripped by the centering mechanism 513. The carriage assembly 536 is connected to the lift assembly 542, and the carriage assembly 536 is configured to be moved, via the carriage drive system 538. The carriage drive system 538 moves the centering mechanism 513 to a layer of the lumber stack 10 so as to permit the lift assembly 542 to place the stickers on the layer of the lumber stack 10, and the centering mechanism 513 releases the sticker so that the stickers remain in their respective sticker-horizontal pocket 530 on the layer of the lumber stack 10. Upon completion of placing the stickers on the layer of the lumber stack 10, the carriage 537 is moved from the outboard position (located above the layer of the lumber stack 10) to the inboard position located within the out-feed section 105, so that another set of stickers may be obtained for the next installation cycle to be repeated for positioning another set of stickers to another layer of the lumber stack 10; then the cycle is repeated and another layer is placed on the lumber stack 10 by the lumber stacker 6 of FIG. 1A.

Generally speaking, the out-feed section 105 is configured to center, grip and place a pattern of stickers for each layer of the lumber stack 10 as each layer of the lumber stack 10 is successively built by a lumber stacker 6.

Generally speaking, the out-feed section 105 is configured to center and to grip each sticker at positions that are set back from the end sections of the sticker.

Generally speaking, the out-feed section 105 improves the placement of warped stickers in such a way so as to place the warped stickers within a respective sticker-horizontal pocket 530 on the layer of the lumber stack 10.

More specifically, a set of instances of the centering mechanism 513 is configured to center and to grip respective stickers of the set of stickers conveyed into the out-feed section 105 at centering positions that are set back from end sections of each of the stickers.

The centering mechanism 513 is configured to detect whether a sticker is present, and for the cases where no sticker is detected by the centering mechanism 513 (when a sticker was expected to be present), the out-feed section 105 conveys a replacement sticker to the centering mechanism 513 (at the centering position or grip position) that has no sticker detected.

The centering mechanism 513 is configured to detect whether a sticker was improperly positioned relative to the centering mechanism 513, and for the cases where the centering mechanism 513 detected that a sticker was improperly positioned in the grip position, the out-feed section 105 removes and rejects the sticker, and conveys a replacement sticker to the grip position of the centering mechanism 513.

Specifically, the out-feed section 105 includes a conveyor system 507 having a pair of ganged chains each having opposed lugs.

Generally speaking, the out-feed section 105 is configured to convey a set of spaced-apart stickers to respective spaced-apart centering positions. The out-feed section 105 is also configured to maintain the spaced-apart alignment and position of each spaced-apart sticker at the spaced-apart centering positions within respective spaced-apart instances of the sticker-horizontal pocket 530 positioned at the spaced-apart centering positions.

Generally speaking, the out-feed section 105 moves the spaced-apart stickers from the inboard position to the outboard position. At the outboard position, the spaced apart stickers are placed on each layer of the lumber stack 10 in such a way that the spaced apart stickers remain within respective instances of the sticker-horizontal pocket 530 on each horizontal layer of the stack. Each horizontal layer is successively built.

Generally speaking, the out-feed section 105 places successive rows of spaced-apart stickers in their respective instances of sticker-horizontal pocket 530 on each layer of the lumber stack 10.

Each set of spaced-apart sticker received by the out-feed section 105 is moved from the conveyor system 507 to the top layer of a stack of lumber.

Once the set of the stickers is placed on the top layer of the lumber stack 10, the lumber stacker 6 (not included with the out-feed section 105 and is a known system) places another layer of lumber portions 8 on the set of stickers that were placed on the top of the lumber stack 10 by the out-feed section 105. The cycle is then repeated in such a way so as to alternate between layers of lumber portions 8 and sets of stickers between the layers of lumber portions 8 in the lumber stack 10.

A variation of the out-feed section 105 is such that the out-feed section 105 is configured to place sets of stickers on opposite sides of the out-feed section 105 for the case where instances of the lumber stack 10 are placed on opposite sides of the out-feed section 105. This variation may provide improved throughput efficiencies.

According to an example, the apparatus 100 includes (and is not limited to) a centering mechanism 513 configured to align a sticker conveyed to the centering mechanism 513 in such a way so as to align the sticker along a centerline of the sticker at least two centering points.

The alignment of the stickers is ensured via mechanically centering the stickers on the at least two centering points and allowing for variance in the width of at each of the at least two centering points.

The centering mechanism 513 is configured to present the stickers either directly or to another mechanism for placement on a lumber stack 10.

According to an option, the out-feed section 105 includes (and is not limited to) a detector assembly configured to detect a case where an improperly positioned sticker is present in the centering mechanism 513. The centering mechanism 513 is configured to release the improperly positioned sticker in response to the detector assembly providing an indication of an improperly positioned sticker in the centering mechanism 513. The conveyor system 507 is configured to convey a replacement sticker to the centering mechanism 513 in response to (A) the detector assembly detecting the improperly positioned sticker in the centering mechanism 513, and (B) that the centering mechanism 513 is ready to receive the replacement sticker.

According to an option, the out-feed section 105 includes (and is not limited to) a detector assembly configured to detect a case where a sticker is not present in the gripping assembly. The conveyor system 507 is configured to convey a replacement sticker to the centering mechanism 513 in response to the detector assembly providing an indication of no sticker is present in the centering mechanism 513.

The out-feed section 105 includes (and is not limited to) the centering mechanism 513 configured to: (i) grip a sticker at positions on the sticker in which the positions are set back from end sections of the sticker, and the (ii) place the sticker on the layer of the lumber stack 10.

The out-feed section 105 includes (and is not limited to) the centering mechanism 513 configured to: (i) grip a sticker at positions on the sticker in which the positions are set back from end sections of the sticker, the (ii) place the sticker on the layer of the lumber stack 10 in such a way that each sticker placed on each layer of the lumber stack 10 remains within their respective sticker-horizontal pocket 530.

The out-feed section 105 includes one or more instances of the centering mechanism 513 configured to align or center stickers along a centerline of the stickers at least two points, so that the stickers once so aligned and placed in the lumber stack 10, are placed within respective instances of the sticker-horizontal pocket 530 on each layer of the lumber stack 10. The instances of the sticker-horizontal pocket 530 are positioned in a vertical orientation in the lumber stack 10, such that one instance of the sticker-horizontal pocket 530 is positioned (projected) over another instance of the sticker-horizontal pocket 530 of each layer of the lumber stack 10, for each sticker positioned and placed in the lumber stack 10.

Alternatively, in accordance with another case, the alignment mechanism is configured to align each sticker in their respective sticker-horizontal pocket 530, and auxiliary equipment is used for performing the gripping and placement of the sticker (such as a vacuum suction system having suction cups configured to grip the stickers as the stickers remain in their respective instances of pocket.

According to an example, the centering mechanism 513 includes (and is not limited to) two alignment mechanisms: a first pair of instances of the centering member 514, 516 and a second pair of instances of the centering member 518, 520 (each of which may be called grippers), each of which are spaced apart from each other at fixed positions or points relative to each other. The instances of the centering member 514, 516, 518, 520 are each configured to move in a parallel manner in such a way as to provide center-based alignment of the stickers; that is, the centerline of the instances of the centering member 514, 516, 518, 520 and the centerline of the sticker at both centering positions or points are in-line relative to each other. Upon completion of placing the sticker on the lumber package, the instances of the centering member 514, 516, 518, 520 are returned to a home position for the pick-up of subsequent stickers from the out-feed section 105.

According to an option, the out-feed section 105 is configured to grip the stickers at positions on the stickers in such a way that the gripped positions on the stickers maintains the central alignment of the stickers relative to each other once the stickers are placed on the lumber stack, each sticker positioned in a respective pocket on the layer of the lumber stack 10.

Once the out-feed section 105 places the spaced apart stickers on a layer of the lumber stack 10, the stickers are centrally vertically aligned relative to each other in such a way that the weight of the lumber stack may substantially bear down through the centrally vertically aligned stickers, while reducing (minimizing) the loading of the weight of the lumber stack through the lumber portions of the lumber stack.

The stickers as positioned by the out-feed section 105 in the lumber stack bear as much weight as possible by increasing surface contact of the stickers as positioned by the out-feed section 105 onto or into the lumber stack.

The out-feed section 105 improves the placement of warped stickers, so that the warped stickers as positioned in the lumber stack by the out-feed section 105 bear as much weight as possible even though the sticker is warped.

The quality-control section 103 may be used in conjunction with the out-feed section 105, such that the quality-control section 103 removes warped (deformed) stickers. The sticker is warped to a degree that if the deformed sticker is placed on a layer of the lumber stack 10, the deformed sticker does not remain within a respective sticker-horizontal pocket 530 positioned on the layer of the lumber stack 10. The overly deformed sticker, if placed on the layer in the lumber stack 10, may take on less load or weight of the lumber stack 10, and thus more load (weight) may be inadvertently (undesirably) transferred to the lumber portions of the lumber stack 10 along the vertical direction; this case may lead to unwanted waste of lumber portions that become warped during baking in the oven.

For the case where the lumber stack is placed in an oven and is baked to drive out moisture from the green lumber portions in the lumber stack, and the green lumber is preloaded and bears some weight from the lumber stack, then the lumber portion becomes warped while it is baked (to drive out moisture); once removed from the oven, the lumber portion is warped, damaged and not usable for further production; this condition is not desirable for the case where the lumber portion includes relatively expensive hardwoods. The desire is to reduce the wastage of hardwoods exiting from the ovens.

More specifically, the centering mechanism 513 is configured to centrally align at positions that are set back from the end sections of the sticker, and to grip the sticker just so positioned within its sticker-horizontal pocket 530. Once the stickers are placed on each layer of the lumber stack 10, the stickers once placed are such that the instances of the sticker-horizontal pocket 530 of each instance of the sticker 12 is located in a substantially vertically aligned arrangement through the lumber stack 10, one instance of the sticker-horizontal pocket 530 vertically positioned over another instance of the sticker-horizontal pocket 530 through the layers of the lumber stack 10. In this manner, the weight of the lumber portions 8 of the lumber stack 10 are more evenly distributed in such a way that once the lumber stack 10 is baked in the oven, the weight distribution is substantially transferred through the stickers placed in their respective instances of sticker-horizontal pocket 530, while substantially reducing the distribution of weight to the lumber portions 8 of the stack; in this manner, the amount of inadvertent warping of the lumber portions 8 in the lumber stack 10 may be reduced (at least in part) while the lumber stack 10 is baked in the oven.

Specifically, the out-feed section 105 includes (and is not limited to) a conveyor system 507 having a pair of ganged spaced-apart chains (which may also be called belts) each having opposed lugs positioned on opposite sides of the chains, each lug configured to abut a respective sticker. The conveyor system 507 transports the stickers into the out-feed section 105 to an alignment position for each sticker.

Generally speaking, the apparatus 100 includes) and is not limited to) a centering mechanism 513. The centering mechanism 513 is configured to align a sticker conveyed to the centering mechanism 513 in such a way as to center the sticker at the at least two centering points relative to a reference point.

In accordance with another example, the apparatus 100 includes (and is not limited to) a controller configured to control a centering mechanism 513 in such a way as to cause the centering mechanism 513 to align a sticker conveyed to the centering mechanism 513 in such a way as to center the sticker in at least two centering points relative to a reference point. For example, the controller may include programmed instructions (or equivalent) configured to instruct the controller.

Figure 6A:
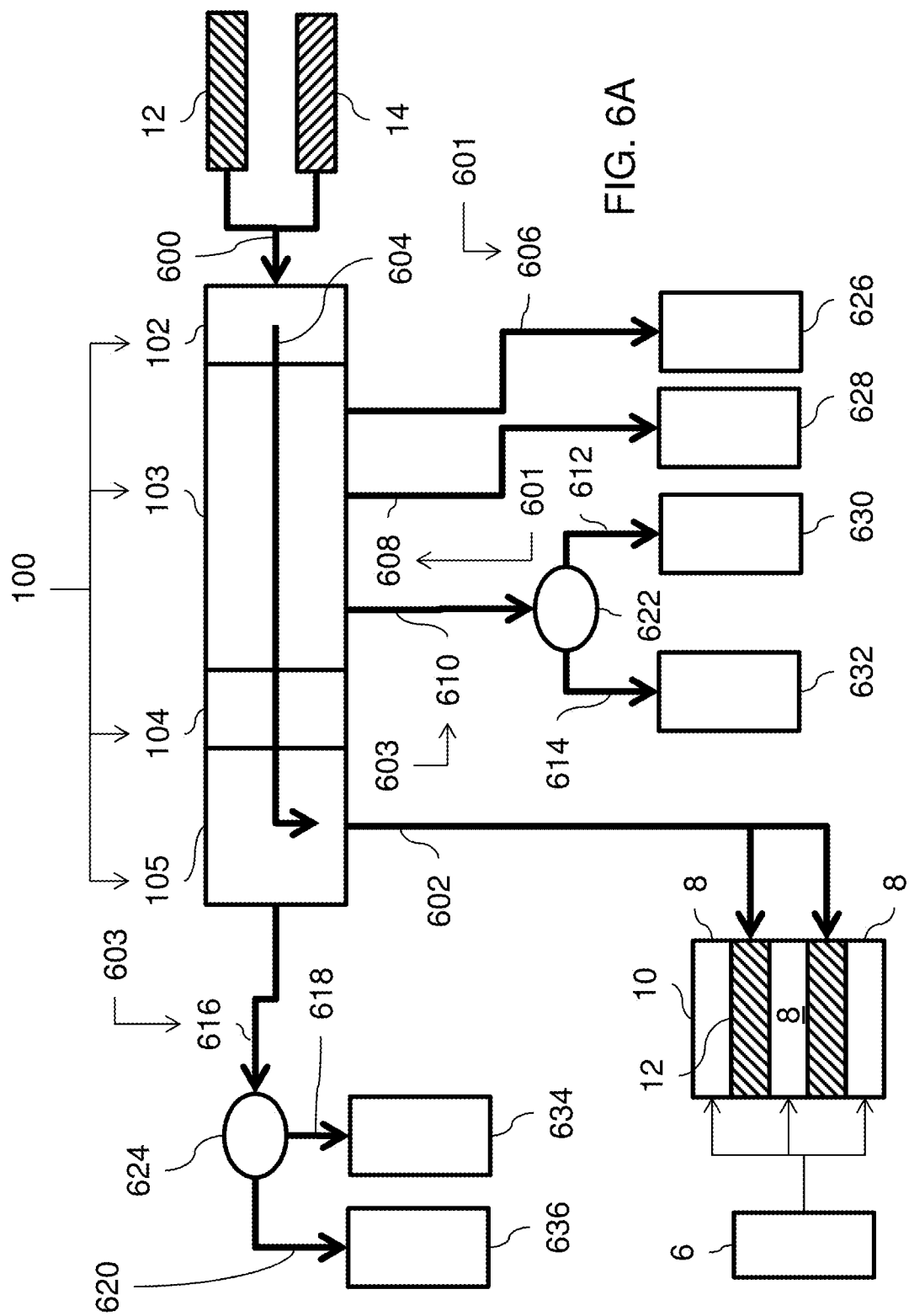
FIG. 6A depicts a schematic representation of an example of the apparatus of FIG. 1.

FIG. 6A depicts the schematic representation of an example of the apparatus 100 of FIG. 1. FIGS. 6B, 6C and 6D depict example cross-sectional profiles of a sticker used in the apparatus 100 of FIG. 6A.

The apparatus 100 of FIG. 6A includes an in-feed path 600, an out-feed path 602, and a travel path 604. The in-feed path 600 is configured to receive at least any one of a first sticker type (such as the sticker 12) and a second sticker type (such as the sticker 14). The out-feed path 602 is configured to convey and to place a collection having any one of the first sticker type and the second sticker type to a lumber stack 10 in accordance with a predetermined pattern. The travel path 604 extends from the in-feed path 600 to the out-feed path 602. The travel path 604 is configured to accommodate travel of any one of the first sticker type and the second sticker type from the in-feed path 600 to the out-feed path 602.

According to the example depicted in FIG. 6A, the travel path 604 extends from the in-feed section 102, through the quality-control section 103, through the interface section 104, and to the out-feed section 105.

According to an option, the apparatus 100 also includes a first ejection path 606 extending from the travel path 604. The first ejection path 606 is configured to eject the at least any one of the first sticker type and the second sticker type in response to a sensor. The sensor is configured to detect a length dimension error (such as, the sticker is too short lengthwise) that is associated with an instance of any one the first sticker type and the second sticker type that moves along the travel path 604 (through the apparatus 100). The sensor is positioned along the travel path 604. The sensor (active or passive) may be used in or along the travel path 604 in conjunction with the first ejection path 606. The sensor (proximity sensor for example) is configured to detect (identify) the instances of the stickers that are too short (lengthwise short) are permanently removed (culled) from the travel path 604. A tippler assembly is positioned in the travel path 604, and the tippler assembly is configured to remove the unwanted instances of the sticker along the first ejection path 606; these unwanted instances of the sticker should not be re-introduced to the in-feed path 600, but are set aside for other potential uses.

According to an option, the sensor includes a length-detection mechanism having an adjustable under-length mechanism (that may be mechanically adjustable). The adjustable under-length mechanism is configured to detect instances of an under-length sticker (stick) that passes by the adjustable under-length mechanism; the instances of the under-length stick (undesirable sticks) drop out and away from the adjustable under-length mechanism. The sensor may further include a scanner device; the instances of the stick (that are not classified as being under length but as having a proper length) may pass by the adjustable under-length mechanism, and then pass through a scanner area of the scanner device. The scanner device is known and is not further described here. The scanner device is configured to inspect the sticks for various conditions such as: an over-length condition, an under-length condition, a dimension (such as height and width) condition, and/or a stick-straightness condition. The stick-straightness condition may be called a curve condition and/or a bow condition. A properly oriented stick (having a width dimension flat on the chain surface or on the conveyor surface) may show (or have): (A) a bow condition (for the case where the stick has a bow condition) in (or along) a vertical dimension of the stick, and (B) a curve in a horizontal axis of the stick. An advantage with the apparatus 100 may have the ability to sense, eject, and replace (preferably automatically) an out-of-spec curved and bowed stick (preferably in the quality-control section 103 of the apparatus 100 but not limited to the quality-control section 103).

According to another option, the apparatus 100 also includes a second ejection path 608 extending from the travel path 604. The second ejection path 608 is configured to eject the at least any one of the first sticker type and the second sticker type in response to a sensor detecting an error. The error may include any one of a height dimension error, a width dimension error, a curved dimensional error, and/or a bowed dimensional error) associated with an instance of any one the first sticker type and the second sticker type that moves along the travel path 604. The sensor (active or passive) may be used in or along the travel path 604 in conjunction with the second ejection path 608. The sensor is configured to detect (identify) the instances of the stickers in which their height is too short and their width is too short: that is, the height and width of the cross-sectional profile of a sticker); and these unwanted stickers are permanently removed (culled) from the travel path 604. Reference is made to FIGS. 6B and 6C. FIG. 6B shows an acceptable profile of a sticker 12 (both height 640 and width 638 of the cross section of the sticker 12 are acceptable). FIG. 6C shows an unacceptable profile of a sticker 12 (both the height 640 is not acceptable and the width 638 is not acceptable, and this is not an instance in which the height and width are accidentally switched around).

Returning back to FIG. 6A, a tippler assembly is placed in the travel path 604. The tippler assembly is configured to remove the unwanted instances of the sticker along the second ejection path 608; the instances of the unwanted stickers should not be re-introduced to the in-feed path 600, but are set aside for other possible uses if so desired.

According to an option, the apparatus 100 also includes a third ejection path 610 extending from the travel path 604. The third ejection path 610 is configured to eject the at least any one of the first sticker type and the second sticker type in response to a sensor detecting that a height and width dimension of an instance of any one the first sticker type and the second sticker type that are correct but are switched with each other. FIG. 6D depicts this case. FIG. 6D depicts the sticker of FIG. 6C but merely switched in which the height of FIG. 6C is now the width of FIG. 6D (etc.). The profile of the sticker of FIG. 6D is acceptable but the cross-sectional profile is mis-oriented (not properly oriented). The sticker of FIG. 6D is still acceptable if it is removed from the travel path 604 and then subsequently reintroduced to the in-feed path 600. A sensor (active or passive) may be used in or along the travel path 604 in conjunction with the third ejection path 610. The sensor is configured to detect (identify) the instances of the stickers that are mis-oriented; that is, the cross-sectional profile is mis-oriented—the height and width are correct in dimension (within tolerance) but that the sticker is flipped the wrong way in its cross-sectional profile.

These instances of the sticker do not have to be permanently removed from the travel path 604. Reference is made to FIGS. 6B and 6D; FIG. 6B shows an acceptable profile of the sticker 12 (both height and width are acceptable). FIG. 6C shows the case where the sticker is accidentally flipped in cross-sectional profile. The height and width are switched around relative to the orientation shown in FIG. 6C.

Returning back to FIG. 6A, a tippler assembly is positioned in the travel path 604. The tippler assembly is configured to remove unwanted instances of the sticker along the third ejection path 610; these instances of the unwanted stickers may be re-introduced to the in-feed path 600 because the cross-sectional profile of the sticker was not set up properly (the height and width dimensions are switched around) on the travel path 604; the stickers rejected along the third ejection path 610 have proper length dimensions.

According to an option, the apparatus 100 also includes a first collection assembly 626 configured to receive instance of any one the first sticker type and the second sticker type from the first ejection path 606. The first collection assembly 626 may include a bin and/or a conveyor, as may be desired.

According to an option, the apparatus 100 also includes a second collection assembly 628 configured to receive instance of any one the first sticker type and the second sticker type from the second ejection path 608. The second collection assembly 628 may include a bin and/or a conveyor, as may be desired.

Generally speaking, the instances of the first sticker type and the second sticker type that are received by the first collection assembly 626 and by the second collection assembly 628 are not reused or not placed back into the in-feed section 102; the reason is that these instances of the sticker do not satisfy the dimensional requirements of any one of a length dimension, a width dimension, a height dimension, a curve dimension, and/or a bow dimension). These instances may be culled (that is, permanently removed) from the collection of stickers, or manually re-checked for dimensional tolerances if so desired to confirm that the dimensional sensors are properly operating.

According to an option, the apparatus 100 is adjusted such that the third ejection path 610 includes a separator assembly 622, a first ejector track 612, and a second ejector track 614. The separator assembly 622 is configured to operatively connect to the third ejection path 610. The first ejector track 612 extends from the separator assembly 622. The second ejector track 614 extends from the separator assembly 622. The separator assembly 622 is configured to (A) receive instance of any one the first sticker type and the second sticker type from the third ejection path 610. The separator assembly 622 is also configured to (B) convey an instance of any one the first sticker type and the second sticker type to the first ejector track 612 for the case where the instance is a member of first sticker type. The separator assembly 622 is also configured to (C) convey an instance of any one the first sticker type and the second sticker type to the second ejector track 614 for the case where the instance is a member of second sticker type.

According to an option, the apparatus 100 also includes a first collector assembly 630, and a second collector assembly 632. The first collector assembly 630 is configured to receive instance of any one the first sticker type and the second sticker type from the first ejector track 612. The second collector assembly 632 is configured to receive instance of any one the first sticker type and the second sticker type from the second ejector track 614. The first collector assembly 630 and the second collector assembly 632 may include a bin and/or a conveyor, as may be desired.

The instances of the first sticker type and the second sticker type that are received by the first collector assembly 630 and by the second collector assembly 632 may be reused or placed into the in-feed section 102, since these instances satisfy the dimensional requirements of length, width and height.

It will be appreciated that there may be any number of ejection paths that may be implemented in the apparatus 100 for a particular application requires. The quality-control section 103 includes the first ejection path 606, the second ejection path 608, and the third ejection path 610; this is the preferred set-up for apparatus 100. However it will be appreciated that the first ejection path 606, the second ejection path 608, and the third ejection path 610 may be positioned where desired or where convenient in the apparatus 100 (depending on a particular application).

After the instance of the stickers depart the quality-control section 103, the stickers may become accidentally flipped, the cross-section is flipped) as a result of the conveyor of interface section 104 accidentally jarring the instances of the sticker as the stickers travel through the interface section 104 toward the out-feed section 105. These instances of the sticker flip, dance, jarred. The discharge path 616 may be used to remove these misaligned stickers (cross-sectional misaligned stickers) from the travel path 604.

For example, the centering mechanism 513 (also may be called a gripper) may be further configured to detect profile mis-orientation of instances of the sticker prior to the centering mechanism 513 gripping and picking up the instance of the sticker. The centering mechanism 513 may include a sensor configured to detect the height and the width of the instance of a sticker, and logic may be used to determine whether the sticker has become mis-oriented (the height and width are accidentally flipped or switched around).

For the case where at least one instance of the centering mechanism 513 of the out-feed section 105 (of FIG. 5J), such as the gripper for example, has detected or sensed certain conditions (such as condition (A) and/or condition (B), then certain actions may be taken. For example, condition (A) includes profile mis-orientation associated with an instance of a sticker. Condition (B) includes another dimensional abnormality. The certain actions may include (for example) the remaining instances of the centering mechanism 513 pick up (grip) their associated instances of the stickers (provided these associated instances of the stickers have proper dimensions and/or proper cross-sectional orientation). Then, the conveyor system 507 of the out-feed section 105 flushes out (removes) the instance(s) of the sticker having profile mis-orientation (or any other dimensional errors) toward and out through the discharge path 616. Then the conveyor system 507 receives a fresh set of stickers (in accordance with a predetermined sticker pattern as may be required) from the interface section 104. Then the centering mechanism 513 that is currently empty may now retest the instance of a sticker placed immediately underneath the centering mechanism 513. For the case where the sensor of the centering mechanism 513 detects that the sticker has a cross-sectional profile (or the sensor tests and detects for all or some additional dimensional attributes if so desired) that is acceptable, then the centering mechanism 513 picks up that acceptable sticker. Then the instances of the centering mechanism 513 may then proceed to convey their stickers via the travel path 604 and out via the out-feed path 602, while the remaining stickers positioned on the conveyor system 507 are moved out via the discharge path 616. Now, the out-feed section 105 may receive another fresh set of stickers (in accordance with a predetermined sticker pattern) from the interface section 104, and the cycle may be repeated accordingly.

According to an option, the apparatus 100 also includes a discharge path 616 extending from the travel path 604 through the out-feed section 105. The discharge path 616 is configured to eject the at least any one of the first sticker type and the second sticker type in response to a sensor detecting that a height and width dimension of an instance of any one the first sticker type and the second sticker type are correct but switched with each other. It will be appreciated that there may be any number of discharge (ejection) paths due to quality control reasons.

According to an option, the discharge path 616 includes a separation assembly 624, a first discharge track 618, and a second discharge path 620. The separation assembly 624 is configured to operatively connect to the discharge path 616. The first discharge track 618 extends from the separation assembly 624. The second discharge path 620 extends from the separation assembly 624. The separation assembly 624 is configured to (A) receive instance of any one the first sticker type and the second sticker type from the discharge path 616. The separation assembly 624 is also configured to: (B) convey an instance of any one the first sticker type and the second sticker type to the first discharge track 618 for the case where the instance is a member of first sticker type. The separation assembly 624 is also configured to (C) convey an instance of any one the first sticker type and the second sticker type to the second discharge path 620 for the case where the instance is a member of second sticker type.

According to an option, the apparatus 100 also includes a first receiver assembly 634, and a second receiver assembly 636. The first receiver assembly 634 is configured to receive instance of any one the first sticker type and the second sticker type from the second discharge path 620. The second receiver assembly 636 is configured to receive instance of any one the first sticker type and the second sticker type from the first discharge track 618. The first receiver assembly 634 and the second receiver assembly 636 may include a bin and/or a conveyor, as may be desired.

The instances of the first sticker type and the second sticker type that are received by the first receiver assembly 634 and by the second receiver assembly 636 may be reused or placed into the in-feed section 102, since these instances satisfy the dimensional requirements of length, width and height.

Generally speaking, the apparatus 100 may includes a fatal ejection path 601 extending from the travel path 604. The fatal ejection path 601 is configured to eject the at least any one of the first sticker type and the second sticker type in response to a sensor detecting a fatal dimension error associated with an instance of any one the first sticker type and the second sticker type. The instance of the sticker is not usable for feeding to the in-feed path 600. Examples of the fatal ejection path 601 include the first ejection path 606 and the second ejection path 608. It will be appreciated that there may be any number of discharge paths due to quality control reasons.

Generally speaking, the apparatus 100 may include a non-fatal ejection path 603 extending from the travel path 604. The non-fatal ejection path 603 is configured to eject the at least any one of the first sticker type and the second sticker type in response to a sensor detecting a non-fatal dimension error associated with an instance of any one the first sticker type and the second sticker type. The instance of the sticker is usable for feeding to the in-feed path 600. Examples of the non-fatal ejection path 603 include the third ejection path 610 and the discharge path 616.

In accordance with an option, in which the apparatus 100 conveys one type of sticker to the lumber stack 10, the apparatus 100 includes an in-feed path 600, an out-feed path 602, a travel path 604, a fatal ejection path 601, and a non-fatal ejection path 603. The in-feed path 600 is configured to receive the stickers. The out-feed path 602 is configured to convey and to place a collection of the stickers to the lumber stack 10 in accordance with a predetermined sticker pattern. The travel path 604 extendes from the in-feed path 600 to the out-feed path 602. The travel path 604 is configured to accommodate travel of the stickers from the in-feed path 600 to the out-feed path 602. The fatal ejection path 601 extendes from the travel path 604. The fatal ejection path 601 is configured to eject an instance of the stickers in response to a sensor detecting a fatal dimension error associated with an instance of the stickers (and the instance of the sticker is not usable for feeding to the in-feed path 600). The non-fatal ejection path 603 extendes from the travel path 604. The non-fatal ejection path 603 is configured to eject an instance of the stickers in responce to a sensor detecting a non-fatal dimension error associated with the instance stickers (and the instance of the sticker having the non-fatal dimension error, but is mis-oriented, is usable for feeding to the in-feed path 600).

The following provides additional description applicable to any controller mentioned and/or described above:

According to one option, any one of the controllers identified above may include controller-executable instructions configured to operate the controller in accordance with the description provided above. The controller may use computer software, or just software, which is a collection of computer programs (controller-executable instructions) and related data that provide the instructions for instructing the controller what to do and how to do it. In other words, software is a conceptual entity that is a set of computer programs, procedures, and associated documentation concerned with the operation of a controller assembly (also may be called a data-processing system). Software refers to one or more computer programs and data held in a storage assembly (a memory module) of the controller assembly for some purposes. In other words, software is a set of programs, procedures, algorithms and its documentation. Program software performs the function of the program it implements, either by directly providing instructions to computer hardware or by serving as input to another piece of software. In computing, an executable file (executable instructions) causes the controller to perform indicated tasks according to encoded instructions, as opposed to a data file that must be parsed by a program to be meaningful. These instructions are machine-code instructions for a physical central processing unit. However, in a more general sense, a file containing instructions (such as bytecode) for a software interpreter may also be considered executable; even a scripting language source file may therefore be considered executable in this sense. While an executable file can be hand-coded in machine language, it is far more usual to develop software as source code in a high-level language understood by humans, or in some cases, an assembly language more complex for humans but more closely associated with machine code instructions. The high-level language is compiled into either an executable machine code file or a non-executable machine-code object file; the equivalent process on assembly language source code is called assembly. Several object files are linked to create the executable.

The same source code can be compiled to run under different operating systems, usually with minor operating-system-dependent features inserted in the source code to modify compilation according to the target. Conversion of existing source code for a different platform is called porting. Assembly-language source code and executable programs are not transportable in this way. An executable comprises machine code for a particular processor or family of processors. Machine-code instructions for different processors are completely different and executables are totally incompatible. Some dependence on the particular hardware, such as a particular graphics card may be coded into the executable. It is usual as far as possible to remove such dependencies from executable programs designed to run on a variety of different hardware, instead installing hardware-dependent device drivers on the controller, which the program interacts with in a standardized way. Some operating systems designate executable files by filename extension (such as .exe) or noted alongside the file in its metadata (such as by marking an execute permission in Unix-like operating systems). Most also check that the file has a valid executable file format to safeguard against random bit sequences inadvertently being run as instructions. Modern operating systems retain control over the resources of the controller, requiring that individual programs make system calls to access privileged resources. Since each operating system family features its own system call architecture, executable files are generally tied to specific operating systems, or families of operating systems. There are many tools available that make executable files made for one operating system work on another one by implementing a similar or compatible application binary interface. When the binary interface of the hardware the executable was compiled for differs from the binary interface on which the executable is run, the program that does this translation is called an emulator. Different files that can execute but do not necessarily conform to a specific hardware binary interface, or instruction set, can be represented either in bytecode for Just-in-time compilation, or in source code for use in a scripting language.

According to another option, the controller includes application-specific integrated circuits configured to operate any assembly or apparatus or system, etc., in accordance with the description provided above. It may be appreciated that an alternative to using software (controller-executable instructions) in the controller is to use an application-specific integrated circuit (ASIC), which is an integrated circuit (IC) customized for a particular use, rather than intended for general-purpose use. For example, a chip designed solely to run a cell phone is an ASIC. Some ASICs include entire 32-bit processors, memory blocks including ROM, RAM, EEPROM, Flash and other large building blocks. Such an ASIC is often termed a SoC (system-on-chip). Designers of digital ASICs use a hardware description language (HDL) to describe the functionality of ASICs. Field-programmable gate arrays (FPGA) are used for building a breadboard or prototype from standard parts; programmable logic blocks and programmable interconnects allow the same FPGA to be used in many different applications. For smaller designs and/or lower production volumes, FPGAs may be more cost effective than an ASIC design. A field-programmable gate array (FPGA) is an integrated circuit designed to be configured by the customer or designer after manufacturing—hence field-programmable. The FPGA configuration is generally specified using a hardware description language (HDL), similar to that used for an application-specific integrated circuit (ASIC) (circuit diagrams were previously used to specify the configuration, as they were for ASICs, but this is increasingly rare). FPGAs can be used to implement any logical function that an ASIC could perform. The ability to update the functionality after shipping, partial re-configuration of the portion of the design and the low non-recurring engineering costs relative to an ASIC design offer advantages for many applications. FPGAs contain programmable logic components called logic blocks, and a hierarchy of reconfigurable interconnects that allow the blocks to be wired together—somewhat like many (changeable) logic gates that can be inter-wired in (many) different configurations. Logic blocks can be configured to perform complex combinational functions, or merely simple logic gates like AND and XOR. In most FPGAs, the logic blocks also include memory elements, which may be simple flip-flops or more complete blocks of memory. In addition to digital functions, some FPGAs have analog features. The most common analog feature is programmable slew rate and drive strength on each output pin, allowing the engineer to set slow rates on lightly loaded pins that would otherwise ring unacceptably, and to set stronger, faster rates on heavily loaded pins on high-speed channels that would otherwise run too slow. Another relatively common analog feature is differential comparators on input pins designed to be connected to differential signaling channels. A few "mixed signal FPGAs" have integrated peripheral Analog-to-Digital Converters (ADCs) and Digital-to-Analog Converters (DACs) with analog signal conditioning blocks allowing them to operate as a system-on-a-chip. Such devices blur the line between an FPGA, which carries digital ones and zeros on its internal programmable interconnect fabric, and field-programmable analog array (FPAA), which carries analog values on its internal programmable interconnect fabric.

The following clauses are offered as further description of the examples of the apparatus 100 and of the method associated with the apparatus 100. Any one or more of the following clauses may be combinable with any another one or more of the following clauses. Any one of the following clauses may stand on its own merit without having to be combined with another other of the clauses. Clause (1): an apparatus 100 of any clause mentioned in this paragraph, further comprising: an interface section 104 including: a conveyor system 401 being configured to: interface with an input 418 having an input conveyance stream; interface with an output 420 having an output conveyance stream; receive items from the input 418 at an intake rate in which the items are made available to the input 418; provide the items to the output 420 at an exit rate in which the items are required to exit from the output 420; and convey the items through same path via multiple separate mechanisms. Clause (2): the apparatus 100 of any clause mentioned in this paragraph, wherein: the conveyor system 401 is further configured to receive the items and to provide the items in such a way that the items are received and are provided in an overlapping fashion at least in part. Clause (3): the apparatus 100 of any clause mentioned in this paragraph, wherein: the conveyor system 401 includes: an endless loop mechanism having protrusions being configured to convey instances of the item one after the other. Clause (4): the apparatus 100 of any clause mentioned in this paragraph, wherein: the conveyor system 401 includes: at least two sets of at least one ganged continuous looped conveyor devices having protrusions configured to convey the items. Clause (5): the apparatus 100 of any clause mentioned in this paragraph, wherein: the conveyor system 401 includes: a first chain 402 and a second chain 404 ganged to each other; and a third chain 406 and a fourth chain 408 ganged to each other; the first chain 402 and the second chain 404 being coaxially aligned with the third chain 406 and the fourth chain 408; and the first chain 402 and the second chain 404 and the third chain 406 and the fourth chain 408 being configured such that as the first chain 402 and the second chain 404 receive the items from the input 418 at the intake rate in which the items are made available to the input 418, the third chain 406 and the fourth chain 408 provide the items to the output 420 at the exit rate in which the items are required to exit from the output 420. Clause (6): the apparatus 100 of any clause mentioned in this paragraph, wherein: the conveyor system 401 is further configured to provide the items to the output 420 in accordance with a predetermined spacing between the items. Clause (7): an apparatus 100 of any clause mentioned in this paragraph, further comprising: an interface section 104, including: at least two conveyors 402, 404, 406, 408 each being configured to: operate at conveyance rates being independent of each other; receive from an input conveyance stream; and provide to an output conveyance stream. Clause (8): an apparatus 100 of any clause mentioned in this paragraph, further comprising: an interface section 104, including: endless-loop conveyors 402, 404, 406, 408 each being configured to interface with an input conveyance stream and with an output conveyance stream; each of the endless-loop conveyors 402, 404, 406, 408 being configured to: receive items from the input conveyance stream at an intake rate in which the items are made available from the input conveyance stream; provide the items to the output conveyance stream at an exit rate in which the items are required to exit to the output conveyance stream. Clause (9): an apparatus 100 of any clause mentioned in this paragraph, further comprising: an interface section 104, including: endless-loop conveyors 402, 404, 406, 408 each being configured to interface with an input conveyance stream and with an output conveyance stream; the endless-loop conveyors 402, 404, 406, 408 being configured to operate in such a way that: as an endless-loop conveyor 402, 404 receives from the input conveyance stream, the remaining endless-loop conveyors 406, 408 do not receive from the input conveyance stream; and as the endless-loop conveyor 402, 404 provides to the output conveyance stream, and any remaining endless-loop conveyors 406, 408 do not provide to the output conveyance stream. Clause (10): an apparatus 100 of any clause mentioned in this paragraph, further comprising: an interface section 104, including: endless-loop conveyors 402, 404, 406, 408 each being configured to interface with an input conveyance stream and with an output conveyance stream; each of the endless-loop conveyors 402, 404, 406, 408 being configured to: receive items from the input conveyance stream at an intake rate in which the items are made available from the input conveyance stream; provide the items to the output conveyance stream at an exit rate in which the items are required to exit to the output conveyance stream; and the endless-loop conveyors 402, 404, 406, 408 being configured to operate in such a way that: as an endless-loop conveyor 402, 404 receives from the input conveyance stream, the remaining endless-loop conveyors 406, 408 do not receive from the input conveyance stream; and as the endless-loop conveyor 402, 404 provides to the output conveyance stream, the remaining endless-loop conveyors 406, 408 do not provide to the output conveyance stream. Clause (11): an apparatus 100 of any clause mentioned in this paragraph, further comprising: an interface section 104, including: endless-loop conveyors 402, 404, 406, 408 each being configured to interface with an input conveyance stream and with an output conveyance stream; the endless-loop conveyors 402, 404, 406, 408 being configured to operate in such a way that: as an endless-loop conveyor 402, 404 receives, at least in part, from the input conveyance stream, the remaining endless-loop conveyors 406, 408 provide, at least in part, to the output conveyance stream; and as the endless-loop conveyor 402, 404 provides, at least in part, to the output conveyance stream, the remaining endless-loop conveyors 406, 408 receive, at least in part, from the input conveyance stream. Clause (12): an apparatus 100 of any clause mentioned in this paragraph, further comprising: an interface section 104, including: endless-loop conveyors 402, 404, 406, 408 each being configured to interface with an input conveyance stream and with an output conveyance stream; each of the endless-loop conveyors 402, 404, 406, 408 being configured to: receive items from the input conveyance stream at an intake rate in which the items are made available from the input conveyance stream; and provide the items to the output conveyance stream at an exit rate in which the items are required to exit to the output conveyance stream; and the endless-loop conveyors 402, 404, 406, 408 being configured to operate in such a way that: as an endless-loop conveyor 402, 404 receives, at least in part, from the input conveyance stream, the remaining endless-loop conveyors 406, 408 provide, at least in part, to the output conveyance stream; and as the endless-loop conveyor 402, 404 provides, at least in part, to the output conveyance stream, the remaining endless-loop conveyors 406, 408 receive, at least in part, from the input conveyance stream. Clause (13): an apparatus 100 of any clause mentioned in this paragraph, further comprising: an interface section 104, including: endless-loop conveyors 402, 404, 406, 408 each being configured to interface with an input conveyance stream and with an output conveyance stream; the endless-loop conveyors 402, 404, 406, 408 being configured to operate in such a way that: as an endless-loop conveyor 402, 404 receives from the input conveyance stream, the remaining endless-loop conveyors 406, 408 do not receive from the input conveyance stream; as the endless-loop conveyor 402, 404 provides to the output conveyance stream, the remaining endless-loop conveyors 406, 408 do not provide to the output conveyance stream; as the endless-loop conveyor 402, 404 receives, at least in part, from the input conveyance stream, the remaining endless-loop conveyors 406, 408 provide, at least in part, to the output conveyance stream; and as the endless-loop conveyor 402, 404 provides, at least in part, to the output conveyance stream, the remaining endless-loop conveyors 406, 408 receive, at least in part, from the input conveyance stream. Clause (14): an apparatus 100 of any clause mentioned in this paragraph, further comprising: an interface section 104, including: endless-loop conveyors 402, 404, 406, 408 each being configured to interface with an input conveyance stream and with an output conveyance stream; each of the endless-loop conveyors 402, 404, 406, 408 being configured to: receive items from the input conveyance stream at an intake rate in which the items are made available from the input conveyance stream; and provide the items to the output conveyance stream at an exit rate in which the items are required to exit to the output conveyance stream; and the endless-loop conveyors 402, 404, 406, 408 being configured to operate in such a way that: as an endless-loop conveyor 402, 404 receives from the input conveyance stream, the remaining endless-loop conveyors 406, 408 do not receive from the input conveyance stream; as the endless-loop conveyor 402, 404 provides to the output conveyance stream, the remaining endless-loop conveyors 406, 408 do not provide to the output conveyance stream; as the endless-loop conveyor 402, 404 receives, at least in part, from the input conveyance stream, the remaining endless-loop conveyors 406, 408 provide, at least in part, to the output conveyance stream; and as the endless-loop conveyor 402, 404 provides, at least in part, to the output conveyance stream, the remaining endless-loop conveyors 406, 408 receive, at least in part, from the input conveyance stream. Clause (15): an apparatus 100 of any clause mentioned in this paragraph, further comprising: at least two feed sections 202, 204 being configured to receive respective stickers, each having corresponding outputs being configured to be in selective conveyance communication with a downstream conveyance path leading to a sticker-handling system. Clause (16): the apparatus 100 of any clause mentioned in this paragraph, wherein: the at least two feed sections 202, 204 are each configured in such a way that the corresponding outputs of the at least two feed sections 202, 204 alternate with each other between an in-line position and an off-line position. Clause (17): the apparatus 100 of any clause mentioned in this paragraph, wherein: the at least two feed sections 202, 204 are each configured to move between an in-line position and an off-line position in such a way that the corresponding outputs of the at least two feed sections 202, 204 alternate with each other between the in-line position and the off-line position. Clause (18): the apparatus 100 of any clause mentioned in this paragraph, wherein: the corresponding outputs are operable in any one of an in-line position and an off-line position in such a way that: in the in-line position, at least one of the corresponding outputs is in conveyance communication with the downstream conveyance path; and in the off-line position, the remaining corresponding outputs are not in conveyance communication with the downstream conveyance path. Clause (19): The apparatus 100 of any clause mentioned in this paragraph, further comprising: a track assembly 212 being configured to interface with the at least two feed sections 202, 204 in such a way as to guide movement of the at least two feed sections 202, 204 along a predetermined path. Clause (20): the apparatus 100 of any clause mentioned in this paragraph, wherein: the at least two feed sections 202, 204 are configured to receive corresponding items being classified in accordance with a type of item. Clause (21): an apparatus 100 of any clause mentioned in this paragraph, further comprising: a centering mechanism 513 being configured to align a sticker conveyed to the centering mechanism 513 in such a way as to center the sticker in at least two centering points relative to a reference point. Clause (22): the apparatus 100 of any clause mentioned in this paragraph, wherein: the centering mechanism 513 is configured to allow for variance in width of at each of the at least two centering points. Clause (23): the apparatus 100 of any clause mentioned in this paragraph, wherein: the centering mechanism 513 is configured to present the sticker for placement on a lumber stack 10. Clause (24): the apparatus 100 of any clause mentioned in this paragraph, further comprising: a detector assembly configured to detect a case where an improperly positioned sticker is present in the centering mechanism 513; the centering mechanism 513 is further configured to release the improperly positioned sticker in response to the detector assembly providing an indication of the improperly positioned sticker was detected in the centering mechanism 513; and a conveyor system 507 being configured to convey a replacement sticker to the centering mechanism 513 in response to the detector assembly detecting the improperly positioned sticker in the centering mechanism 513 and that the centering mechanism 513 is ready to receive the replacement sticker. Clause (25): the apparatus 100 of any clause mentioned in this paragraph, further comprising: a detector assembly configured to detect a case where the sticker is not present in the centering mechanism 513; and a conveyor system 507 being configured to convey a replacement sticker to the centering mechanism 513 in response to the detector assembly providing an indication of no stickers being present in the centering mechanism 513. Clause (26): an apparatus 100, of any clause mentioned in this paragraph, for conveying stickers to a lumber stack 10, further comprising: an in-feed path 600 being configured to receive at least any one of a first sticker type and a second sticker type; an out-feed path 602 being configured to convey and to place a collection having any one of the first sticker type and the second sticker type to the lumber stack 10 in accordance with a predetermined sticker pattern; and a travel path 604 extending from the in-feed path 600 to the out-feed path 602, and the travel path 604 being configured to accommodate travel of any one of the first sticker type and the second sticker type from the in-feed path 600 to the out-feed path 602. Clause (27): the apparatus of any clause mentioned in this paragraph, further comprising: a fatal ejection path 601 extending from the travel path 604, and the fatal ejection path 601 is configured to eject the at least any one of the first sticker type and the second sticker type in response to a sensor detecting a fatal dimension error associated with an instance of any one the first sticker type and the second sticker type, and the instance of the at least any one of the first sticker type and the second sticker type is not usable for feeding to the in-feed path 600. Clause (28): the apparatus of any clause mentioned in this paragraph, further comprising: a non-fatal ejection path 603 extending from the travel path 604, and the non-fatal ejection path 603 is configured to eject the at least any one of the first sticker type and the second sticker type in response to a sensor detecting a non-fatal dimension error associated with an instance of any one the first sticker type and the second sticker type, and the instance of the at least any one of the first sticker type and the second sticker type is usable for feeding to the in-feed path 600. Clause (29): an apparatus 100, of any clause mentioned in this paragraph, for conveying stickers to a lumber stack 10, further comprising: an in-feed path 600 being configured to receive the stickers; an out-feed path 602 being configured to convey and to place a collection of the stickers to the lumber stack 10 in accordance with a predetermined sticker pattern; a travel path 604 extending from the in-feed path 600 to the out-feed path 602, and the travel path 604 being configured to accommodate travel of the stickers from the in-feed path 600 to the out-feed path 602; a fatal ejection path 601 extending from the travel path 604, and the fatal ejection path 601 is configured to eject an instance of the stickers in response to a first sensor detecting a fatal dimension error associated with the instance of the stickers, and the instance of the stickers having the fatal dimension error is not usable for feeding to the in-feed path 600; and a non-fatal ejection path 603 extending from the travel path 604, and the non-fatal ejection path 603 is configured to eject the instance of the stickers in response to a second sensor detecting a non-fatal dimension error associated with the instance of the stickers, and the instance of the stickers having the non-fatal dimension error, but is mis-oriented and is usable for feeding to the in-feed path 600. Clause (30): a method of any clause mentioned in this paragraph, further comprising: interfacing with an input of a conveyor system of an interface section having an input conveyance stream; interfacing with an output of the conveyor system having an output conveyance stream; receiving items from the input of the conveyor system at an intake rate in which the items are made available to the input; providing the items to the output of the conveyor system at an exit rate in which the items are required to exit from the output; and conveying the items through same path via multiple separate mechanisms. Clause (31): a method, of any clause mentioned in this paragraph, further comprising: operating at least two conveyors of an interface section at conveyance rates being independent of each other; receive from an input conveyance stream of the at least two conveyors; and provide to an output conveyance stream of the at least two conveyors. Clause (32): a method, of any clause mentioned in this paragraph, further comprising: interfacing endless-loop conveyors each of an interface section with an input conveyance stream and with an output conveyance stream; receiving items from the input conveyance stream at an intake rate in which the items are made available from the input conveyance stream; and providing the items to the output conveyance stream at an exit rate in which the items are required to exit to the output conveyance stream. Clause (33): a method, of any clause mentioned in this paragraph, further comprising: interfacing endless-loop conveyors of an interface section with an input conveyance stream and with an output conveyance stream, operating the endless-loop conveyors in such a way that: as an endless-loop conveyor receives from the input conveyance stream, and the remaining endless-loop conveyors do not receive from the input conveyance stream; and as the endless-loop conveyor provides to the output conveyance stream, and any remaining endless-loop conveyors do not provide to the output conveyance stream. Clause (34): a method, of any clause mentioned in this paragraph, further comprising: interfacing endless-loop conveyors of an interface section with an input conveyance stream and with an output conveyance stream; receiving items from the input conveyance stream at an intake rate in which the items are made available from the input conveyance stream; providing the items to the output conveyance stream at an exit rate in which the items are required to exit to the output conveyance stream; operating the endless-loop conveyors in such a way that: as an endless-loop conveyor receives from the input conveyance stream, and the remaining endless-loop conveyors do not receive from the input conveyance stream; and as the endless-loop conveyor provides to the output conveyance stream, and the remaining endless-loop conveyors do not provide to the output conveyance stream. Clause (35): a method, of any clause mentioned in this paragraph, further comprising: interfacing endless-loop conveyors of an interface section with an input conveyance stream and with an output conveyance stream; operating the endless-loop conveyors in such a way that: as an endless-loop conveyor receives, at least in part, from the input conveyance stream, and the remaining endless-loop conveyors provide, at least in part, to the output conveyance stream; and as the endless-loop conveyor provides, at least in part, to the output conveyance stream, and the remaining endless-loop conveyors receive, at least in part, from the input conveyance stream. Clause (36): a method, of any clause mentioned in this paragraph, further comprising: interfacing endless-loop conveyors of an interface section with an input conveyance stream and with an output conveyance stream; receive items from the input conveyance stream at an intake rate in which the items are made available from the input conveyance stream; and provide the items to the output conveyance stream at an exit rate in which the items are required to exit to the output conveyance stream; and operating the endless-loop conveyors in such a way that: as an endless-loop conveyor receives, at least in part, from the input conveyance stream, and the remaining endless-loop conveyors provide, at least in part, to the output conveyance stream; and as the endless-loop conveyor provides, at least in part, to the output conveyance stream, and the remaining endless-loop conveyors receive, at least in part, from the input conveyance stream. Clause (37): a method, of any clause mentioned in this paragraph, further comprising: interfacing endless-loop conveyors of an interface section with an input conveyance stream and with an output conveyance stream; operating the endless-loop conveyors in such a way that: as an endless-loop conveyor receives from the input conveyance stream, and the remaining endless-loop conveyors do not receive from the input conveyance stream; as the endless-loop conveyor provides to the output conveyance stream, and the remaining endless-loop conveyors do not provide to the output conveyance stream; as the endless-loop conveyor receives, at least in part, from the input conveyance stream, and the remaining endless-loop conveyors provide, at least in part, to the output conveyance stream; and as the endless-loop conveyor provides, at least in part, to the output conveyance stream, and the remaining endless-loop conveyors receive, at least in part, from the input conveyance stream. Clause (38): a method, of any clause mentioned in this paragraph, further comprising: interfacing endless-loop conveyors of an interface section with an input conveyance stream and with an output conveyance stream; receiving items from the input conveyance stream at an intake rate in which the items are made available from the input conveyance stream; and providing the items to the output conveyance stream at an exit rate in which the items are required to exit to the output conveyance stream; and operating the endless-loop conveyors in such a way that: as an endless-loop conveyor receives from the input conveyance stream, and the remaining endless-loop conveyors do not receive from the input conveyance stream; as the endless-loop conveyor provides to the output conveyance stream, and the remaining endless-loop conveyors do not provide to the output conveyance stream; as the endless-loop conveyor receives, at least in part, from the input conveyance stream, and the remaining endless-loop conveyors provide, at least in part, to the output conveyance stream; and as the endless-loop conveyor provides, at least in part, to the output conveyance stream, and the remaining endless-loop conveyors receive, at least in part, from the input conveyance stream. Clause (39): a method, of any clause mentioned in this paragraph, further comprising: receiving respective stickers by at least two feed sections, in which the at least two feed sections each have corresponding outputs being configured to be in selective conveyance communication with a downstream conveyance path leading to a sticker-handling system. Clause (40): a method, of any clause mentioned in this paragraph, further comprising: aligning a sticker conveyed to a centering mechanism in such a way as to center the sticker in at least two centering points relative to a reference point. Clause (41): a method, of any clause mentioned in this paragraph, further comprising: receiving at least any one of a first sticker type and a second sticker type by an in-feed path; conveying and placing a collection having any one of the first sticker type and the second sticker type by an out-feed path to a lumber stack in accordance with a predetermined sticker pattern; and accommodating travel of any one of the first sticker type and the second sticker type from the in-feed path to the out-feed path along a travel path extending from the in-feed path to the out-feed path. Clause (42): a method, of any clause mentioned in this paragraph, further comprising: receiving stickers along an in-feed path; conveying and placing a collection of the stickers along an out-feed path being to the lumber stack in accordance with a predetermined sticker pattern; accommodating travel of the stickers from the in-feed path to the out-feed path along a travel path extending from the in-feed path to the out-feed path; ejecting an instance of the stickers in response to a first sensor detecting a fatal dimension error associated with the instance of the stickers, and the instance of the stickers having the fatal dimension error is not usable for feeding to the in-feed path; and ejecting the instance of the stickers in response to a second sensor detecting a non-fatal dimension error associated with the instance of the stickers, and the instance of the stickers having the non-fatal dimension error, but is mis-oriented and is usable for feeding to the in-feed path.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assemblies, components that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

We claim:

1. An apparatus, comprising:
an interface section, including:
at least two sets of at least one endless-loop conveyor, each set being configured to interface with an input conveyance stream and with an output conveyance stream;
each set being configured to:
receive items from the input conveyance stream at an intake rate in which the items are made available from the input conveyance stream; and
provide the items to the output conveyance stream at an exit rate in which the items are required to exit to the output conveyance stream; and
the endless-loop conveyors being configured to operate in such a way that:
as a set receives, at least in part, from the input conveyance stream, the remaining set provides, at least in part, to the output conveyance stream; and
as a set provides, at least in part, to the output conveyance stream, the remaining set receives, at least in part, from the input conveyance stream;
and wherein:
the sets include:
a first set including a first chain and a second chain ganged to each other; and
a second set including a third chain and a fourth chain ganged to each other;
the first chain and the second chain from the first set being coaxially aligned with the third chain and the fourth chain of the second set; and
the first chain and the second chain of the first set and the third chain and the fourth chain of the second set being configured such that as the first chain and the second chain receive the items from the input at the intake rate in which the items are made available to the input, the third chain and the fourth chain provide the items to the output at the exit rate in which the items are required to exit from the output.

2. The apparatus of claim 1, wherein:
the sets are further configured to receive the items and to provide the items in such a way that the items are received and are provided in an overlapping fashion at least in part.

3. The apparatus of claim 1, wherein:
each set includes:
an endless loop mechanism having protrusions being configured to convey instances of the item one after the other.

4. The apparatus of claim 1, wherein:
each set includes:
at least one ganged continuous looped conveyor device having protrusions configured to convey the items.

5. The apparatus of claim 1, wherein:
the chains are further configured to provide the items to the output in accordance with a predetermined spacing between the items.

6. The apparatus of claim 1, wherein
the sets are configured to:
operate at conveyance rates being independent of each other.

7. The apparatus of claim 1, wherein the item is a sticker for use in lumber stacks.

8. An apparatus, comprising:
an interface section, including:
endless-loop conveyors each being configured to interface with an input conveyance stream and with an output conveyance stream;
each of the endless-loop conveyors being configured to:
receive items from the input conveyance stream at an intake rate in which the items are made available from the input conveyance stream; and
provide the items to the output conveyance stream at an exit rate in which the items are required to exit to the output conveyance stream; and
the endless-loop conveyors being configured to operate in such a way that:
as an endless-loop conveyor receives from the input conveyance stream, the remaining endless-loop conveyors do not receive from the input conveyance stream;
as the endless-loop conveyor provides to the output conveyance stream, the remaining endless-loop conveyors do not provide to the output conveyance stream;
as the endless-loop conveyor receives, at least in part, from the input conveyance stream, the remaining endless-loop conveyors provide, at least in part, to the output conveyance stream; and
as the endless-loop conveyor provides, at least in part, to the output conveyance stream, the remaining endless-loop conveyors receive, at least in part, from the input conveyance stream.

9. The apparatus of claim 8, further comprising:

first and second feed sections being configured to receive respective first and second types of items, each feed section having a corresponding output being configured to be in selective conveyance communication with the upstream conveyance stream.

10. The apparatus of claim 9, wherein:

the at least two feed sections are each configured in such a way that the corresponding outputs of the first and second feed sections alternate with each other between an in-line position and an off-line position.

11. The apparatus of claim 9, wherein:

the first and second feed sections are each configured to move between an in-line position and an off-line position in such a way that the corresponding outputs of the first and second feed sections alternate with each other between the in-line position and the off-line position.

12. The apparatus of claim 9, wherein:

the corresponding outputs are operable in any one of an in-line position and an off-line position in such a way that:
  in the in-line position, at least one of the corresponding outputs is in conveyance communication with the upstream conveyance stream; and
  in the off-line position, the remaining corresponding output is not in conveyance communication with the upstream conveyance stream.

13. The apparatus of claim 9, further comprising:

a track assembly being configured to engage the first and second feed sections in such a way as to guide movement of the first and second feed sections along a predetermined path.

14. The apparatus of claim 9, wherein:

the at least two feed sections are configured to receive corresponding items being classified in accordance with a type of item.

15. The apparatus of claim 9, further comprising:

a centering mechanism in the downstream conveyance stream and configured to align an item conveyed to the centering mechanism in such a way as to center the item in at least two centering points relative to a reference point.

16. The apparatus of claim 15, wherein:

the centering mechanism is configured to allow for variance in width of at each of the at least two centering points.

17. The apparatus of claim 15, wherein:

the centering mechanism is configured to present the item for placement on a stack.

18. The apparatus of claim 15, further comprising:

a detector assembly configured to detect a case where an improperly positioned item is present in the centering mechanism;

the centering mechanism is further configured to release the improperly positioned item in response to the detector assembly providing an indication of the improperly positioned item was detected in the centering mechanism; and a conveyor system being configured to convey a replacement item to the centering mechanism in response to the detector assembly detecting the improperly positioned item in the centering mechanism and that the centering mechanism is ready to receive the replacement item.

19. The apparatus of claim 15, further comprising:

a detector assembly configured to detect a case where the item is not present in the centering mechanism; and a conveyor system being configured to convey a replacement item to the centering mechanism in response to the detector assembly providing an indication of no items being present in the centering mechanism.

20. The apparatus of claim 9, wherein the input and output conveyance streams are in conveyance communication with a travel path, further comprising:

a fatal ejection path extending from the travel path, and the fatal ejection path is configured to eject the at least any one of the first item type and the second item type in response to a sensor detecting a fatal dimension error associated with an instance of any one the first item type and the second item type, and the instance of the at least any one of the first item type and the second item type is not usable for feeding to the in-feed path.

21. The apparatus of claim 20, further comprising:

a non-fatal ejection path extending from the travel path, and the non-fatal ejection path is configured to eject the at least any one of the first item type and the second item type in response to a sensor detecting a non-fatal dimension error associated with an instance of any one the first item type and the second item type, and the instance of the at least any one of the first item type and the second item type is usable for feeding to the in-feed path.

* * * * *